US008655801B2

(12) United States Patent
Raichelgauz et al.

(10) Patent No.: US 8,655,801 B2
(45) Date of Patent: Feb. 18, 2014

(54) COMPUTING DEVICE, A SYSTEM AND A METHOD FOR PARALLEL PROCESSING OF DATA STREAMS

(75) Inventors: Igal Raichelgauz, Herzelia (IL); Karina Odinaev, Haifa (IL); Yehoshua Y. Zeevi, Haifa (IL)

(73) Assignee: Cortica, Ltd., Ramat Gan (IL)

( * ) Notice: Subject to any disclaimer, the term of this patent is extended or adjusted under 35 U.S.C. 154(b) by 892 days.

(21) Appl. No.: 12/084,150

(22) PCT Filed: Oct. 26, 2006

(86) PCT No.: PCT/IL2006/001235
§ 371 (c)(1),
(2), (4) Date: Apr. 7, 2009

(87) PCT Pub. No.: WO2007/048282
PCT Pub. Date: May 3, 2007

(65) Prior Publication Data
US 2009/0187736 A1 Jul. 23, 2009

(30) Foreign Application Priority Data

Oct. 26, 2005 (IL) .......................................... 171577
Jan. 29, 2006 (IL) .......................................... 173409

(51) Int. Cl.
*G06F 15/18* (2006.01)
(52) U.S. Cl.
USPC ......................................................... 706/12
(58) Field of Classification Search
USPC ........................................ 706/20, 16, 15, 62
See application file for complete search history.

(56) References Cited

U.S. PATENT DOCUMENTS

| 4,972,363 A * | 11/1990 | Nguyen et al. ................. 708/801 |
| 6,618,711 B1 * | 9/2003 | Ananth .......................... 706/14 |
| 2004/0153426 A1 | 8/2004 | Nugent |

FOREIGN PATENT DOCUMENTS

| WO | WO 02/31764 | 4/2002 |
| WO | WO 2007/049282 | 5/2007 |

OTHER PUBLICATIONS

Ware et al, "Locating and Identifying Components in a Robot's Workspace using a Hybrid Computer Architecture", Proceedings of the 1995 IEEE International Symposium on Intelligent Control, Aug. 27-29, 1995, pp. 139-144.*
Lyon, "Computational Models of Neural Auditory Processing", IEEE International Conference on Acoustics, Speech, and Signal Processing, ICASSP '84, Date of Conference: Mar. 1984, vol. 9, pp. 41-44.*
Scheper et al, "Nonlinear dynamics in neural computation", ESANN'2006 proceedings—European Symposium on Artificial Neural Networks, Bruges (Belgium), Apr. 26-28, 2006, d-side publi, ISBN 2-930307-06-4.*

(Continued)

*Primary Examiner* — Jeffrey A Gaffin
*Assistant Examiner* — Ilya Traktovenko
(74) *Attorney, Agent, or Firm* — Myers Wolin, LLC

(57) ABSTRACT

A computing arrangement for identification of a current temporal input against one or more learned signals. The arrangement comprising a number of computational cores, each core comprises properties having at least some statistical independency from other of the computational, the properties being set independently of each other core, each core being able to independently produce an output indicating recognition of a previously learned signal, and at least one decision unit for receiving the produced outputs from the number of computational cores and making an identification of the current temporal input based the produced outputs.

31 Claims, 36 Drawing Sheets

(56) References Cited

OTHER PUBLICATIONS

Ortiz-Boyer et al, "CIXL2: A Crossover Operator for Evolutionary Algorithms Based on Population Features", Journal of Artificial Intelligence Research 24 (2005) 1-48 Submitted Nov. 2004; published Jul. 2005.*

Cernansky et al, "Feed-forward Echo State Networks", Proceedings of International Joint Conference on Neural Networks, Montreal, Canada, Jul. 31-Aug. 4, 2005.*

Verstraeten et al, "Isolated word recognition with the Liquid State Machine: a case study", Department of Electronics and Information Systems, Ghent University, Sint-Pietersnieuwstraat 41, 9000 Gent, Belgium, Available online Jul. 14, 2005.*

Zhou et al, "Ensembling neural networks: Many could be better than all", National Laboratory for Novel Software Technology, Nanjing University, Hankou Road 22, Nanjing 210093, PR China, Available online Mar. 12, 2002.*

Zhou et al, "Medical Diagnosis With C4.5 Rule Preceded by Artificial Neural Network Ensemble", IEEE Transactions on Information Technology in Biomedicine, vol. 7, Issue: 1, pp. 37-42, Date of publication: Mar. 2003.*

Fathy et al, "A Parallel Design and Implementation for Backpropagation Neural Network Using MIMD Architecture", 8th Mediterranean Electrotechrsical Corsfe rersce, 19'96. MELECON '96, Date of Conference: May 13-16, 1996, vol. 3 pp. 1472-1475, vol. 3.*

Freisleben et al, "Recognition of Fractal Images Using a Neural Network", Lecture Notes in Computer Science, 1993, vol. 6861, 1993, p. 631-637.*

Howlett et al, "A Multi-Computer Neural Network Architecture in a Virtual Sensor System Application", International journal of knowledge-based intelligent eogir.eering systems, 4 (2). pp. 86-93, 133N 1327-2314.*

Boari et al, "Adaptive Routing for Dynamic Applications in Massively Parallel Architectures", 1995 IEEE, Spring 1995.*

Garcia, "Solving the Weighted Region Least Cost Path Problem Using Transputers", Naval Postgraduate School, Monterey, California, Dec. 1989.*

Theodoropoulos et al, "Simulating Asynchronous Architectures on Transputer Networks", Proceedings of the Fourth Euromicro Workshop on Parallel and Distributed Processing, 1996. PDP '96.*

Nagy et al, "A Transputer, Based, Flexible, Real-Time Control System for Robotic Manipulators", UKACC International Conference on CONTROL '96, Sep. 2-5, 1996, Conference Publication No. 427, IEE 1996.*

Burgsteiner et al. "Movement Prediction From Real-World Images Usinf A Liquid State Machine", Innovations in Applied Artificial Intelligence Lecture Notes in Computer Science, Lecture Notes in Atificial Intelligence, 3533: 121-130, 2005.

Jaeger "The 'Echo State' Approach to Analysing and Training Recurrent Neural Networks", GMD Report, German National Research Center for Information Technology, 148: 1-43, 2001. p. 4-39.

Morad et al. "Performance, Power Efficiency and Scalability of Asymmetric Cluster Chip Multiprocessors", Computer Architecture Letters, 4: 1-4, 2005.

Natschläger et al. "The 'Liquid Computer': A Novel Strategy for Real-Time Computing on Time Series", Special Issue on Foundations of Information Processing of Telematik, 8(1): 39-43, 2002.

Raichelgauz et al. "Co-Evolutionary Learning in Liquid Architectures", Lecture Notes in Computer Science, 3512: 241-248, 2005. <URL:http://www.springerlink.com/content/pf127rp6mtj50tf8/fulltext.pdf>.

Raichelgauz et al. "Natural Signal Classification by Neural Cliques and Phase-Locked Attractors", IEEE World Congress on Computational Intelligence, IJCNN2006, Vancouver, CA, p. 1-5, Jul. 2006.

Verstraeten et al. "Isolated Word Recognition With the Liquid State Machine: A Case Study", Information Processing Letters, 95(6): 521-528, 2005.

Maass, W. et al.: "Computational Models for Generic Cortical Microcircuits", Institute for Theoretical Computer Science, Technische Universitaet Graz, Graz, Austria, published Jun. 10, 2003.

International Search Report for the corresponding International Patent Application PCT/IL2006/001235; Date of Mailing: Nov. 2, 2008.

International Search Authority: International Preliminary Report on Patentability (Chapter I of the Patent Cooperation Treaty) including "Written Opinion of the International Searching Authority" (PCT Rule 43bis. 1) for the corresponding International Patent Application No. PCT/IL2006/001235; Date of Issuance: Jul. 28, 2009.

* cited by examiner

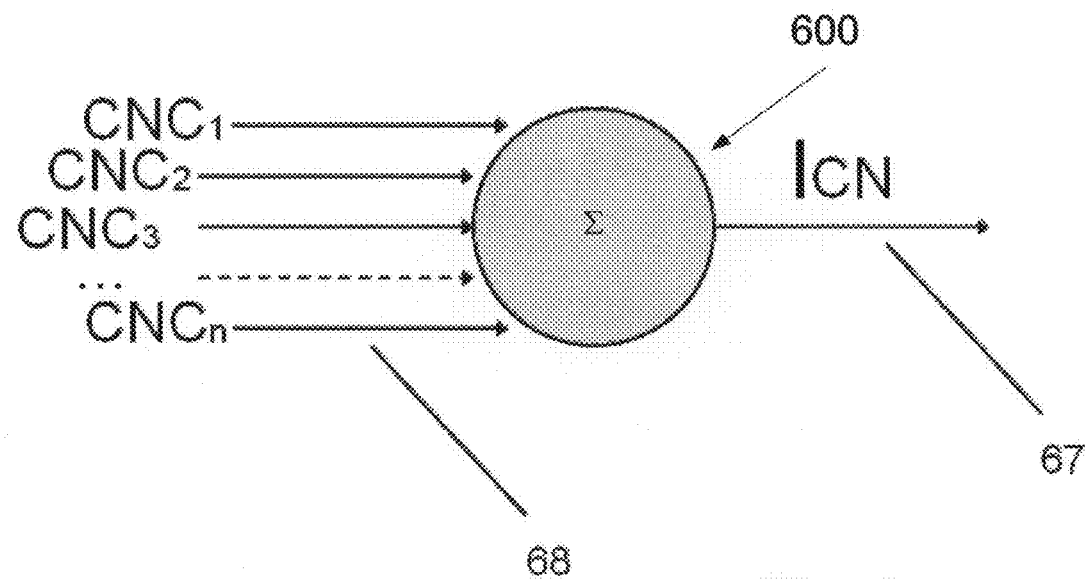
Fig. 5
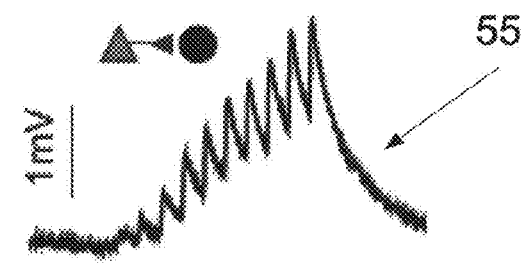
Fig. 6

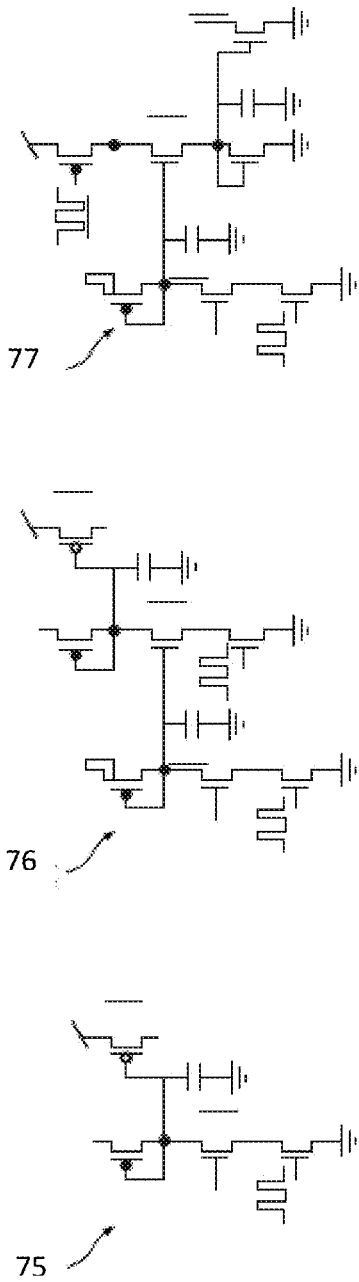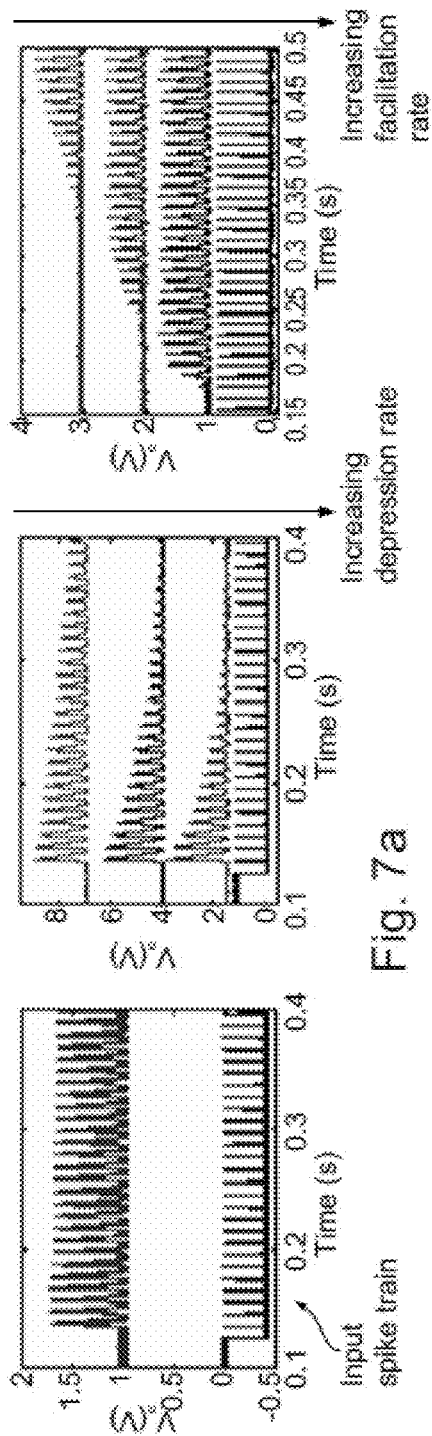
Fig. 7a

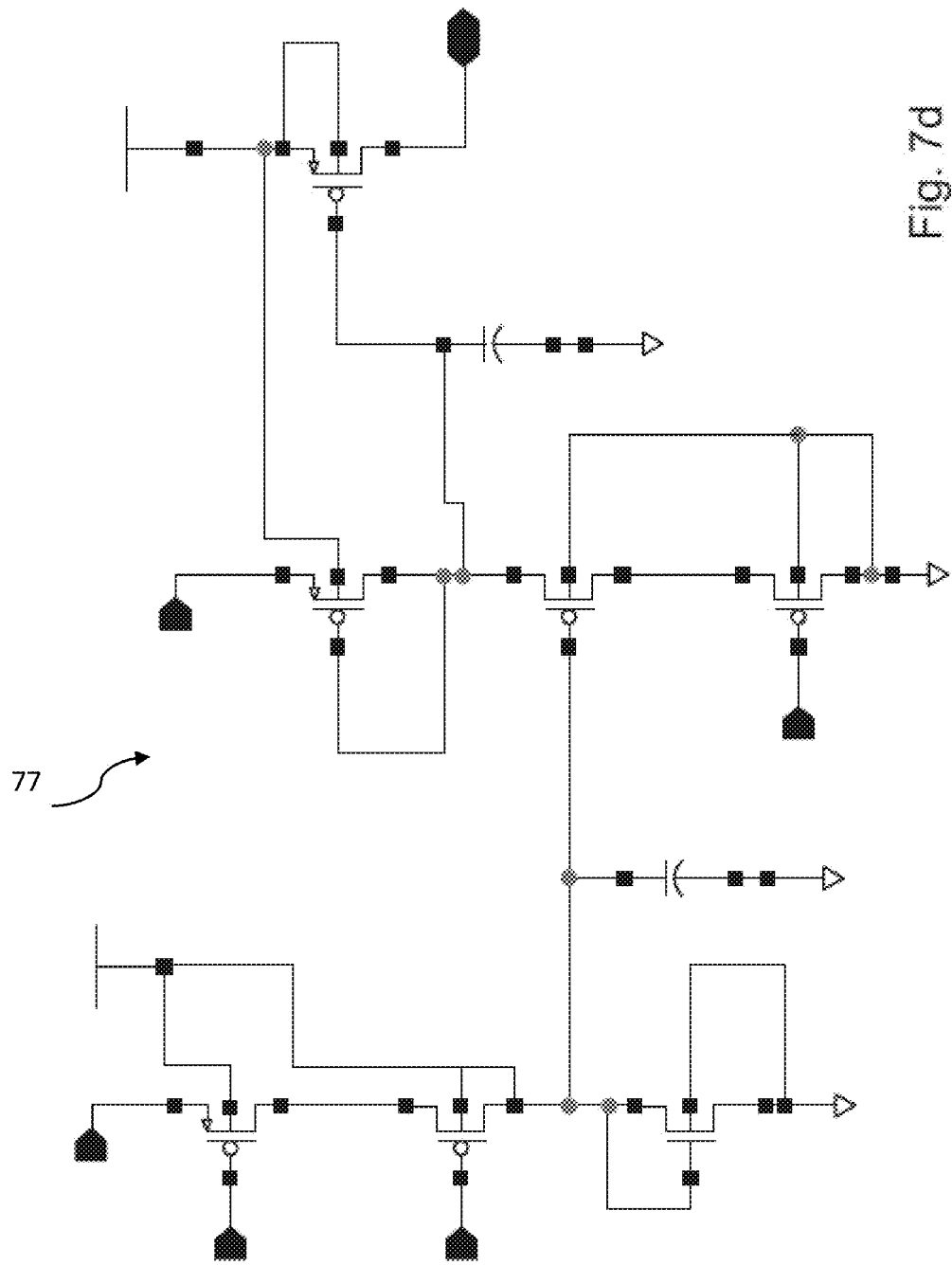

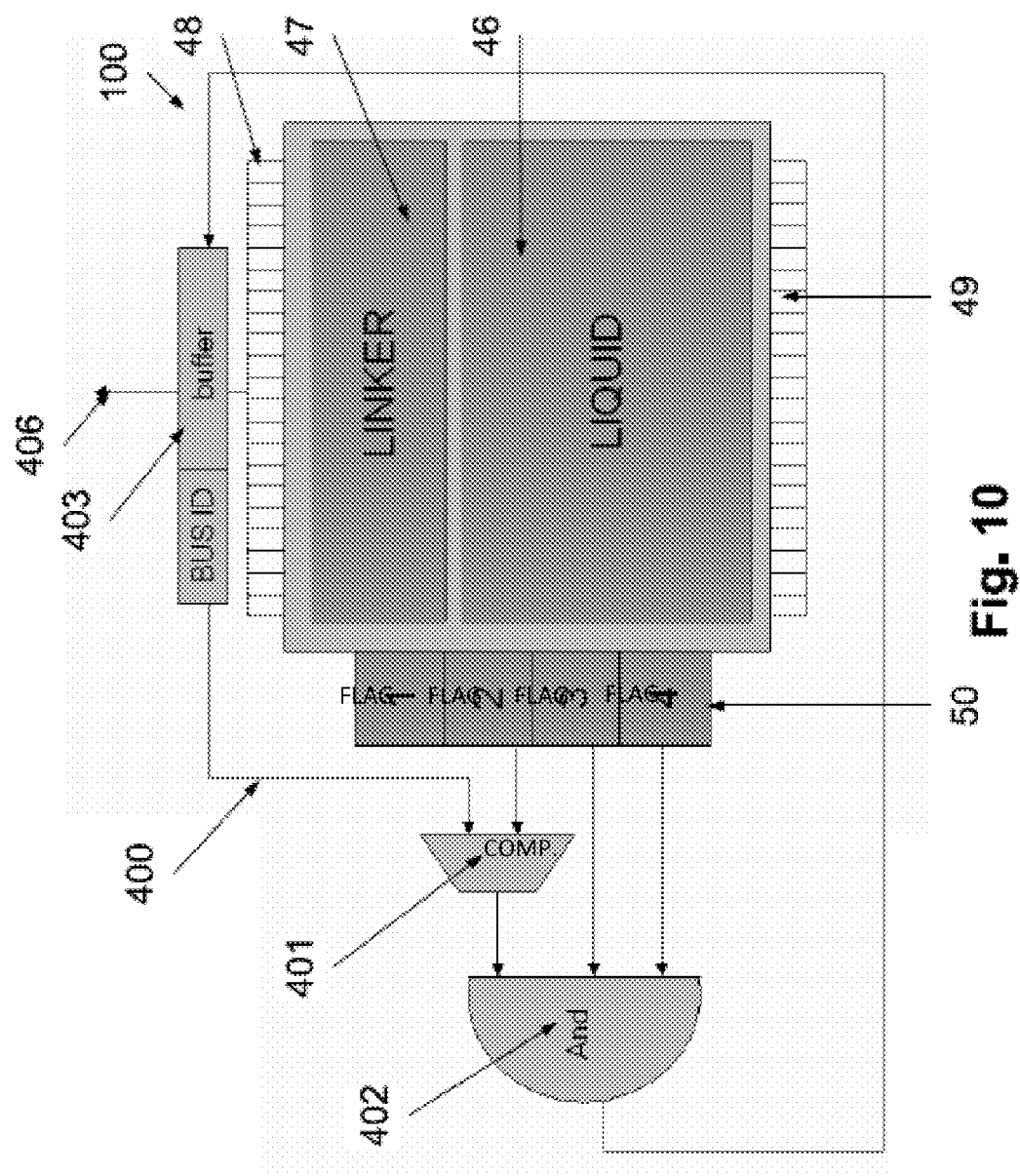

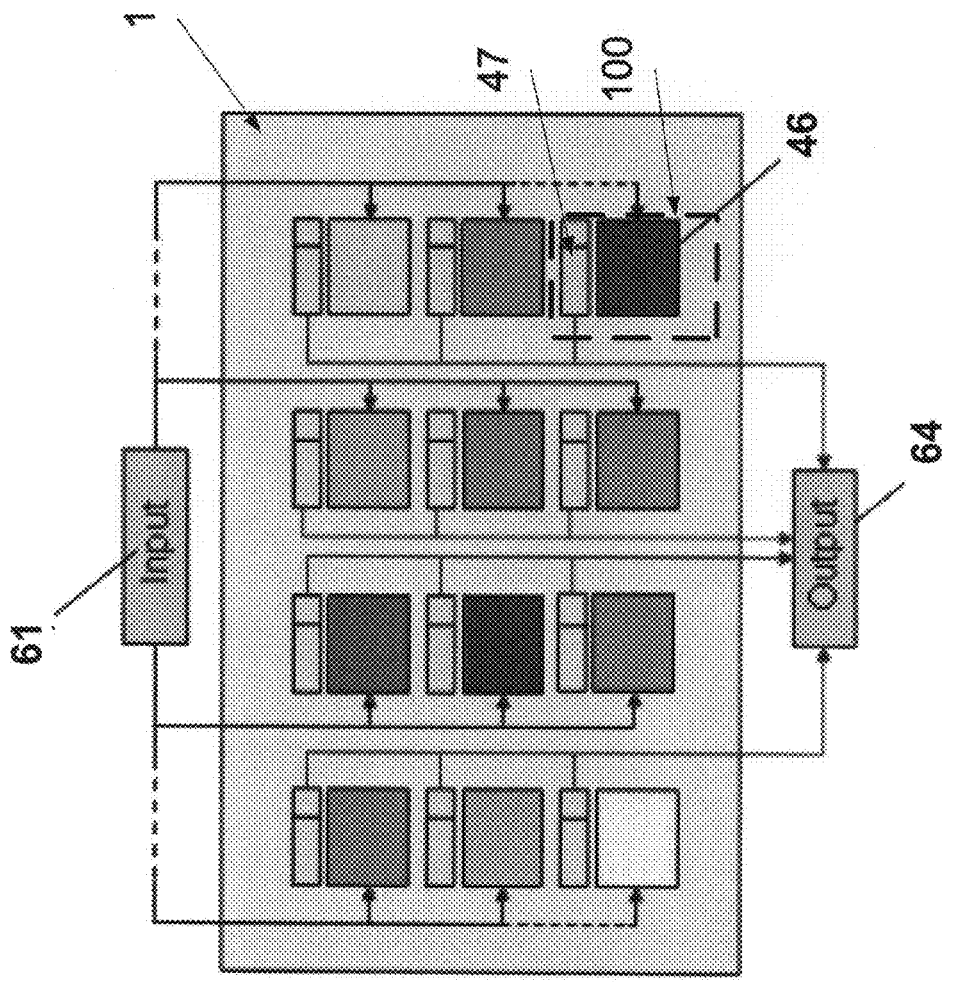

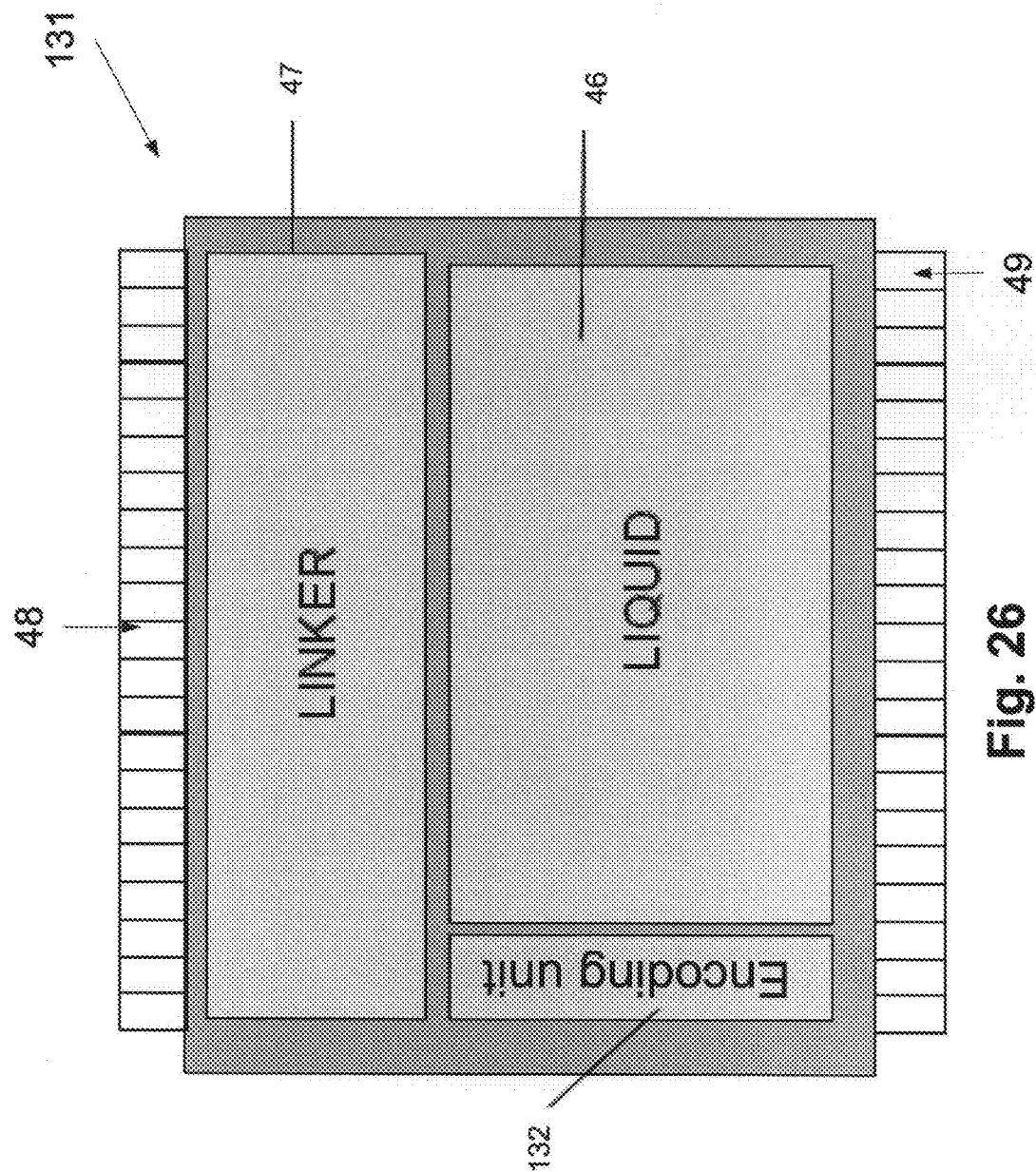

COMPUTING DEVICE, A SYSTEM AND A METHOD FOR PARALLEL PROCESSING OF DATA STREAMS

RELATED APPLICATIONS

This Application is a National Phase of PCT Patent Application No. PCT/IL2006/001235 having International filing date of Oct. 26, 2006, which claims the benefit of Israel Patent Application No. 173409 filed on Jan. 29, 2006 and Israel Patent Application No. 171577 filed on Oct. 26, 2005. The contents of the above Applications are all incorporated herein by reference.

FIELD AND BACKGROUND OF THE INVENTION

The present invention relates to real-time parallel processing using so-called liquid architectures, and, more particularly but not exclusively, to real-time processing and classification of streaming noisy data using adaptive, asynchronous, fault tolerant, robust, and parallel processors.

During the last decade, there has been a growing demand for solutions to the computing problems of Turing-machine (TM)-based computers, which are commonly used for interactive computing. One suggested solution is a partial transition from interactive computing to proactive computing. Proactive computers are needed, inter alia, for providing fast computing of natural signals from the real world, such as sound and image signals. Such fast computing requires the real time processing of massive quantities of asynchronous sources of information. The ability to analyze such signals in real time may allow the implementation of various applications, which are designed for tasks that currently can be done only by humans. In proactive computers, billions of computing devices may be directly connected to the physical world so that I/O devices are no longer needed.

As proactive computers are designed to allow the execution of day-to-day tasks in the physical world, an instrument that constitutes the connection to the real world must be part of the process, so that the computer systems will be exposed to, and linked with, the natural environment. In order to allow such linkages, the proactive computers have to be able to convert real world signals into digital signals. Such conversions are needed for performing various tasks which are based on analysis of real world natural signals, for example, human speech recognition, image processing, textual and image content recognition, such as optical character recognition (OCR) and automatic target recognition (ATR), and objective quality assessment of such natural signals.

Regular computing processes are usually based on TM computers which are configured to compute deterministic input signals. As commonly known, occurrences in the real world are unpredictable and usually do not exhibit deterministic behavior. Execution of tasks which are based on analysis of real world signals have high computational complexity and, thus, analysis of massive quantities of noisy data and complex structures and relationships is needed. As the commonly used TM based computers are not designed to handle such unpredictable input signals, in affective manner, the computing process usually requires high computational power and energy source power.

Gordon Moore's Law predicts exponential growth of the number of transistors per integrated circuit. Such exponential growth is needed in order to increase the computational power of signal chip processor, however as the transistors become smaller and reduce the effective length of the distance in the near-surface region of a silicon substrate between edges of the drain and source regions in the field effect transistor is reduced, and it becomes practically impossible to synchronize the entire chip. The reduced length can be problematic; as such a large number of transistors may be leaky, noisy, and unreliable. Moreover, fabrication cost grows each year as it becomes increasingly difficult to synchronize an entire chip at multiple GHz clock rates and to perform design verification and validation of a design having more than 100 million transistors.

In the light of the above, it seems that TM-based computers have a growth limit and, therefore, may not be the preferred solution for analyzing real world natural signals. An example of a pressing problem that requires analysis of real world signals is speech recognition. Many problems have to be solved in order to provide an efficient generic mechanism for speech recognition. However, most of the problems are caused by the unpredictable nature of the speech signals. For example, one problem is due to the fact that different users have different voices and accents, and, therefore, speech signals that represent the same words or sentences have numerous different and unpredictable structures. In addition, environmental conditions such as noise, channel limitations, and may also have an effect on the performance of the speech recognition.

Another example of pressing problem which is not easily solved by TM-based computers is related to the field of string matching and regular expressions identification. Fast string matching and regular expression detection is necessary for a wide range of applications, such as information retrieval, content inspection, data processing and others. Most of the algorithms available for string matching and regular expression identification are endowed with high computational complexity and, therefore, require many computational sources. A known solution to the problem requires a large amount of memory for storing all the optional strings and hardware architecture, as it is based on the Finite-State-Machine (FSM) model, wherein the memory for each execution of matching operations is sequentially accessed. Such a solution requires, in turn, large memory arrays that constitute a bottleneck that limits throughput, since the access to memory is a time or clock cycle consuming operation. Therefore, it is clear that a solution that allows the performance of string matching yet can save on access to memory, and can substantially improve the performance of the process.

During the last decade, a number of non-TM computational solutions have been adopted to solve the problems of real world signals analysis. A known computational architecture which has been tested is neural network. A neural network is an interconnected assembly of simple nonlinear processing elements, units or nodes, whose functionality is loosely based on the animal brain. The processing ability of the network is stored in the inter-unit connection strengths, or weights, obtained by a process of adaptation to, or learning from, a set of training patterns. Neural nets are used in bioinformatics to map data and make predictions. However, a pure hardware implementation of a neural network utilizing existing technology is not simple. One of the difficulties in creating true physical neural networks lies in the highly complex manner in which a physical neural network must be designed and constructed.

One solution, which has been proposed for solving the difficulties in creating true physical neural networks, is known as a liquid state machine (LSM). An example of an LSM is disclosed in "Computational Models for Generic Cortical Microcircuits" by Wolfgang Maass et al., of the Institute for Theoretical Computer Science, Technische Universitaet Graz, Graz, Austria, published on Jan. 10, 2003. The LSM model of Maass et al. comprises three parts: an input layer, a large randomly connected core which has the intermediate states transformed from input, and an output layer. Given a time series as input, the machine can produce a time series as a reaction to the input. To get the desired reaction, the weights on the links between the core and the output must be adjusted.

U.S. Patent Application No. 2004/0153426, published on Aug. 5, 2004, discloses the implementation of a physical neural network using a liquid state machine in nanotechnology. The physical neural network is based on molecular connections located within a dielectric solvent between presynaptic and postsynaptic electrodes thereof, such that the molecular connections are strengthened or weakened according to an application of an electric field or a frequency thereof to provide physical neural network connections thereof. A supervised learning mechanism is associated with the liquid state machine, whereby connection strengths of the molecular connections are determined by presynaptic and postsynaptic activity respectively associated with the presynaptic and postsynaptic electrodes, wherein the liquid state machine comprises a dynamic fading memory mechanism.

Another type of network, very similar to the LSM, is known as an echo state net (ESN) or an echo state machine (ESM), which allows universal real-time computation without stable state or attractors on continuous input streams. From an engineering point of view, the ESN model seems nearly identical to the LSM model. Both use the dynamics of recurrent neural networks for preprocessing input and train extra mechanisms for obtaining information from the dynamic states of these networks. An ESN based neural network consists of a large fixed recurrent reservoir network from which a desired output is obtained by training suitable output connection weights. Although these systems and methods present optional solutions to the aforementioned computational problem, the solutions are complex and in any event do not teach how the liquid state machine can be efficiently used to solve some of the signal processing problems.

There is thus a widely recognized need for, and it would be highly advantageous to have, a method and a system for processing stochastic noisy natural signals in parallel computing devoid of the above limitations.

SUMMARY OF THE INVENTION

According to one aspect of the present invention there is provided a computing arrangement for identification of a current temporal input against one or more learned signal. The arrangement comprising a number of computational cores, each core comprises properties having at least some statistical independency from other computational cores, the properties being set independently of each other core, each core being able to independently produce an output indicating recognition of a previously learned signal. The computing arrangement further comprises at least one decision unit for receiving the produced outputs from the plurality of computational cores and making an identification of the current temporal input based the produced outputs.

Preferably, the properties being defined according to at least one random parameter.

Preferably, the identification is based on a majority of the produced outputs.

Preferably, the computing arrangement further comprises a first input interface, operatively connected to each the computational cores, configured for allowing the plurality of computational cores for receiving the current temporal input simultaneously.

Preferably, the outputs of the at least one decision unit are used for a computational task which is a member of the group consisting of:
filtering the current temporal input,
image recognition,
speech recognition,
clustering,
indexing,
routing,
video signals analysis,
video indexing,
categorization,
string matching,
recognition tasks,
verification tasks,
tagging, and
outliner detection.

Preferably, each the computational core comprises a network of processors, the properties being determined according to the connections between the processors.

Preferably, each the computational cores comprises a linking module configured for producing a signal indicating the unique state of respective computational cores.

More preferably, the unique state represent the responsiveness of respective the properties to the current temporal input.

More preferably, the linking module comprises a plurality of registers, each the register being configured for storing an indication associated with a possible state of the computational core.

Preferably, the properties of each core are implemented using:
a plurality of components; and
a plurality of weighted connections, each of the weighted connections configured to operatively connect two of the plurality of components.

More preferably, the distribution of the plurality of weighted connections is unique for each the computational core.

More preferably, the distribution of the plurality of components is unique for each the computational core.

More preferably, the first output represents a clique of components from the plurality of components.

More preferably, at least some of the components are integrate-to-threshold units.

More preferably, each the integrate-to-threshold unit is configured according to a leaky integrate-to-threshold model.

More preferably, each the weighted connection is a dynamic coupling node configured for storing information of previous data streams, thereby adapting its conductivity.

More preferably, the distribution is randomly determined.

Preferably, the computational cores are liquid state machines.

Preferably, the computational cores are echo state machines.

Preferably, each the computational core is implemented in an architecture of the group consisting of:
in very large scale integration (VLSI) architecture, Field Programmable Gate Array (FPGA) architecture, analog architecture, and digital architecture.

Preferably, the first output is a member of the group consisting of: a binary value, and a vector.

More preferably, each the computational core is configured to operate in a learning mode, the signal indicating the unique state being associated with the unique state during the learning mode.

Preferably, the plurality of computational cores simultaneously receives the current temporal input.

Preferably, the computing arrangement further comprises a first input interface, the interface comprising at least one encoder configured for converting the current temporal input to a format suitable for input to the plurality of computational cores.

More preferably, the at least one encoder is configured for simultaneously generating a number of different encoded streams according to the current temporal input, wherein each the different encoded stream is directly transmitted to a different subgroup of the plurality of different computational cores.

More preferably, each the computational core comprises an encoding module, wherein each the encoding module is configured for simultaneously forwarding different portions of the current temporal input to different subgroups of the plurality of components.

Preferably, the current temporal input is received via a buffer, the buffer being used for collecting the first outputs and, based thereupon, outputting a composite output.

Preferably, each the computational core is connected to a resource allocation control (RAC) unit.

Preferably, the current temporal input comprises a member of the group consisting of:
a stream of digital signals,
a stream video signals,
a stream of analog signals,
a medical signal, a physiological signal,
a stream of data for classification,
a stream of text signals for recognition,
a stream of voice signals, and
a stream of image signals.

Preferably, the indication is transmitted to a central computing unit.

Preferably, the at least one decision unit comprises a central processing unit (CPU) configured to identify the current temporal input according to outputs as received from different ones of the cores.

More preferably, the identification is done using a member of the group consisting of:
a winner-takes-all algorithm,
a voting algorithm,
a statistical analysis of the first outputs, and
a majority voting algorithm.

Preferably, the outputs are forwarded as inputs to another the computing arrangement.

More preferably, the linking module is configured for probing a plurality of variants of a given signal, thereby identifying a stable variant as a unique state.

Preferably, the plurality of different computational cores is divided to a plurality of subgroups of computational cores, wherein each of the subgroups is configured for mapping variants of the current temporal input.

More preferably, outputs of each the subgroups are forwarded to a different decision unit.

More preferably, the current temporal input comprises a plurality of different inputs from a plurality of sources.

More preferably, each different input is forwarded to a different subgroup of the computational cores.

More preferably, the decision unit making for the identification based on a voting algorithm.

According to another embodiment of the present invention there is provided a computing layer comprising a plurality of independently set liquid state machine cores connected together in parallel, and configured to process an input against commonly learned signals.

According to another embodiment of the present invention there is provided a method for processing a current temporal input against at least one learned signal. The method comprises: a) receiving the current temporal input, b) transferring the current temporal input to a plurality of computational cores, each core comprises properties having statistical independency from others the computational cores, the properties being set independently of each other core, c) using the plurality of computational cores for independently producing an output indicating recognition of the previously learned signal, and d) making an identification of the current temporal input based on a majority of the produced outputs.

Preferably, step of making identification comprises a step of matching the produced outputs of each the computational cores with a plurality of previously learned outputs; wherein the identification of step (d) is indicative of the matching.

Preferably, properties are determined according to:
a plurality of components; and
a plurality of weighted connections, each the weighted connection configured to operatively connect two of the plurality of components.

More preferably, for each the computational core, the distribution of the plurality of weighted connections is unique for each the computational core.

More preferably, for each the computational core, the distribution of the plurality of components is unique for each the computational core.

More preferably, the method further comprises a step of storing information about the current temporal input in each the weighted connection, thereby adapting its conductivity.

Preferably, output of step (c) is generated according a unique state of the statistically different properties.

Preferably, current temporal input is forwarded simultaneously to the plurality of computational cores.

More preferably, the method further comprises a step between step (a) and step (b) of encoding the current temporal input.

More preferably, different encoding is performed for different subgroups of the plurality of computational cores.

More preferably, the method further comprises a step of transferring the output of each of the computational cores to an external computing device.

More preferably, the method further comprises a step between steps (c) and (d) of collecting the outputs from each the computational cores.

More preferably, the method further comprises a step of transmitting the identification to a central computing unit.

According to another embodiment of the present invention there is provided a computational core for generating a unique output based on a current temporal input The computational core comprises a network section comprising properties having a random distribution, configured for receiving the current temporal input, and for producing a unique output based upon the properties. The computational core further comprises a linking section, operatively connected to the network section, configured for identifying a previously learned signal according to the unique output and generating a unique signature based thereon.

Unless otherwise defined, all technical and scientific terms used herein have the same meaning as commonly understood by one of ordinary skill in the art to which this invention belongs. The materials, methods, and examples provided herein are illustrative only and are not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip, a field programmable gate array (FPGA), or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 5 is a schematic illustration of a coupling node unit (CNU), according to a preferred embodiment of the present invention;

FIG. 6 is a set of two graphs which depict the dynamics of the CNU, according to embodiments of the present invention;

FIGS. 7A, 7B, 7C and 7D are schematic illustrations of CNUs that may be implemented using VLSI technology, according to embodiments of the present invention;

FIG. 10 is a schematic illustration of an electric circuit that represents the computational core of FIG. 2 and an output circuit, according to a preferred embodiment of the present invention;

FIG. 11A is a block diagram that depicts the relationship among electronic components which are related to the computational layer, according to a preferred embodiment of the present invention;

FIG. 26 is a schematic representation of the computational core of FIG. 2, further comprising an encoder, according to a preferred embodiment of the present invention;

DESCRIPTION OF THE PREFERRED EMBODIMENTS

Figure 1:
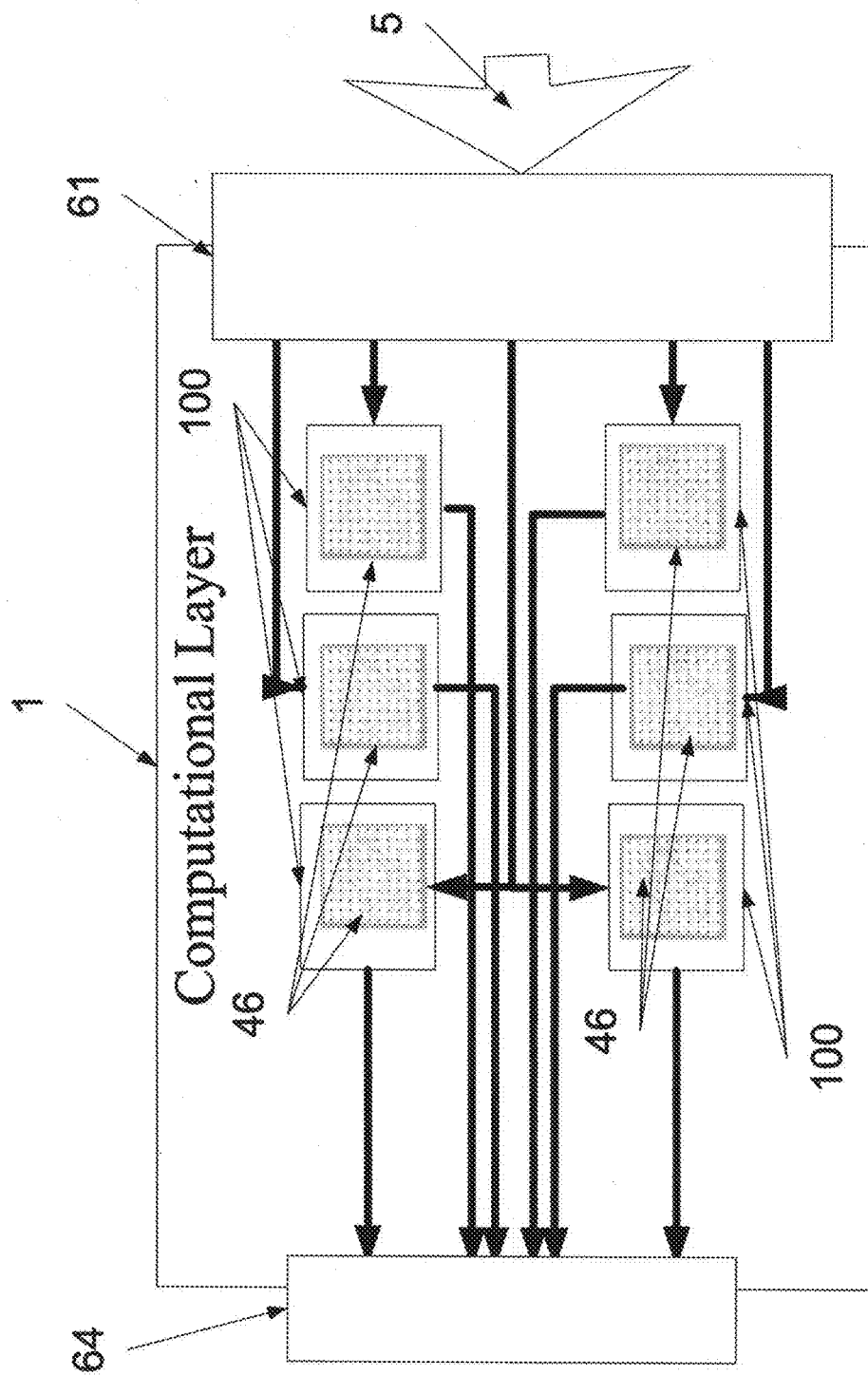
FIG. 1 is a schematic illustration of a computational layer, according to a preferred embodiment of the present invention.

The present embodiments comprise an apparatus, a system and a method for parallel computing by simultaneously using a number of computational cores. The apparatus, system and method may be used to construct an efficient proactive computing device with configurable computational cores. Each core comprises a liquid section, and is preprogrammed independently of the other cores with a function. The function is typically random, and the core retains the preprogrammed function although other aspects of the core can be reprogrammed dynamically. Preferably, a Gaussian or like statistical distribution is used to generate the functions, so that each core has a function that is independent of the other cores. The apparatus, system and method of the present invention are thus endowed with computational and structural advantages characteristic of biological systems. The embodiments of the present invention provide an adaptively-reconfigurable parallel processor having a very large number of computational units. The processor can be dynamically restructured using relatively simple programming The principles and operation of an apparatus, system and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

According to one aspect of the present invention there is provided an apparatus, a system and a method for asynchronous, adaptive and parallel processing of data streams using a computing device with a number of computational cores. The disclosed apparatus, system and method can be advantageously used in high-speed, fault-tolerant, asynchronous signal processing. Preferably, the computing device may be used in a new computational model for proactive computing of natural ambiguous and noisy data or data which is captured under severe Signal to Noise Ratio (S-N-R).

As further described below, all or some of the computational cores of the computing device receive the same data stream which they simultaneously process. The computational units execute sub-task components of a computational task in parallel. It should be noted that the computing device can also execute multiple tasks in-parallel.

Coordination among computational cores may be based on the principle of winner-takes-all, voting using majority voting, statistical analysis, etc. The computing device may produce a unique output according to a required task.

One of the main advantages of the present invention is in its computational power. The computational power of the computational layers or the system as a whole lies is in its multi-parallelism and huge space of possible solutions to a given task. This is radically different from the principles of design and operation of conventional TM based processors. Both the computing device as a whole and configurations of the computational cores may be adaptively reconfigured during the operation. It should be noted that the computing device may be implemented using very large scale integration (VLSI) technology. The system of the present invention is fault tolerant and such an implementation endows the VLSI with new degrees of freedom that can increase the VLSI production yields because of the improved fault tolerance.

The system, the apparatus, and the method of the present invention may be used for performing tasks that currently consume high computational power such as fast string matching, image signal identification, speech recognition, medical signals, video signals, data categorizing, physiological signals, data classification, text recognition, and regular expression identification. Using the present embodiments, these tasks can be efficiently accomplished, as a large number of functional computational units or cores are used in parallel to execute every step in the computational process. The data stream is transmitted to the relevant computational cores simultaneously.

In one embodiment of the present invention, the computational core itself is constructed from two sections, a liquid section and a linker section, as will be explained in greater detail hereinbelow.

In use, each computational core is associated with a specific subset of signals from the external world, and produces a unique output such as a clique of elements or a binary vector based thereupon. Such a unique output may be mapped by the linker section to the actual output of the computational core. Preferably, the linker section is programmed to map a certain subset of cliques to the core's actual output, according to the required task.

One of the factors that support the efficiency of the computing device is that the output depends only on the state of the liquid part of the core that the input brings about. There is no use of memory and therefore no access is made to storage devices. Thus, the throughput of the computing device is affected only by the propagation time of the signal in the computational cores. The computational cores themselves are preferably implemented using fast integrated circuits, as further described below and operational delay depends only on the signal propagation time through the core. Thus, the computing device provides an efficient solution for many computing problems that usually require frequent access to the memory, such as fast string matching and regular expression identification.

Reference is now made to FIG. 1, which is a schematic illustration of a computing device comprising a computational layer 1, which processes an external data stream 5 according to a preferred embodiment of the present invention. An external data stream may be understood as signals or streams of signals or data from the external world, such as image or sound or video streams; analog or digital signals, such as signals that represent a predefined string or a regular expression; sensor output signals; database records; CPU outputs; naturally structured signals such as locally-correlated dynamical signals of speech and image etc.

As depicted in FIG. 1, the computational layer 1 comprises an input interface 61, which is designed for receiving the external data stream 5. The input interface 61 is directly connected to a number of different computational cores 100. As the connection is direct, the input interface has the ability to simultaneously transfer the external data stream 5 to each one of the computational cores 100. Each one of the computational cores 100 is randomly programmed, preferably using a statistical function, and thus each computational core produces a unique output for a given input. Preferably, the computational core comprises a liquid with a unique function and configuration which is designed to produce a unique output for an input of interest. This unique output is referred to as a state or liquid state.

It should be noted that since each one of the computational cores 100 is randomly programmed over a statistical distribution, a better coverage of the distribution is received when more computational cores 100 are used as a greater diversity of the processing patterns is received. Therefore, a large number of computational cores 100 ensure that the external data stream is processed according to a large number of diverse patterns. As described below, such diversity increases the probability that a certain external data stream will be identified by the computational layer 1. All the outputs are transferred to an output interface 64, which is directly connected to each one of the computational cores 100. The output interface 64 is configured to receive the outputs and, preferably, to forward them to a central computing unit (not shown).

Such an embodiment can be extremely useful for classification tasks which are performed in many common processes, such as clustering, indexing, routing, string matching, recognition tasks, verification tasks, tagging, outliner detection etc. Each one of the numerous computational cores is designed to receive and classify, at the same time with other computational core of the computational layer 1, the external data stream. As further described below, the classification is based on predefined set of possible signals which have been introduced to the computational core 100 beforehand.

In order to describe the computational layer 1 more fully, with additional reference to FIG. 2, FIGS. 3A and 3B, FIG. 8 and others, the structure and function of the computational cores 100 will be further described. The computational cores 100 each have a unique processing pattern, which defined at a section which may be referred as the liquid section 46.

Figure 2:
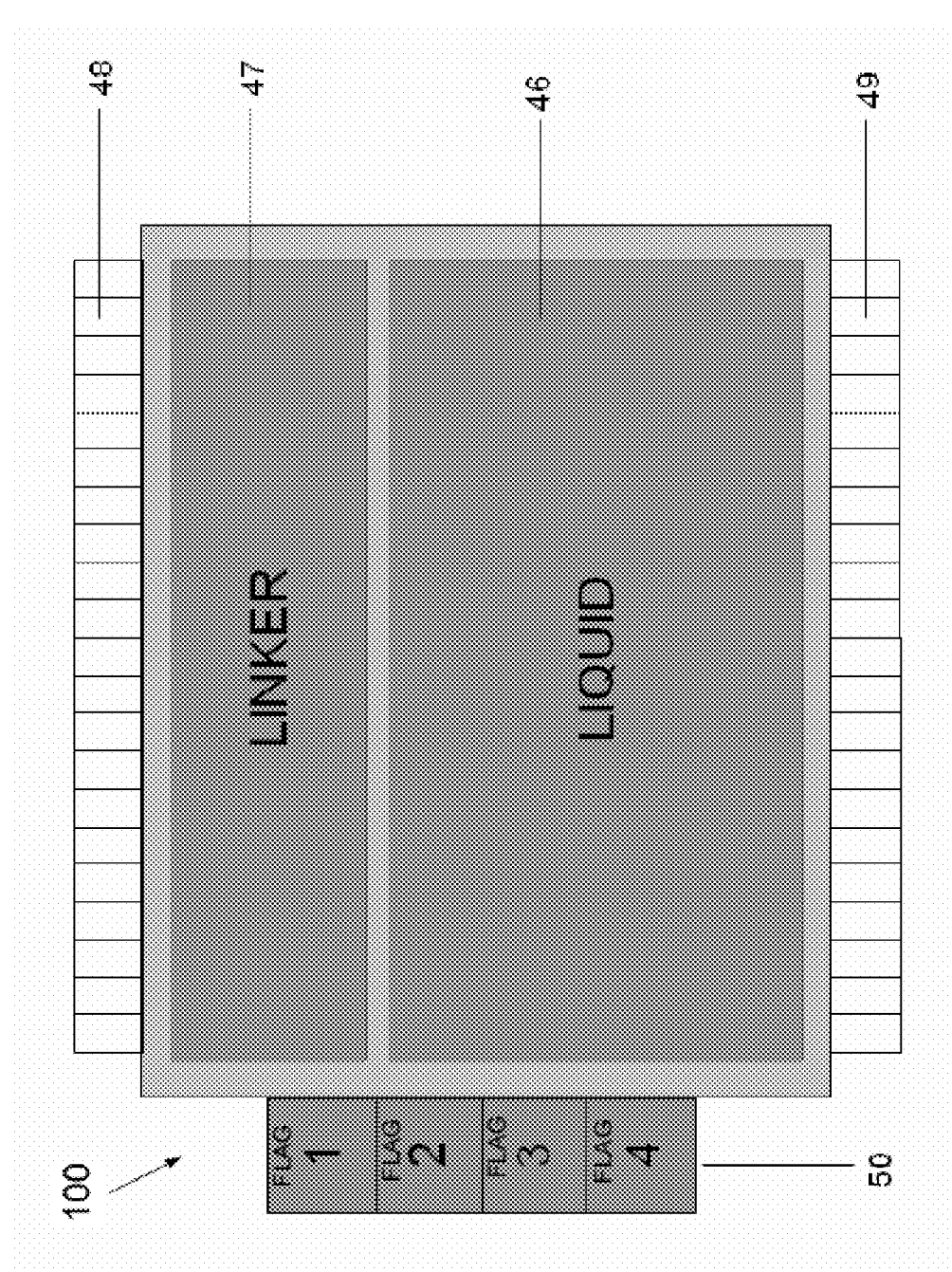
FIG. 2 is a schematic illustration of an integrated circuit that functions as a computational core in a computational layer, according to a preferred embodiment of the present invention.

Reference is now made to FIG. 2, which is a schematic illustration of a computational core 100 for processing one or more data streams, in accordance with one embodiment of the invention. FIG. 2 depicts an integrated circuit that is divided into a liquid section 46 and a linker section 47 which is designed to produces the overall core output in a vector or binary value, as described below.

As depicted in FIG. 2, the computational core 100 further comprises a set of flags 50, which are used to indicate, inter alia, the current operation mode of the computational core 100 and the outcome of the processing of the received data stream, as further described below. The computational core 100 further comprises a set of input pins 49 for receiving input signals, such as a digital stream, and a set of output pins 48 for, inter alia, forwarding the received input signals.

The liquid section 46 comprises an analog circuit that receives temporal segments of binary streaming data $$\tilde{S}(|t<t_s|),$$

made up of two constant voltage levels $V_{high}$ and $V_{low}$ that respectively represent the binary values 0 and 1. It should be noted that the input may not be binary, for example in the digital implementation.

The liquid section 46 is designed to capture and preferably forward a unique pattern of the received external data stream. Preferably, the external data stream is encoded in the temporal segments of streaming binary data. The external data stream may be understood as a stream of digital signals, a stream of analog signals, a stream of voice signals, a stream of image signals, a stream of real-world signals, etc. The external data stream is preferably encoded as a binary vector having a finite length that comprises several discrete values.

The task of the liquid section 46 is to capture one intrinsic dimension (property) of the external environment. Properties are encoded in temporal segments of input, and drive the liquid section 46 to a unique state.

The captured properties are represented in the liquid section 46 by liquid states (LS). LS is a vector with a finite length of several discrete values. Such an embodiment allows identifications to be made from noisy data as will be explained below. Each liquid-state captures a unique property of the presented scenario or event. The representation may be context dependent and thus affords context aware operation at the lower levels of the processing scheme. These abilities enable the computational layer to provide efficient interfacing with the physical world.

The liquid section 46 in effect comprises a finite memory, in terms of temporal length of the input. For efficient computing in such an embodiment, temporal segments $$\overset{\perp}{S},$$

which are received by the liquid section 46, are set to this finite length $|t<t_s|=T$, preferably by means of the input encoder to be discussed below.

The received external data stream drives the liquid section 46 to a unique state which is associated with a record or a register that indicates that the received external data stream has been identified.

In one embodiment of the present invention, the liquid section 46 of the computational core is comprised of basic units of two types. One unit is preferably a leaky integrate-to-threshold unit (LTU) and the other type is preferably a coupling node unit (CNU) which is used for connecting two LTUs. The CNUs are distributed over the liquid section 46 in a manner that defines a certain unique processing pattern. The CNU connections can be changed dynamically, as will be described in greater detail below.

Figure 3A:
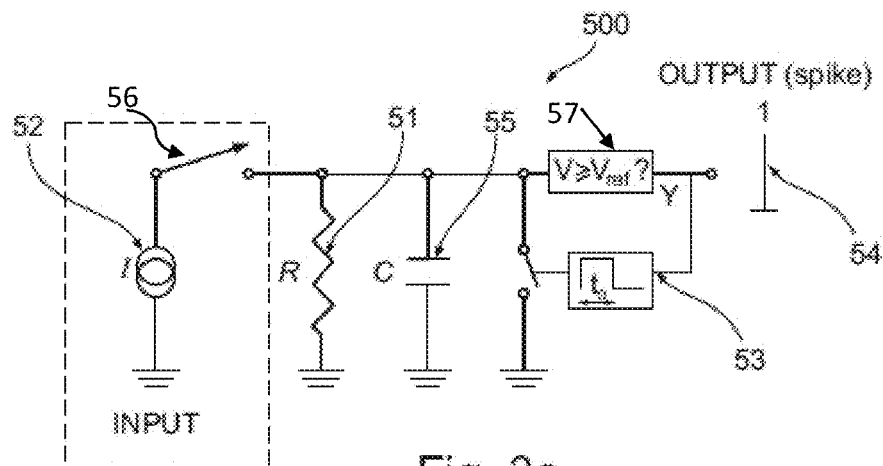
FIG. 3A is a schematic illustration of an integrated circuit that functions as a leaky integrate-to-threshold unit, according to a preferred embodiment of the present invention.

Reference in now made to FIG. 3A, which is an exemplary LTU 500 that is implemented using an electric circuit. The LTU 500 preferably comprises an input 52, connected 56 to a resistance 51, a capacitance 55, a measuring module 53, and an output 54. The exemplary LTU electric circuit 500 is constructed according to the following mathematical model:

$$RC(dV/dt)=-(V-V_{ref})+R(I_{CN}(t)) \tag{1}$$

where

R denotes the input resistance, as shown at 51,

C denotes the capacitance, as shown at 55, $V_{ref}$ denotes the reference potential of the electric circuit 500, V denotes voltage at the measuring point of the electric circuit 500, and $I_{CN}$ denotes the input current which is received from the CN (coupling node).

Figure 3B:
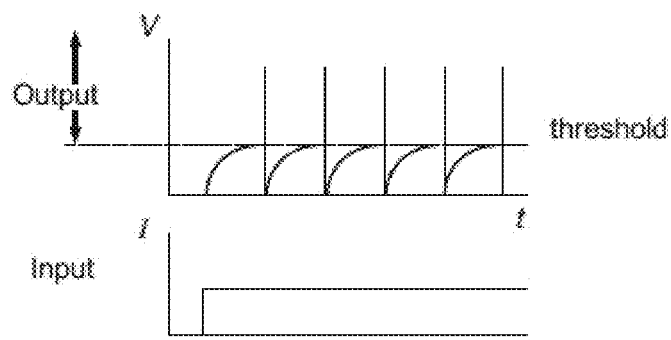
FIG. 3B is a graph depicting the charging current and the threshold of the leaky integrate-to-threshold unit, according to a preferred embodiment of the present invention.
Figure 3C:
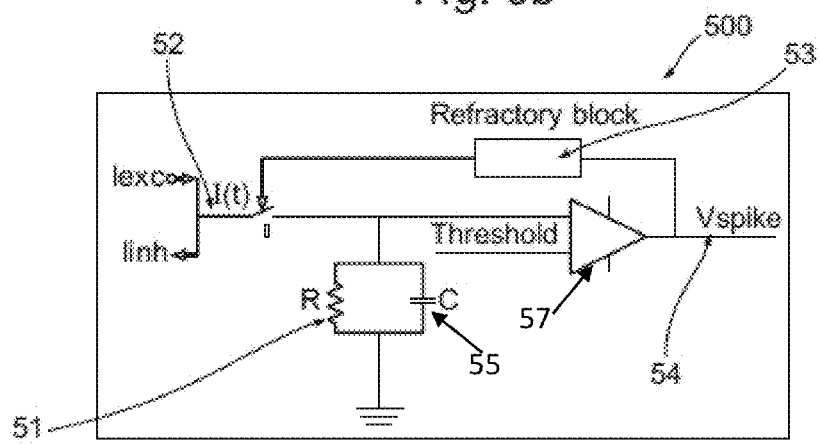
FIG. 3C is another schematic illustration of an integrated circuit that functions as a leaky integrate-to-threshold unit, according to an embodiment of the present invention.
Figure 4A:
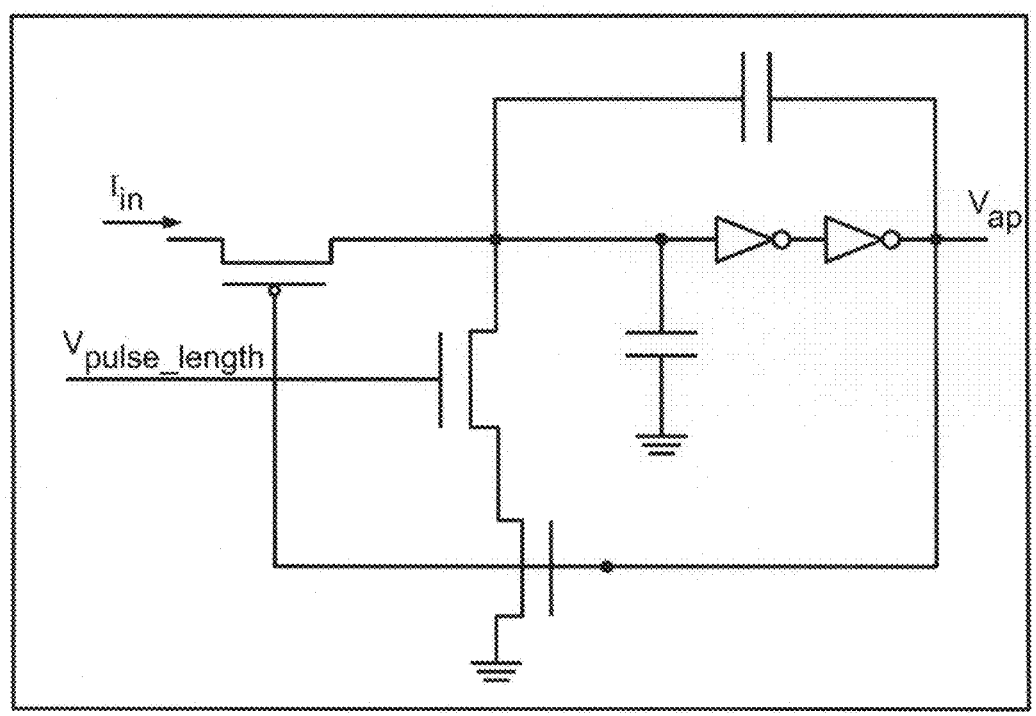
FIGS. 4A and 4B are schematic illustrations of an integrated circuit that functions as a leaky integrate-to-threshold unit and is implemented using very large scale integration (VLSI) technology, according to a preferred embodiment of the present invention.
Figure 4B:
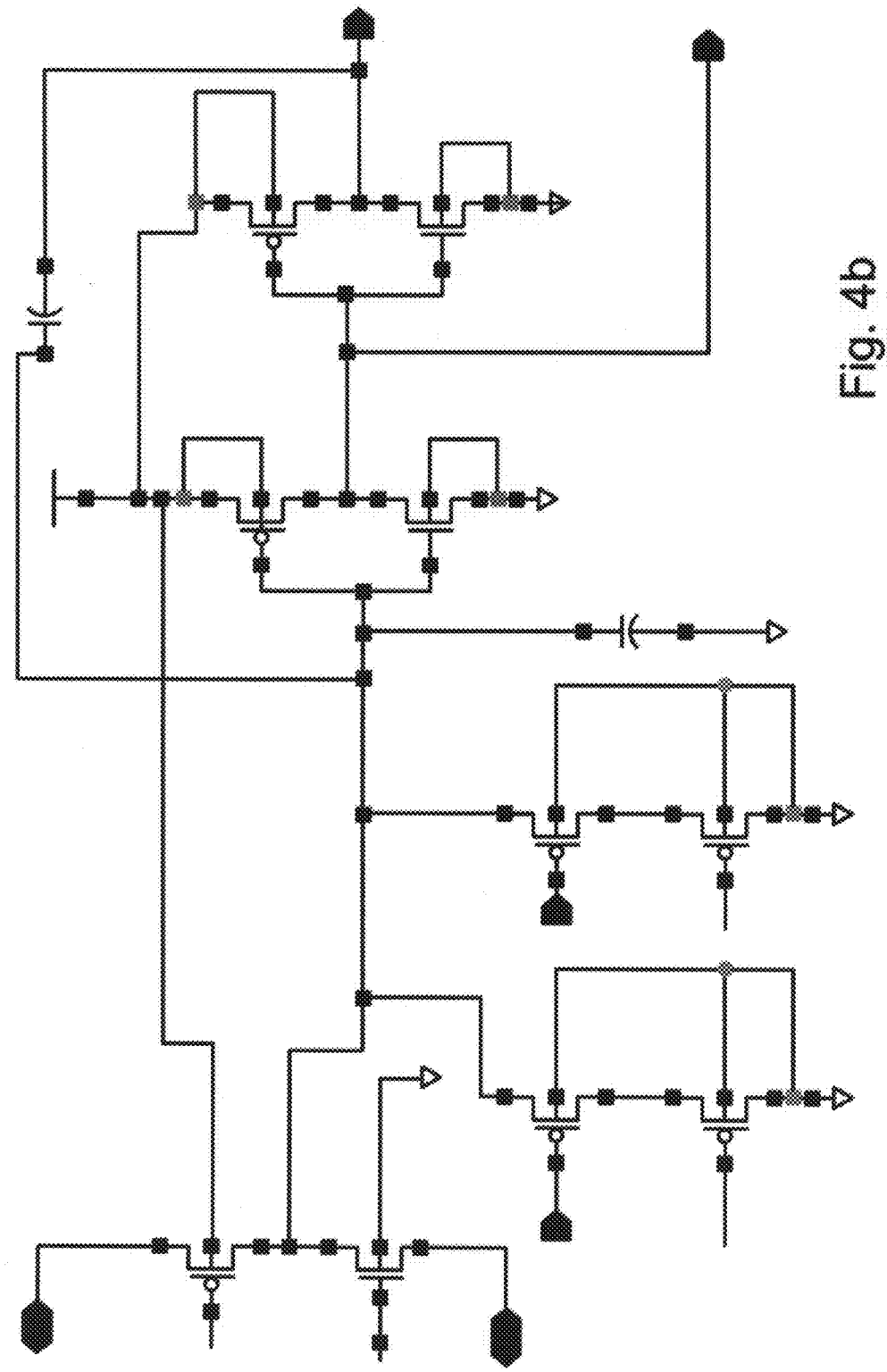

If V exceeds a certain threshold voltage 57, it is reset to the $V_{ref}$ and held there during the dead time period $T_d$. The RC circuit is used for model charging of the LTU from its resting potential to $V_{thresh}$. Then, the current is measured by a measuring module 53 which is designed to generate a current flow output only if supra-threshold spikes of the measured charging current are produced in the output 54, as shown in FIG. 3B. FIG. 3C is an additional schematic illustration of the LTU 500. It should be noted that LTUs might also be implemented in a VLSI, as depicted in FIGS. 4A and 4B.

Reference is now made to FIG. 5, which is a schematic diagram of an exemplary model of a CNU 600, according to a preferred embodiment of the present invention. As described above, the CNU 600 is a dynamic connector between two LTUs. The CNU 600 is designed to act as a weighted connection, preferably with a variable dynamic weight, marked with the symbol Σ, which is influenced by the input frequency history. As depicted in FIG. 6, which depicts the dynamics of the connection, the connection weight may be increased, as shown at 55, or decreased, as shown at 54, depending on the input. A mathematical model of the CNU's variable weight is:

$$I_{CN}(t)=\Sigma CNC_i(t) \tag{2}$$

$$CNC=Ae^{-t/\tau_{CN}}, \tag{3}$$

where $I_{CN}$ (t) denotes the coupling node current, as shown at 67,

CNC denotes an input coupling node current, as shown at 68,

A denotes a positive or a negative dynamic coefficient of the CNU 600, and $\tau_{CN}$ denotes the decay time constant of the CNU 600.

Figure 7B:
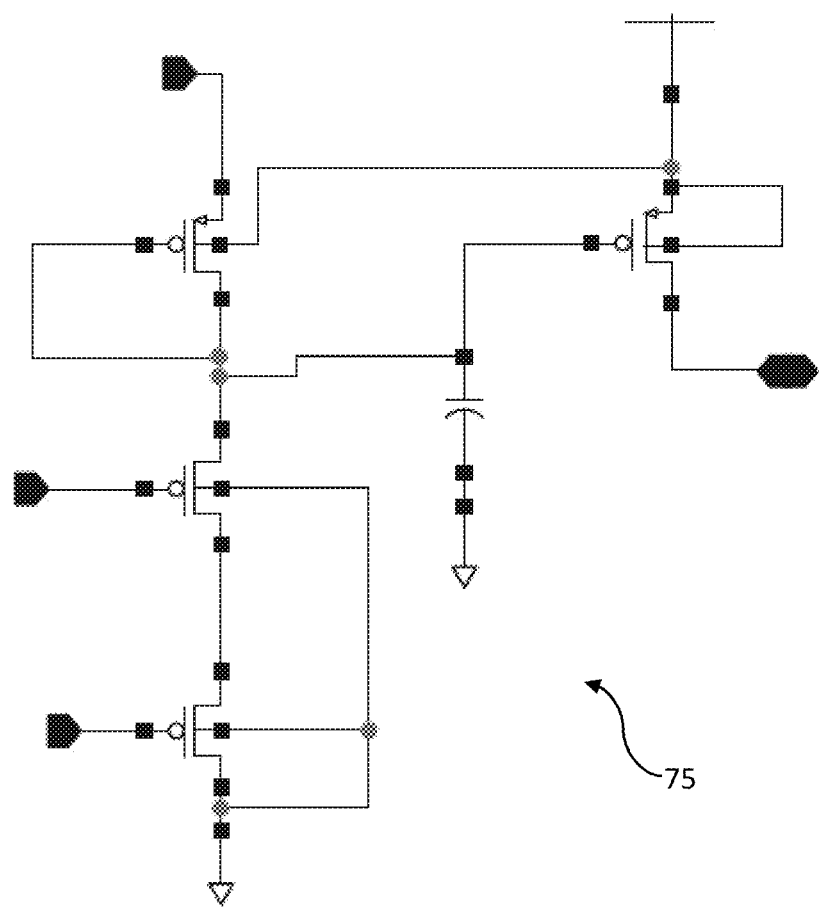
Figure 7C:
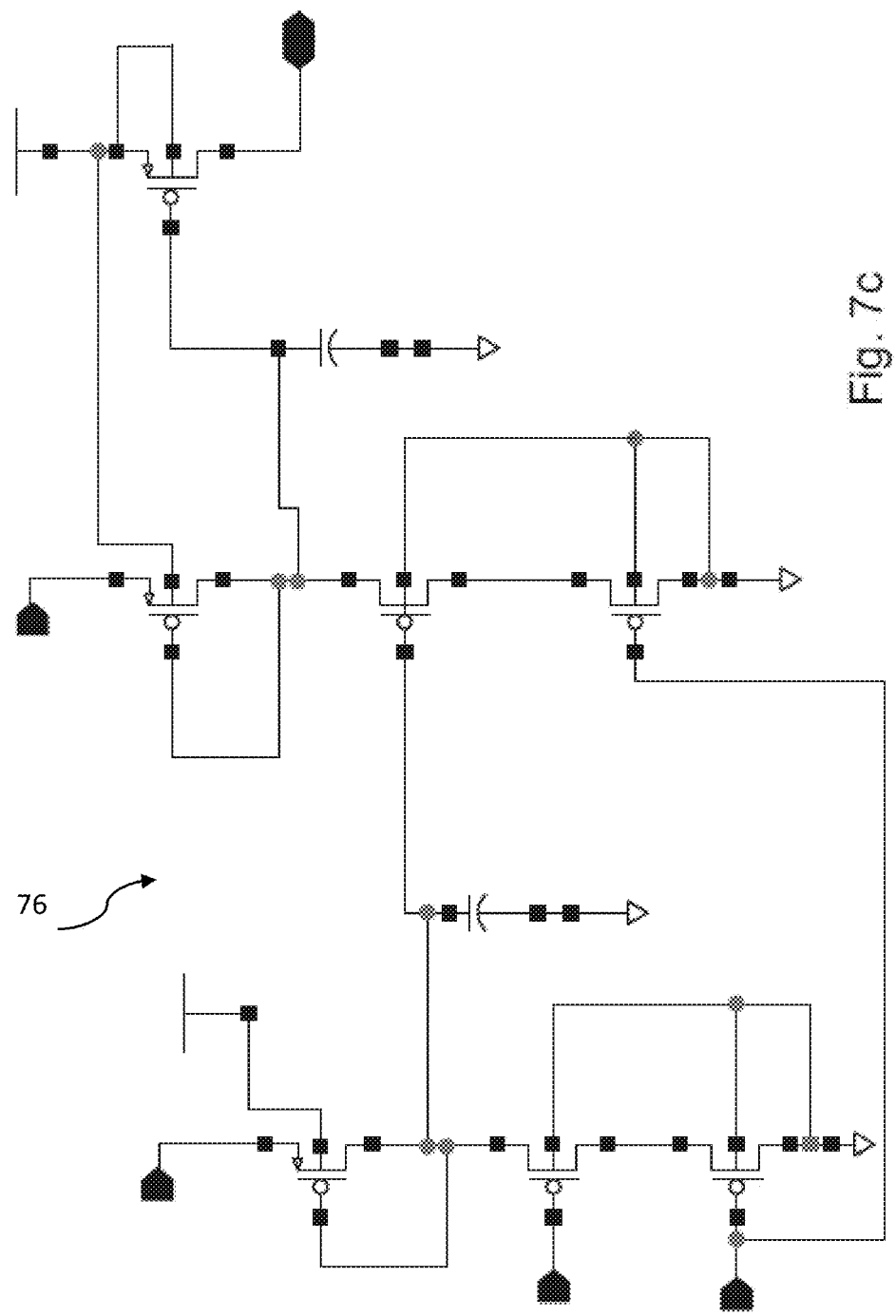

It should be noted that the CNU 600 might also be implemented in VLSI architecture, as shown in FIGS. 7A, 7B, 7C, and 7D, which are diagrams showing three possible CNUs. One VLSI implementation, as shown at 75 of FIG. 7A and in FIG. 7B, is a static CNU where the CNC is constant. Another VLSI implementation is a CNU with negative dynamics, which is shown at 76 of FIG. 7A and in FIG. 7C. FIG. 7D depicts an implementation of a CNU with positive dynamics, as shown at 77 of FIG. 7A. Each one of the CNUs may be weighted and decay in time in a different manner. As described above, liquid sections of different computational cores 100 may be randomly programmed, preferably according to a statistical function, in order to create separate computational cores with a diversity of patterns. In an embodiment the weighting and decay time of the CNU is initially set using a statistical distribution function. Preferably, the weighting and decay time of the CNUs of all the liquid sections of the computational cores is randomly set. In such a manner, it is ensured that a diversity of patterns is given to the computational cores.

It should be noted that the given description of the CNU and the LTU is only one possible implementation of these components. The CNU and the LTU may be implemented using any software or hardware modules or components and different features may be provided as programmable parameters. Moreover, simpler implementation of the CNU, such as a CNU with a constant CNC and simpler implementation of the LTU, such as an LTU without T(d) may also be used.

Figure 8:
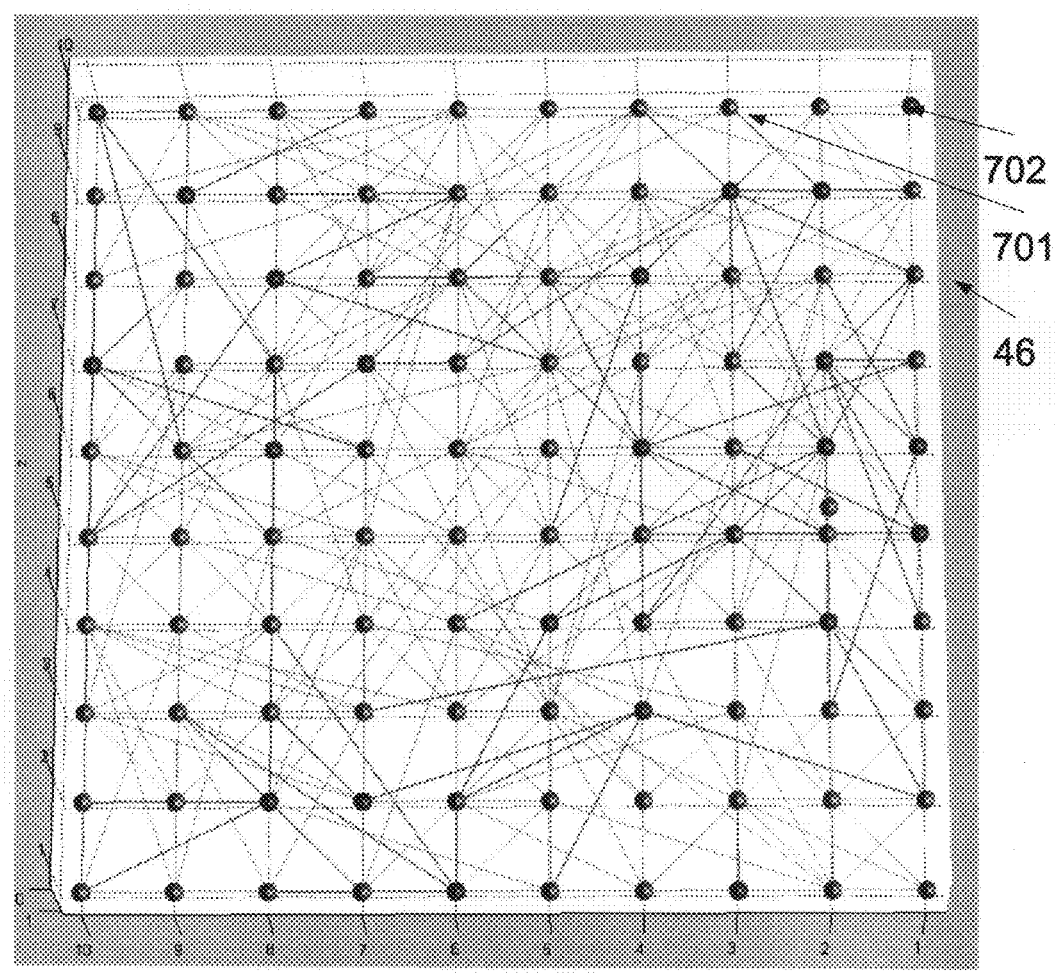
FIG. 8 is a schematic illustration of the liquid section of a computational core, according to a preferred embodiment of the present invention.

Reference is now made to FIG. 8, which is a graphical representation of an exemplary liquid section 46, according to one embodiment of the present invention. The liquid section 46 comprises a grid of LTUs, as shown at 702, which are connected by one or more CNUs, as shown at 701. The CNUs are randomly applied, as described above. In the exemplary liquid section 46 that is depicted in FIG. 8, approximately 1000 CNUs are applied to randomly connect a grid of ~100 LTUs. It should be noted that the liquid section may be implemented using any software or hardware module.

In one embodiment of the present invention, the CNUs are applied according to a variable probability function that is used to estimate the probability that a CNU connects a pair of LTUs. Preferably, the probability of a CNU being present between two LTUs depends on the distance between the two LTUs, as denoted the following equation:

$$C \cdot \exp(-D(i,j)/\lambda^2), \tag{4}$$

where λ and C denote variable parameters, preferably having the same or different average value in all the computational cores, and D denotes a certain Euclidean distance between LTU i and LTU j. In order to ensure a large degree of freedom and heterogeneity between different computational cores that comprise the computational layer, each liquid section 46 has random, heterogeneous λ and C parameters that determine the average number of CNUs according to the λ and C distribution. It should be noted that other algorithms may be used as random number generators in order to determine the distribution of CNUs between the LTUs. When a certain external data stream is received by the liquid section 46, it is forwarded via the CNUs to the different LTUs. The received external data stream may or may not trigger the liquid section 46, causing it to enter a state and generate an output to the linker section 47. The generation of the output depends on the distribution of the CNUs over the liquid section 46. Preferably, a certain binary vector or any other unique signature is generated as a reaction to the reception of an external data stream. This embodiment ensures that the liquid section 46 generates different outputs as a response to the reception of different signals. For each signal a different output, that is referred to as a state may be entered.

The liquid section 46 may be defined to receive two dimensional data such as a binary matrix. In such an embodiment the liquid section 46 is sensitive to the spatiotemporal structure of the streaming data. An example for such data input is depicted in FIG. 9B that depicts a two dimensional input 250 which is injected into a the liquid section and a set of LTUs 251 that is responsive to the present input at time and dynamic processes. The set of LTUs 251 constitute a unique state which later can be associated with the received input, as described below in relation to the learning mode.

Figure 9A:
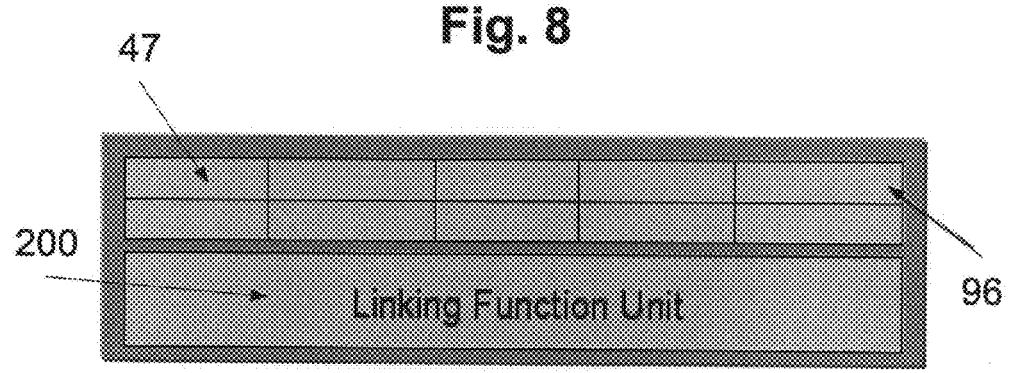
FIG. 9A is a schematic illustration of the linker section of a computational core, according to a preferred embodiment of the present invention.
Figure 9B:
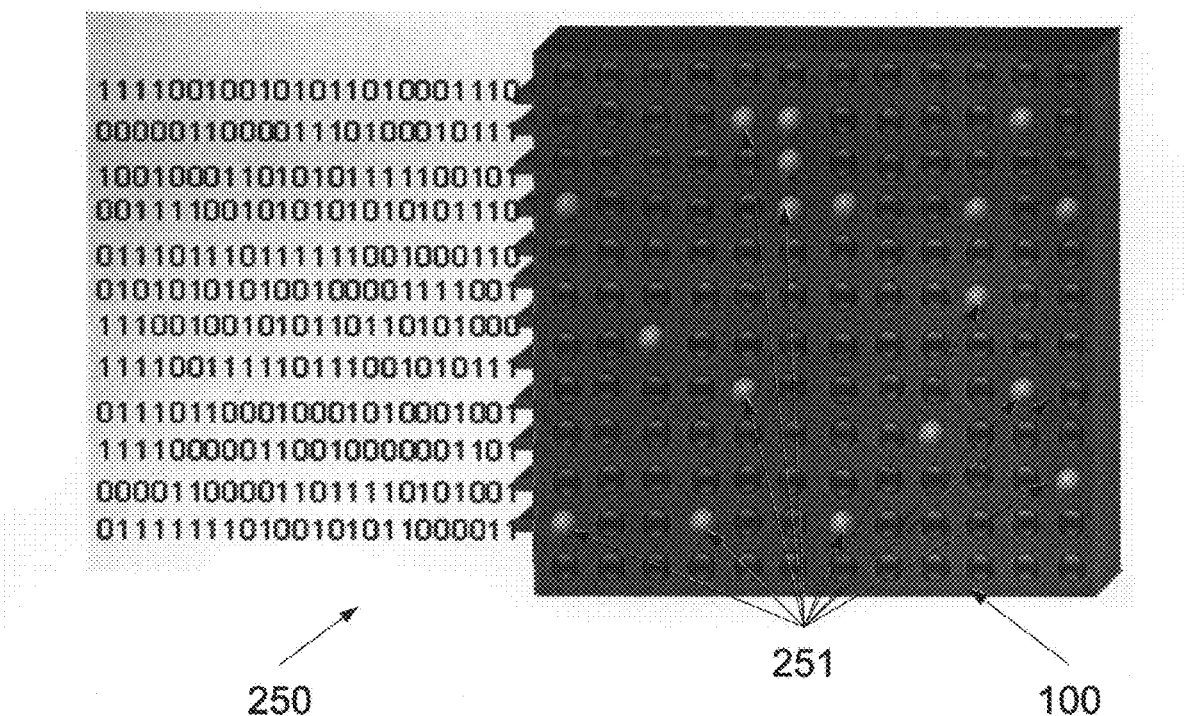
FIG. 9B is a schematic three dimensional illustration of a computational core, according to a preferred embodiment of the present invention.
Figure 9C:
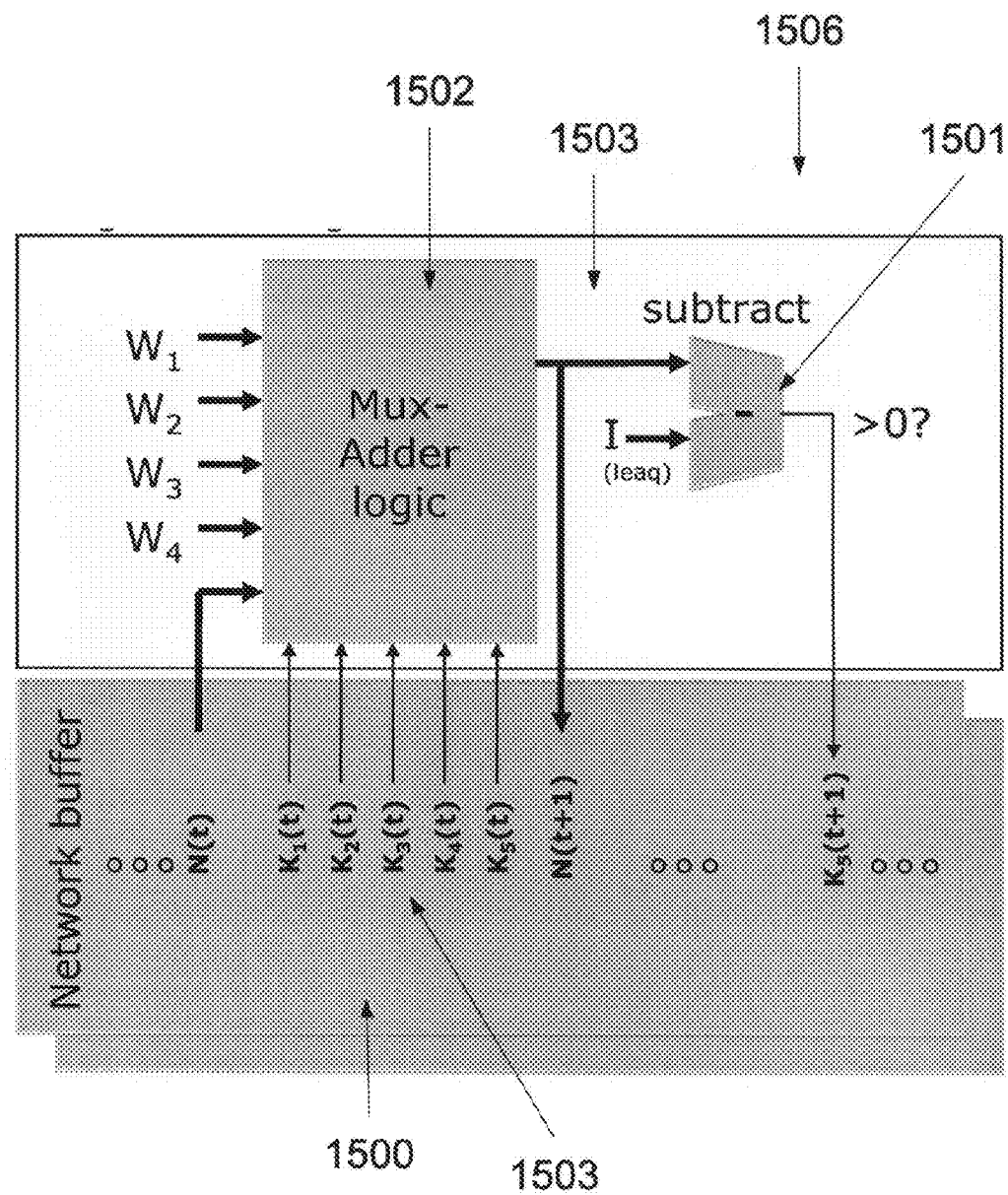
FIG. 9C is a graphical representation of a digital implementation of a liquid section, according to one preferred embodiment of the present invention.

Reference is now made to FIG. 9C, which is a graphical representation of a digital implementation of the liquid section 1500, according to one embodiment of the present invention. FIG. 9B depicts an exemplary implementation of one LTU 1502 and a network buffer 1500. In this embodiment, simpler components 1502 are used to implement the liquid section 1506.

FIG. 9B only depicts one exemplary LTU 1502 which is attached to a subtraction element 1504. Other LTUs are not depicted in the figure only for simplicity and clarity of the description. The LTU 1502 is configured according to Mux-Adder logic. The LTU 1502 is designed to receive values to its counter from a set of other LTUs by a set of connections $W_1$, $W_2$, $W_3$ and $W_4$. The connectivity of each connection is randomly generated, with parameters defined according to the distribution based on analysis of input signals. For example, only 10 percent of the possible connections between different pairs of LTUs are connected, wherein 10 percent of them function as inhibitory neurons. The network is fed by a temporal input, which is denoted($K_{\{in\}}(t)$), which is injected into selected set of input LTUs. An exemplary input is depicted in FIG. 9C, as shown at 1503. As a set of inputs may be injected to the input LTUs, the processing of two dimensional inputs such as a binary matrix that represent an image can be processed The output counter value of the LTU 1502 is injected to a neighboring LTU N(t+1) and to a subtracting element 1504. The subtracting element 1501 substrates the leakage counter value 1505 from the received counter value and inject it back to the network buffer $K_5(t+1)$.

The distribution of the connections is determined by different distributions schemes, such as flat, discrete flat and Gaussian distributions. The counter value is forwarded in a network according to the following equations of motion:

$$\begin{cases} n_i(t+1) = [1 - K_i(t)]n_i(t) + \sum_j W_{ij}K_j - I \\ K_i(t) = \theta(th - n_i(t)) \end{cases}$$

Where
$n_i$ denotes the counter value of the LTU,
$K_i$ denotes is a binary spiking indicator of the LTU,
$W_{ij}$ is a value that indicates the weight between LTU
$\theta(x)$ denotes is a Heaviside step function and I denotes the leaking.

The Heaviside step function, which is also sometimes denoted H(x) or u(x) is a discontinuous function which is also known as the "unit step function" and defined by:
0 X≤Threshold
1 Threshold≤X The output of the network is collected during or after the processing of the inputs from a set of output neurons, which is denoted {out}.

Reference is now made, once again, to FIG. 2. The linker section 47 is associated with the liquid section 46. The linker section 47 is designed to capture the state of the liquid section 46 and to produce a core output accordingly. Preferably, the linker section 47 is designed to generate one or more binary vectors from the liquid state when respective external data streams are identified thereby. A more elaborate example of such an embodiment is described below in relation to FIG. 27.

The linker section 47 is designed to produce a core output according to the state of the liquid section, preferably as a reaction to the reception of such a binary vector. Preferably, the linker section 47 maps the binary vector onto an output, as defined in the following equation:

output=linker (state).

The output may also be understood as a binary value, a vector, a clique of processors from the unique processing pattern, a digital stream or an analog stream. The concept of the clique is described hereinbelow.

The linker section 47 may be implemented by a basic circuit, and transforms binary vectors or any other representations of the state of the liquid section 46 into a single binary value using a constant Boolean function. Consequently, the computational core is able to produce an output which is a single binary value. More sophisticated circuits that allow the conversion of the received binary vector to a digital value, more precisely representing the processed external data stream may also implemented in the linker section 47. The linker section 47 may alternatively or additionally incorporate an analog circuit that operates over a predetermined time window and eventually leads to a digital output that is representative of behavior in the computational core over the duration of the window.

Reference is now made to FIG. 9A, which is a schematic illustration of the linker section 47, according to a preferred embodiment of the present invention. The linker section 47 may comprise a number of registers, as shown at 96, which are configured to store a number values, such as binary vectors, that may be matched with the outputs of the liquid section. The linker section 47 further comprises a linking function unit 200. The linking function unit 200 is designed to match between the received vectors and values which are stored in the registers of the linker section 47.

Reference is now made, once again, to FIG. 2. The computational core 100 is designed to operate in separate learning and operational modes. The learning mode may be referred to as melting, in that new states are melted into the liquid, and then the liquid is frozen for the operation state, and thus the operational mode is regarded as a frozen state. When a new external data stream is presented to the computational core 100, the learning mode is activated. The learning process, which is implemented during the learning mode, ensures that the computational core 100 is not limited to a fixed number of external data streams and that new limits can be dynamically set according to one or more new external data streams which are introduced to the computational core 100.

During the learning process, the reception of a new external data stream may trigger the liquid section 46 to output a binary vector to the linker section 47. The generation of a binary vector depends on the distribution of CNUs over the liquid section 46, as described above. When a binary vector is output, the liquid section switches to operational mode. The binary vector is output to the linker section 47 that stores the received binary vector, preferably in a designated register, and then switches to operational mode. An exemplary register is shown at 96 of FIG. 9A. When the linker section 47 is in operational mode, all the outputs, which are received from the liquid section 46, are matched to the binary vectors which are preferably stored in the registers of the liquid section.

The learning mode provides the computational layer with the ability to learn and adapt to the varying environment. Breaking the environment into external data streams that represent context-dependent properties allows learning and adaptation at both the level of a single computational unit and at the global level of an architecture incorporating a large number of processing units. The learning mode provides the computational layer with a high dimensional ability of learning and adaptation which is reflected by the inherent flexibility of the computational layer to be adjusted according to new signals.

Such a learning process may be used to teach the computational layer to perform human-supervised operations. Performing such operations takes the user out of the loop as long as possible, until it is required to provide guidance in critical decisions. Thus the role of the human is significantly reduced.

During the operational mode, the computational core 100 receives the external data streams. The liquid section 46 processes the external data streams and, based thereupon, outputs a binary vector to the linker section 47. The linker section 47 compares the received binary vector with a number of binary vectors which preferably were stored or frozen into its registers during the learning mode, as described above. The linker section 47 may be used to output either a binary value, a vector representing the output of the liquid section, as explained below in relation to FIG. 27, or a value which is associated with a certain possible output of the liquid section. The linking function unit of the linker section 47 preferably outputs a certain current that indicates whether a match has been found to the received input. Preferably, the linking function unit updates a flag that indicates that an external data stream has been identified. As further described below, the core outputs are injected into central processing units that analyze all the outputs of the different cores and generate an output based thereupon.

Reference is now made to FIG. 10, which is a schematic illustration of the computational core 100 that is depicted in FIG. 2, and an additional output circuit 400. The additional output circuit 400 comprises a comparator 401, an AND gate 402, and an external bus interface 403. The output circuit 400 is connected to a controller 50 which comprises registers or 1, 2, 3, and 4 and which is updated according to the mode of the computational core 100 and related inputs and outputs. In the exemplary set which is depicted in FIG. 10, the value of register 1 is determined according to the input bus bits and the value of register 2 is determined according to the output bus bits. The value of register 3 reflects the current operation mode of the computational core. The value of register 4 is the outcome of a winner-takes-all algorithm, which is used to indicate whether or not the computational core 100 identifies the input external data stream, as further described below.

The outputs of the linker section 47 are transmitted via gates 401 and 402 to the external bus interface 403 when a flag in the controller 50 is set to indicate that a predefined input is recognized. The external bus interface 403 outputs the received transmission via output pins 48.

As described above, all the computational cores are preferably embedded in one electric circuit that constitutes a common logical layer. The computational cores receive, substantially simultaneously, signals originating from a common source. Each one of the computational cores separately processes the received signals and, via the output of the linker section 47, outputs a binary value. Preferably, all the outputs are transferred to a common match point, as described below.

The term "simultaneously" and "substantially simultaneously" may be understood as "at the same time" and "simultaneously in phase". The term "at the same time may be taken as within a small number of processor clock cycles, and preferably within two clock cycles."

Reference is now made to FIG. 11A, which is a block diagram of the structure of an exemplary computational layer 1 of a proactive computational unit, according to one embodiment of the present invention. The exemplary computational layer 1 comprises twelve computational cores 100, connected to a bus (not shown), an input 61, and an output 64. It should be noted that FIG. 11A is an exemplary diagram only and that any number of parallel-operating computational cores 100 which are connected by a bus can be considered as a computational layer 1. In use, arrays of thousands of computational cores may be used by the computational layer 1. The small number of computational cores which is used in FIG. 11A and in other figures has been chosen only for simplicity and clarity of the description.

As described above, each one of the computational cores 100 are designed simultaneously to receive an external data stream and to output, based thereupon, a discrete value. The discrete value stands for a certain signal which has been introduced to the computational core beforehand and a signature has been stored in memory in connection with the discrete value based thereupon. In one embodiment of the present invention, the computational layer 1 is used for classifying external data stream.

As described above, during the learning mode, a number of external data streams are injected to each one of the computational cores 100. Each computational core receives the external data stream and injects it to the liquid section. The liquid section output produces a unique output based on the received external data. The unique output is preferably stored in connection with a discrete value. A number of different external data streams or classes are preferably injected to each computational core that stores a number of respective unique outputs, preferably in connection with a respective number of different discrete numbers. Now, during the operational mode, after a set of unique outputs have been associated with a set of discrete values, the computational cores 100 can be used for parallel classification of external data streams which are received via the input 61. Such classification can be used in various tasks such as indexing, routing, string matching, recognition tasks, verification tasks, tagging, outliner detection etc.

Figure 11B:
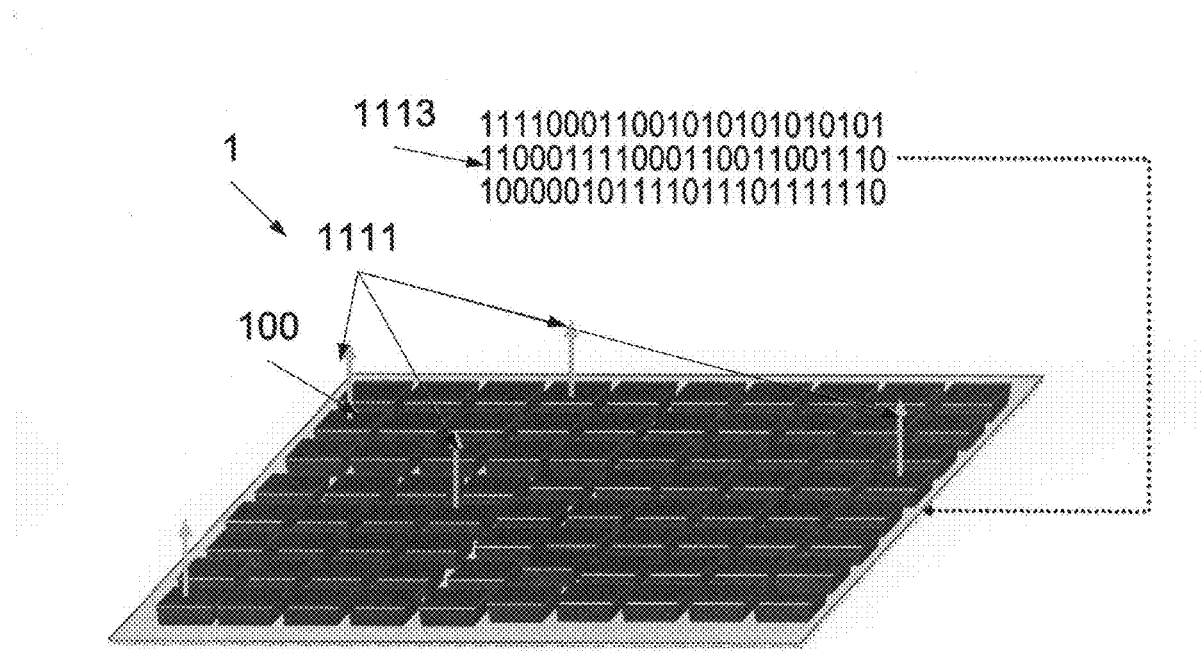
FIGS. 11B and 11C are exemplary computational layers, as FIG. 11A, that receive two different external data streams, according to one preferred embodiment of the present invention.
Figure 11C:
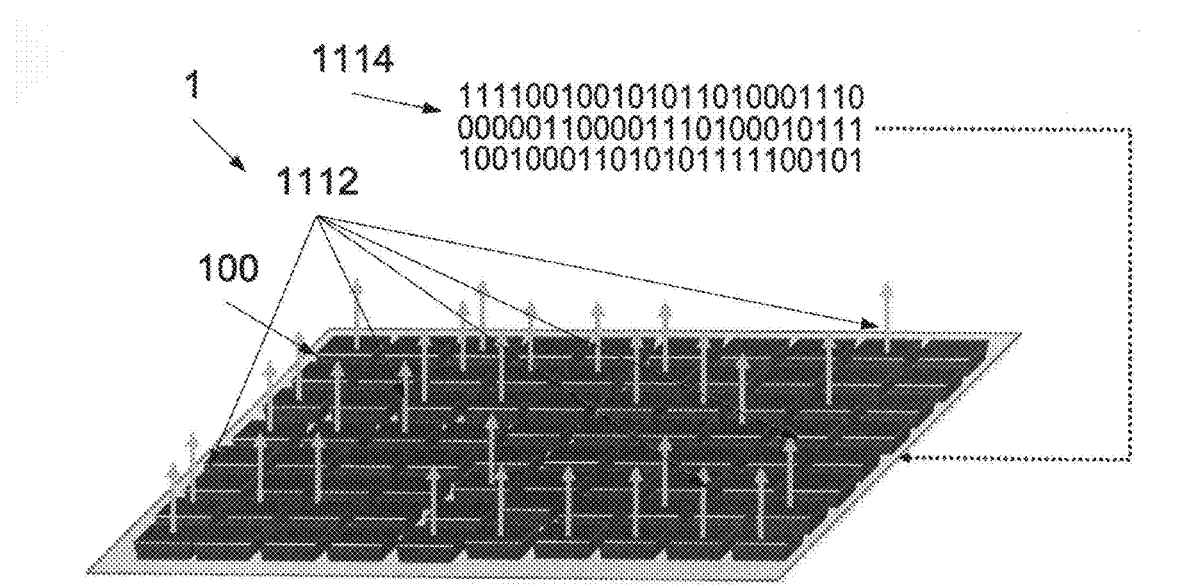

The discrete values are forwarded, via a common bus, to the common output 64, which is preferably connected to a central processing unit (not shown). The central processing unit concentrates all the discrete values which are received from the computational cores 100 and outputs a more robust classification of the received external data stream. For example, as depicted in FIG. 11B and FIG. 11C which are exemplary computational layers, as for FIG. 11A, that the layer receives two different external data streams 1113 1114 which are identified by different sets of computational cores 100. FIG. 11A depicts a set of computational cores 1111 that identifies a certain pattern X in the external data stream 1113, and generates core outputs based thereupon. FIG. 11B depicts another set of computational cores 1112 that identifies a certain pattern Y in the external data stream 1114, and generates other core outputs based thereupon.

As described below in relation to FIG. 31, the core outputs are forwarded to a central processing unit that uses one or more voting algorithms, such as a majority voting algorithm, for analyzing the outputs of the cores. The voting algorithms may be based on the Condorcet's jury theorem. The theorem states that where the average chance of a member of a voting group making a correct decision is greater than fifty percent, the chance of the group as a whole making the correct decision will increase with the addition of more members to the group. As the average chance of each one of the computational cores 100 to classify the received external data stream is greater than fifty percent and the central computational core receives the discrete values of a number of computational cores, the central computational core has better chances to accurately classify the received external data stream. It should be noted that the chances to accurately classify the received external data increase with the addition of more computational cores 100 to the computational layer 1.

In one preferred embodiment of the present invention, the computational cores 100 are divided into a number of subgroups, which are assigned to a respective number of tasks. In such an embodiment, each subgroup is programmed during the learning mode, as described above, to identify one or more patterns in the external data streams. For example, one subgroup of computational cores may be assigned to process voice signals, while another is assigned to process video signals of another. In such an embodiment, the outputs of one subgroup may be connected, via output 64, to one central processing unit, while another subgroup may be connected to another central processing unit.

Figure 34:
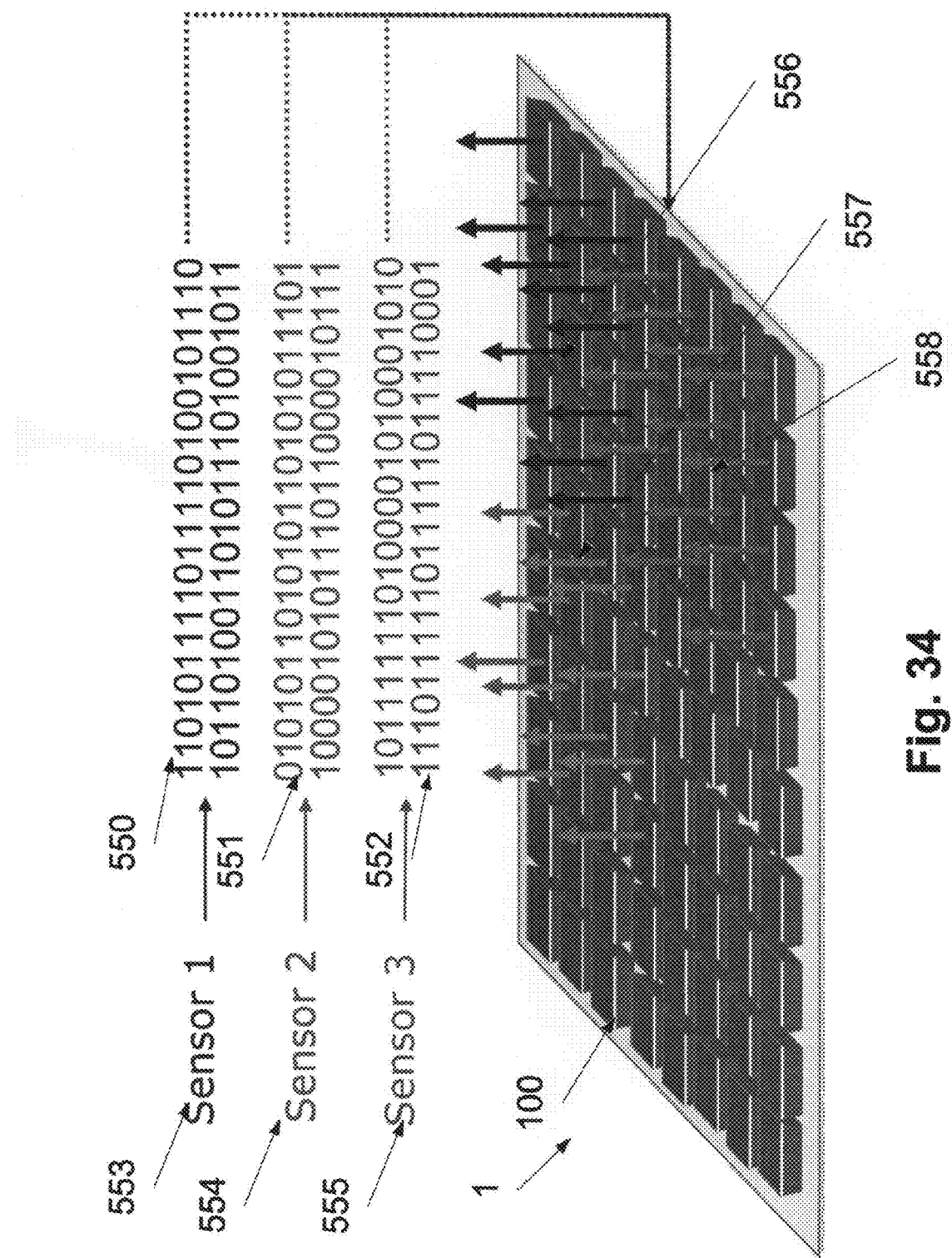
FIG. 34 is a graphical representation of a diagram of a computational layer, as depicted in FIG. 11A, in which the computational cores are divided to several subgroups, each receives inputs from another source, according to one embodiment of the present invention.

In one embodiment, as depicted in FIG. 34, which is a computational layer as depicted in FIG. 11A above, the computational layer 1 may be designed to process external data streams 550 551 552 obtained from many heterogeneous sensors 553 554 555, on many platforms. In such an embodiment, which may be used for data fusion applications, different subgroups of computational cores 556 557 558 are assigned to process external data streams which are originated from different sensors or platforms. In such an embodiment, external data streams which are received substantially simultaneously from different sensors such as sound and image sensors are processed in parallel by different subgroups of computational cores. Such an embodiment can be beneficial in speech recognition as the voice of the speaker and the motion of his lips can be analyzed in parallel.

It should be noted that the computational layer 1 may also be implemented as a software module which can be installed on various platforms, such as standard operating system like Linux, real time platforms such as VxWorks, and platforms for mobile device applications such as cell phones platforms, PDAs platforms, etc.

Such an implementation can be used to reduce the memory requirements of particular applications and enable novel applications. For example, for implementing a recognition task, a software module with only 100 modules that emulate computational cores is needed. In such an embodiment, each emulated computational core comprises 100 counters, which are defined to function as the aforementioned LTUs. The counters have to be connected or associated. Each core can be represented as an array of simple type values and the nodes can be implemented as counters with compare and addition operations.

Figure 12:
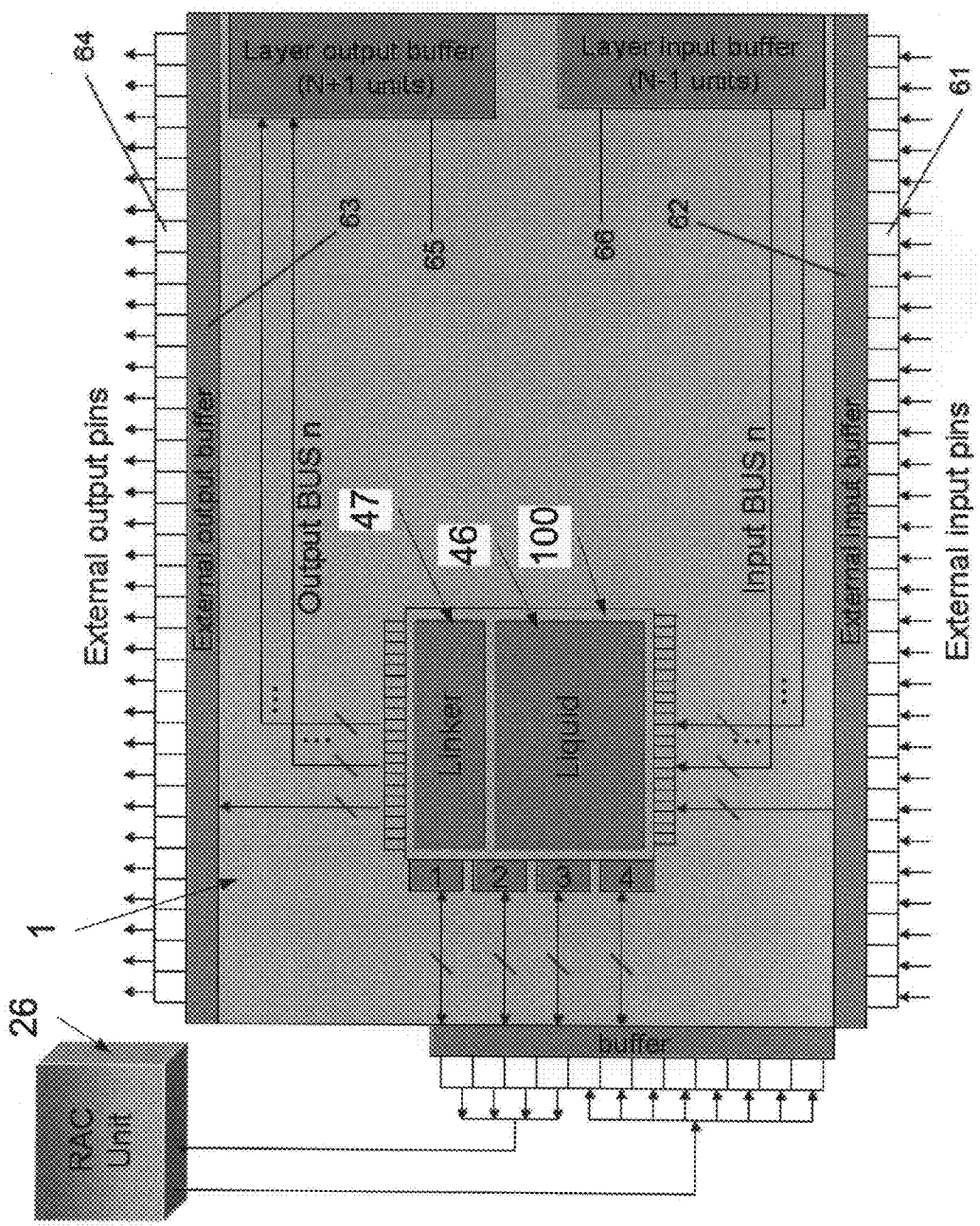
FIG. 12 is a schematic illustration that depicts the connections between an exemplary computational core and the computational layer, according to a preferred embodiment of the present invention.

Reference is now made to FIG. 12, which is a schematic representation of a computational core 100 and a computational layer 1, according to a preferred embodiment of the present invention. Although only one computational core 100 is depicted, a large number of computational cores 100 may similarly be connected to the computational layer 1. While the computational core 100 and computational layer 1 are as depicted in FIG. 11A, FIG. 12 further depicts the connections between the outputs and inputs of the exemplary computational core 100 and the inputs and outputs of the exemplary computational layer 1. It should be noted that the depicted computational core 100 is one of a number of computational cores which are embedded into the computational layer 1 but, for the sake of clarity, are not depicted in FIG. 12.

FIG. 12 further depicts a resource allocation control (RAC) unit 26 that is preferably connected to each one of the computational cores of the computational. layer 1. Each one of the computational cores 100 in the computational layer 1 is connected to a number of input and output connections. Input signals, which are received by the computational layer 1, are transferred to each one of the computational cores via a set of external input pins 61, through an external input buffer 62. Input signals may also be transferred to each one of the computational cores via a layer N−1 input buffer 66. When the computational layer 1 is one of a number of sequentially connected computational layers, the layer N−1 input buffer 66 is used to receive core outputs from another computational layer.

Core outputs from the computational cores 100 are received at a set of external output pins 64. The core outputs are transferred via an external output buffer 63. Preferably, if the core outputs have to be further processed, the outputs of the computational cores 100 may be sent to another computational layer, via a layer N+1 output buffer 65, as described below in relation to FIG. 13.

Reference is now made, once again, to FIG. 11A. As shown in the figure, each one of the computational cores 100 is preferably an autonomous unit that is connected separately to the inputs and outputs of the computational layer 1. That is to say, computational cores 100 belonging to the same layer are autonomous and do not require cross-core communication.

As no cross-core communication is required, segmentation of the external data-stream into properties (intrinsic dimensions) is simplified. For example, in the case that the external data stream is an audio waveform, the external data stream is segmented into sub-inputs and preprocessed by encoders for providing to the computational cores 100 with the desired input format. Alternatively, the external data stream may be first preprocessed by the encoder and then sub-divided into the computational elements or not sub divided at all. Thus, each property is represented by a temporal input with finite dimension and duration. The dimension is determined by the number of external pins of the input, as further described below, and the duration is determined and constrained by memory capacity of each one of the computational cores 100. The computational layer 1 and each one of the computational cores 100 are adaptively reconfigurable in time. The configuration at the computational cores 100 level is manifested by allocation of available cores for a specific sub-instruction, as described below in relation to FIG. 17B, while the other sub-instruction may be executed with different configuration of the computational cores. At the computational layer level, the reconfiguration is a dynamic allocation of numbers of layers and its connectivity to other layers, as described in relation to FIG. 17A. It should be noted that all the cores may process the same data without dynamic allocation.

Figure 14A:
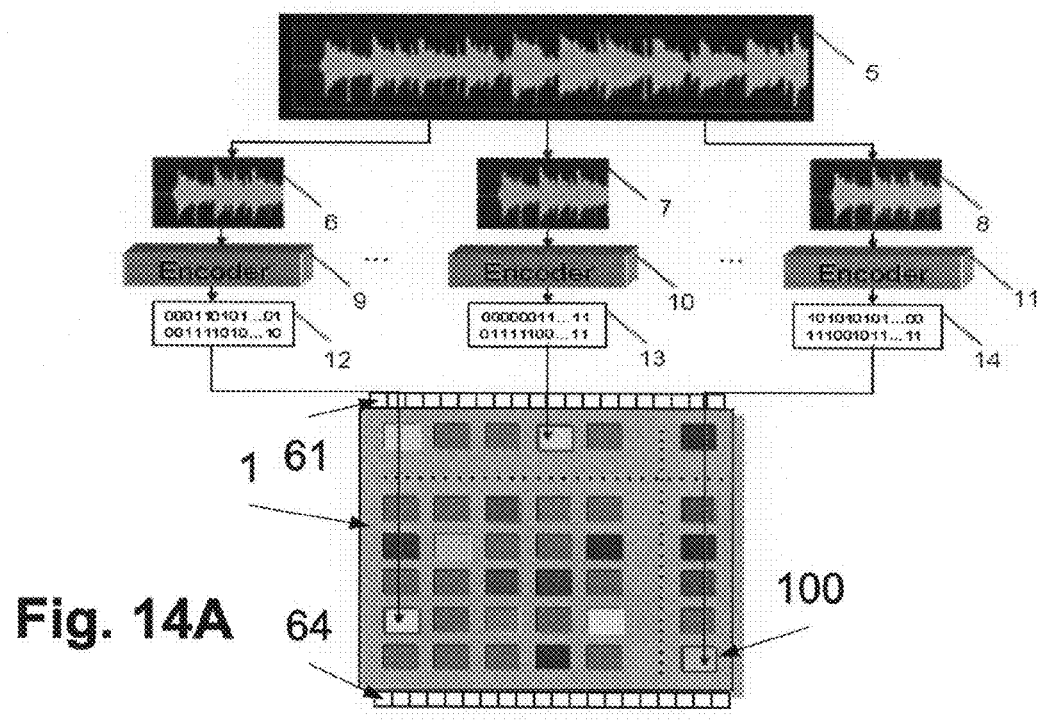
FIGS. 14A and 14B are schematic representations of a computational layer, as shown in FIG. 11A, which is connected to three encoders and to a single encoder, respectively, according to embodiments of the present invention.
Figure 14B:
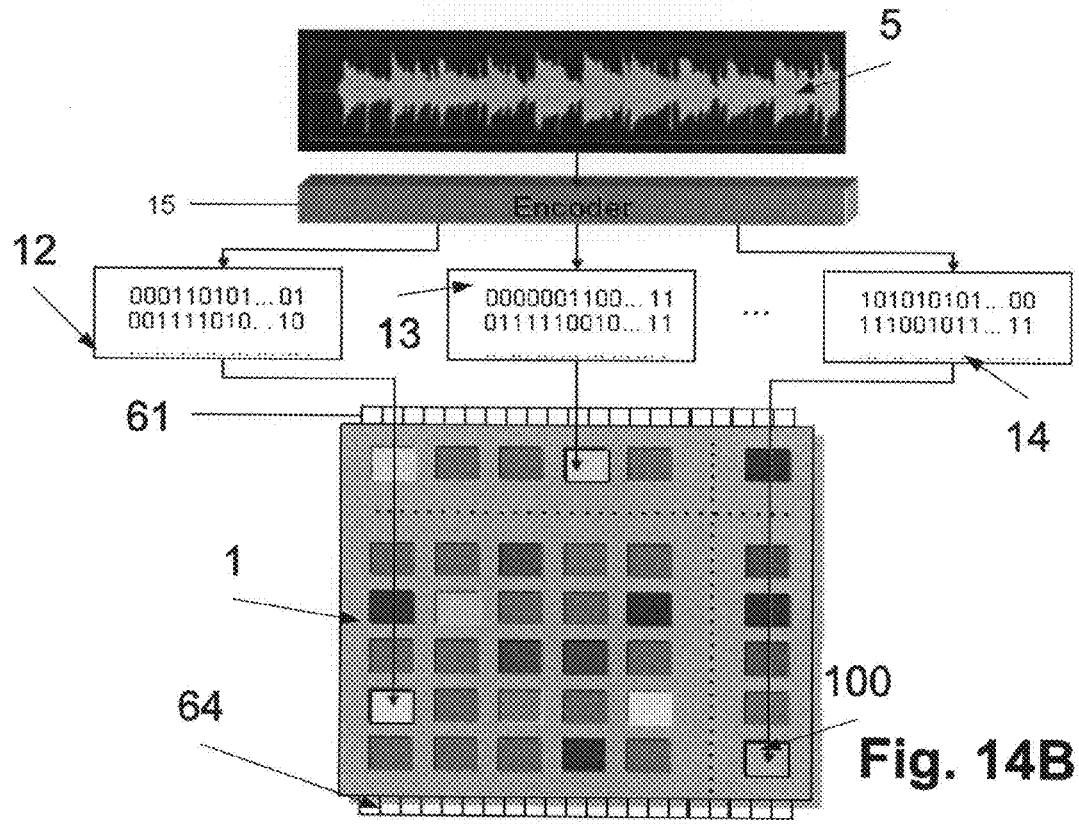

Reference is now made to FIGS. 14A and 14B, which are graphical representations of a computational layer 1, similar to that shown at FIG. 11A, which is connected to a single encoder 15 (FIG. 14B), according to one embodiment of the present invention and to a number of different encoders 9, 10, and 11 (FIG. 14A), according to another embodiment of the present invention. This embodiment may be used as a solution for any signal processing problem, such as signal recognition or classification. The external data stream 5 is preprocessed by the encoder 15, to transform the signal into a desired format. Different kinds of signals may be preprocessed by different signal-type-dependent encoders. In FIG. 14A, the external data-stream 5 is segmented into sub inputs 6, 7, 8 which are respectively preprocessed by a number of different encoders 9, 10, 11 into different digital streams 12, 13, 14. Preferably, each one of the encoders 9, 10, 11 is designed to encode the sub input it receives according to an encoding scheme which might be different from the encoding schemes of the other encoders. Preferably, as shown in FIG. 14B, the external data stream 5 is divided into the digital streams only after the single encoder 15 has preprocessed it.

As depicted in FIGS. 14A and 14B, each one of the digital streams 12, 13, 14 constitutes a temporal input with a finite dimension and duration. The number of the external input pins 61 of the computational layer 1 determines the finite dimension of the temporal input. The memory capacity of the computational cores determines the duration to which the temporal input is limited.

As described above, the digital streams 12, 13, 14 are transmitted through the external input pins 61 of the computational layer 1 to all the connected computational cores 100. Preferably, the external data stream 5 is continuous in time and is not broken into data packets. It should be noted that different computational cores 100, which receive different digital streams 12, 13, 14, may asynchronously generate core outputs.

The external data streams 5, which are preferably based on signals from the real world such as sound and image waveforms, are usually received in a continuous manner. In order to allow processing thereof by the computational cores, the encoder 15 or encoders 9, 10, 11 have to segment the streams into inputs, each with a finite length. The input streams, which are encoded according to the received external data stream 5, may be segmented according to various segmentation methods. Such segmentation methods are well known and will not, therefore, be described here in detail.

Figure 15A:
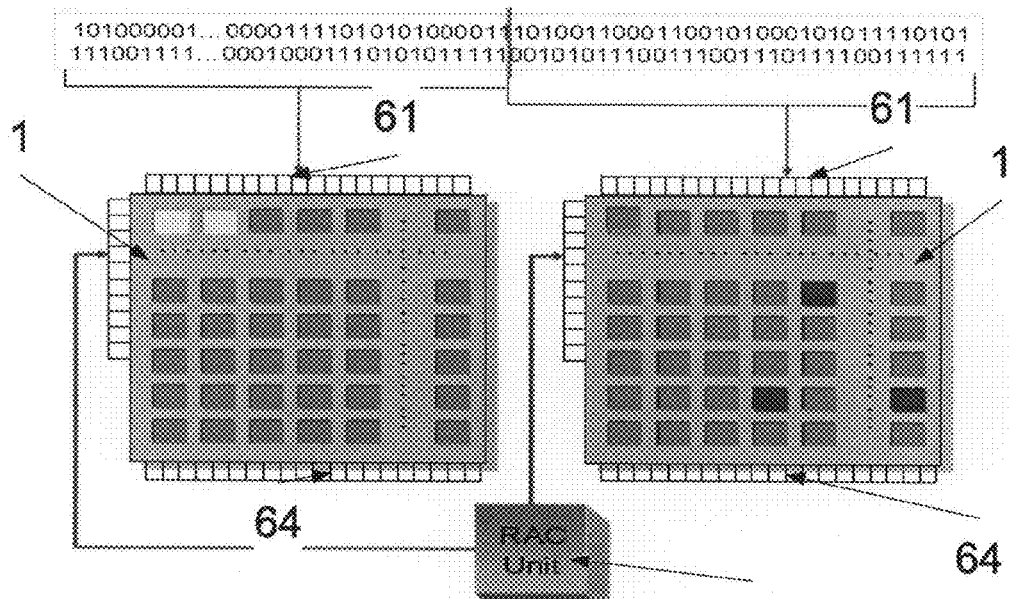
FIGS. 15A and 15B are schematic representations of the implementation of hard-coded division and dynamic division, respectively, of an external data stream, according to embodiments of the present invention.
Figure 15B:
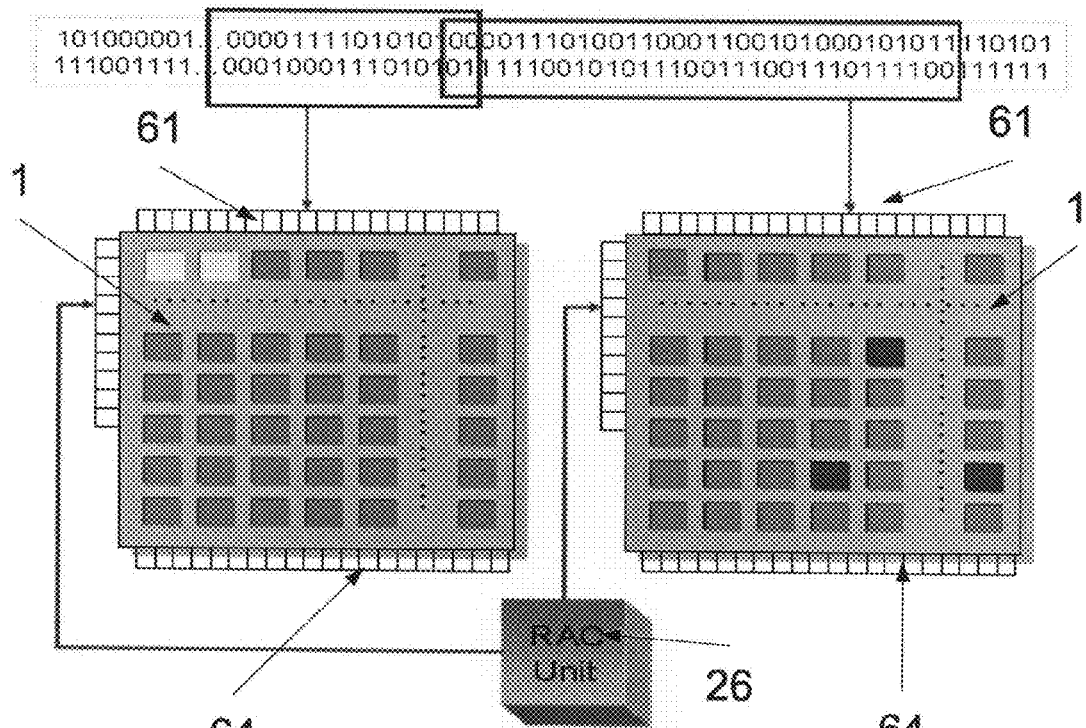

In one embodiment of the present invention, more than one computational layer 1 is connected in parallel to a common input. An example for such architecture is shown in FIG. 15A that depicts a digital stream, which is encoded according to a received external data stream and is divided between the computational cores according to a hard-coded division method. It should be noted that the external data stream may be divided according to different properties of the external data stream. FIG. 15B depicts another embodiment of the present invention in which the external data stream is divided according to a dynamic division method. In such a division method, different segments are transmitted in parallel to different cores. The segment that one computational core receives may have a different length from those received by other computational layers. The segments which are received by different computational cores may overlap.

Figure 13:
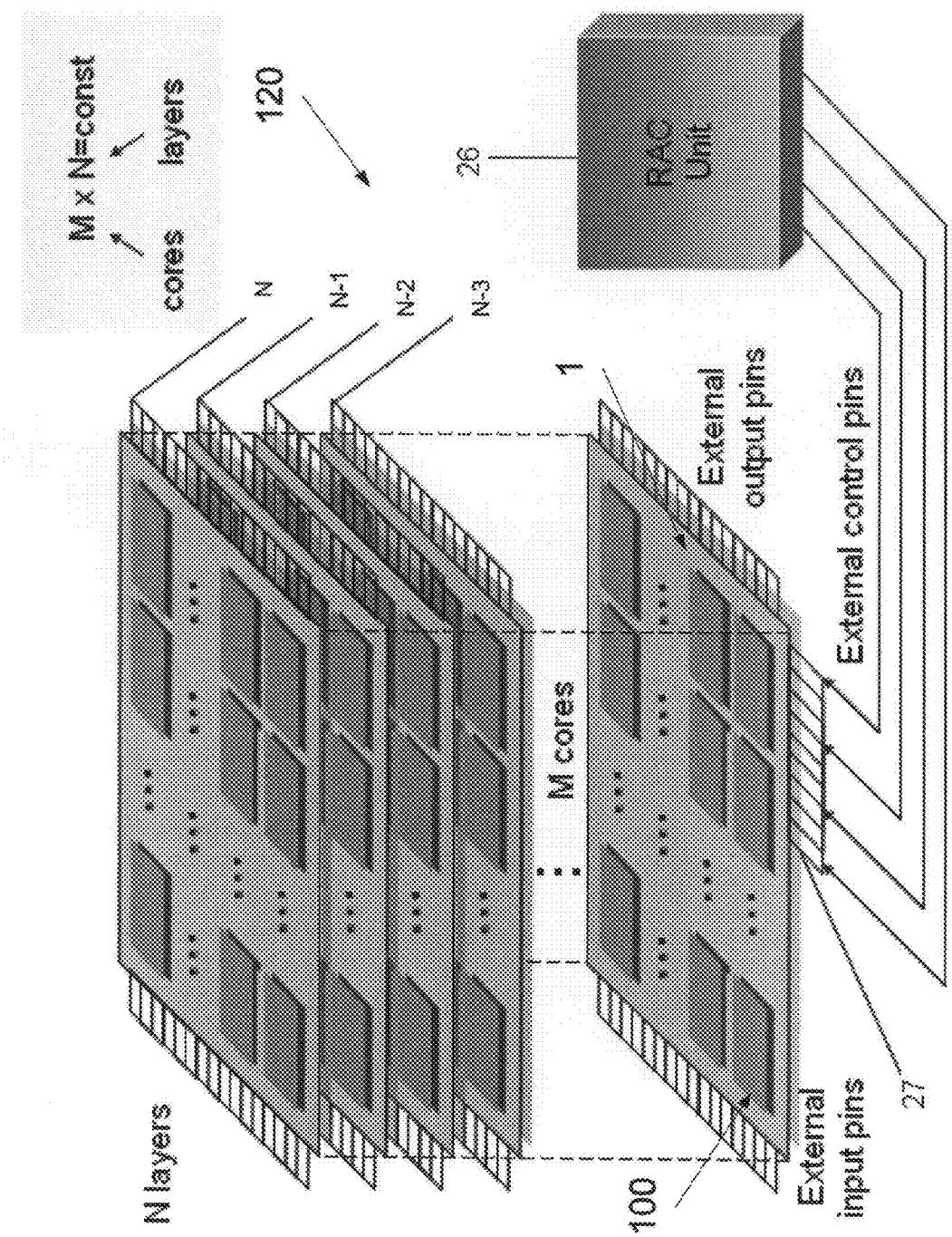
FIG. 13 is a schematic illustration of a proactive computer which is based on a number of sequential computational layers, according to a preferred embodiment of the present invention.

Reference is now made to FIG. 13, which is a schematic representation of a proactive computational unit 120, according to one embodiment of the present invention. The RAC unit 26, the computational layer 1, and the connections between them are as depicted in FIG. 12, however, FIG. 13 further depicts a set of additional layers N−3, N−2, N−1, N which are sequentially connected to each other, where there are N layers in total.

The number of computational cores in each computational layer may be different. The distribution of the cores in the layers is task-dependent and is preferably performed dynamically. The allocation of the number of cores per layer M and the number of layers N in the proactive computational unit 120 is determined by the RAC unit 26, in a manner such that N*M remains constant. The RAC unit 26 communicates with each one of the computational layers 1 . . . N−3, N−2, N−1, and N through a related set of control pins, as shown at 27. The computational layers are preferably connected in a sequential order.

Figure 16A:
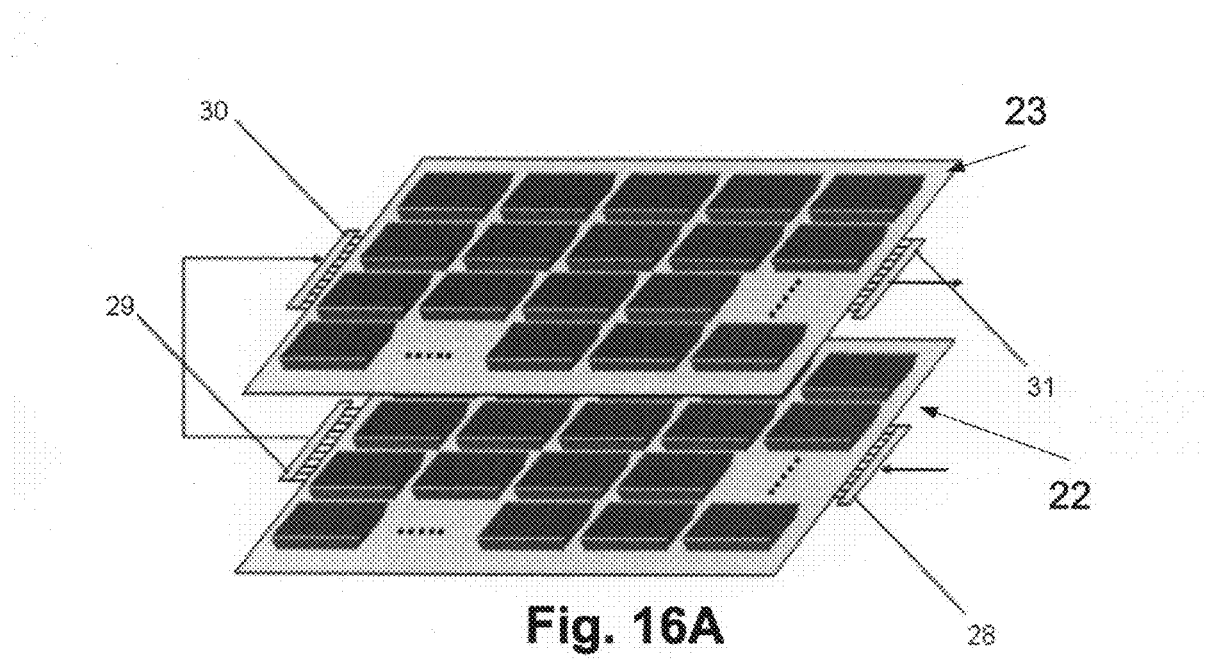
FIG. 16A is a schematic representation of two connected computational layers, according to a preferred embodiment of the present invention.
Figure 16B:
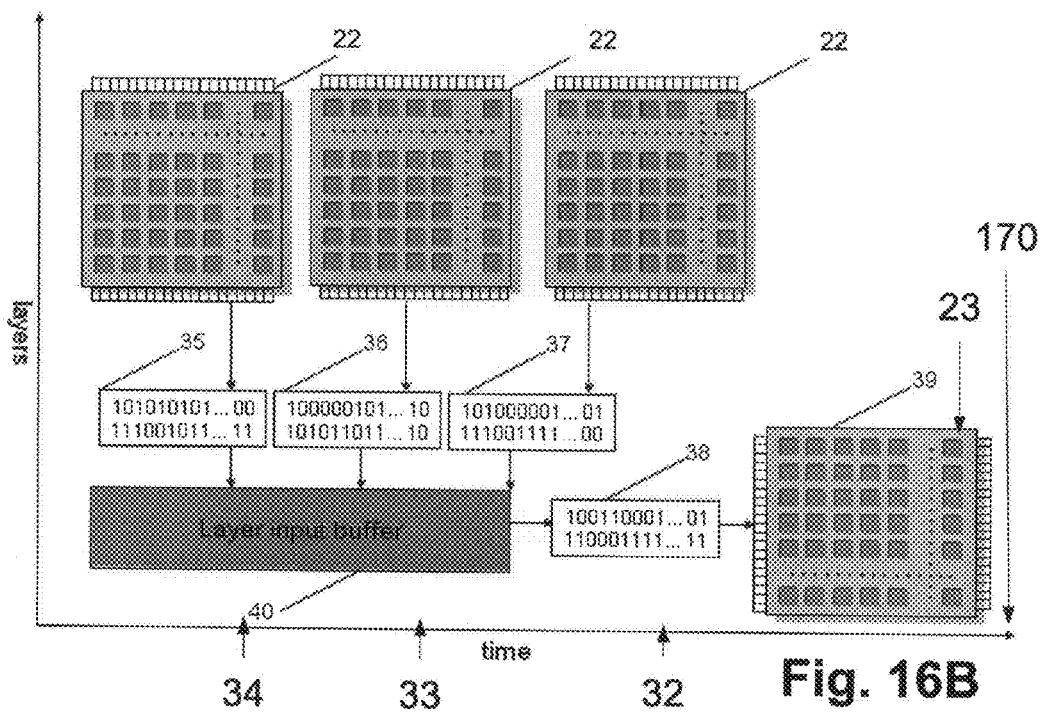
FIG. 16B is a graphical illustration of the communication between two computational layers during a certain period, according to a preferred embodiment of the present invention.

FIG. 16A, which is a schematic representation of two computational layers 22 and 23, depicts such a connection. The communication between the two computational layers 22 and 23 takes place through the external input pins 28 and 30 and external output pins 29 and 31 of the layers, respectively. As depicted in FIG. 16A, the communication is from the external output pins 29 of the first layer 22 to the external input pins 30 of the second layer 23. Such an embodiment allows the outputs of the first layer 22 to be integrated in time before they are entered into the second layer 23. An example of such time integration can be found in FIG. 16B, which is a graphical representation of the communication between the first and second layers 22 and 23 during a certain period 170. The first layer 22 is depicted in three consecutive time periods 32, 33, 34, during which it sends respective outputs 35, 36, 37 to a buffer 40. The buffer 40 gathers all the received outputs 35, 36, 37 and integrates them into a new data stream 38. The new data stream 38 is sent to the second layer 23 in period 39.

Figure 17A:
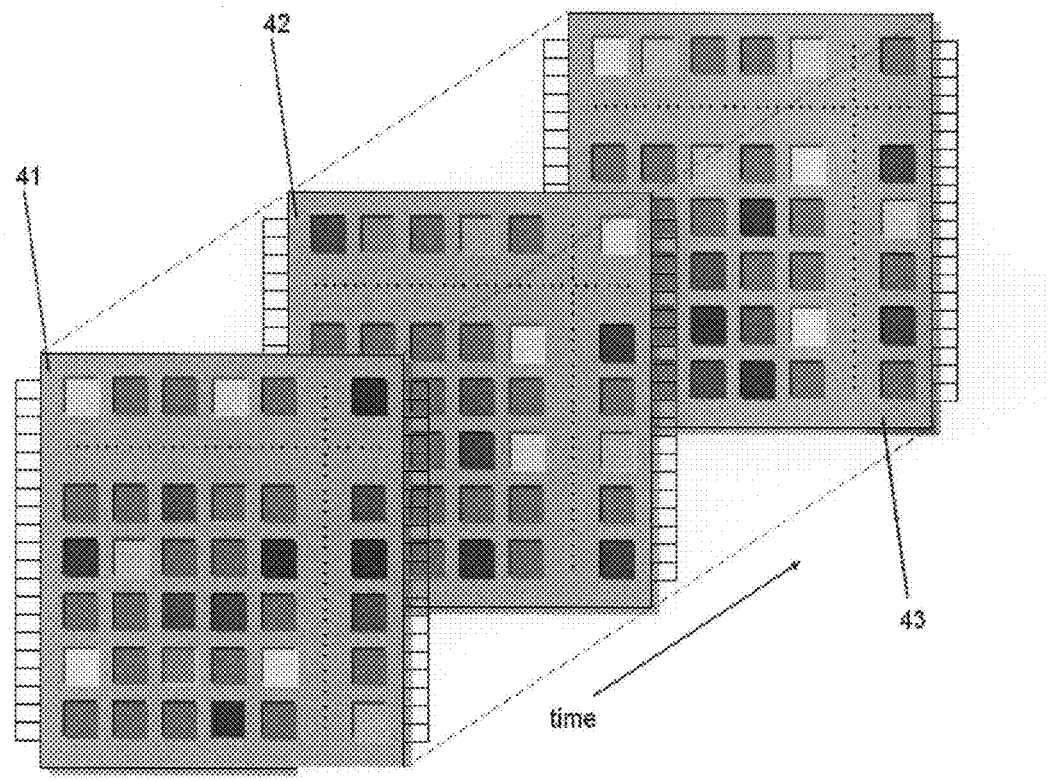
FIGS. 17A and 17B are graphical representations of sequential computational layers and the connections between them, according to a preferred embodiment of the present invention.

The architecture of the computational layers and cores is adaptively reconfigurable in time. The configuration at the computational cores' level is manifested by allocation of available cores for a specific sub-instruction, while another sub-instruction may be executed using a different configuration of the cores. For example, as depicted in FIG. 17A, which is a graphical representation of a computational layer in three different sub-instructions, for each sub-instruction 41 42 43 different configuration of the cores is used.

Figure 17B:
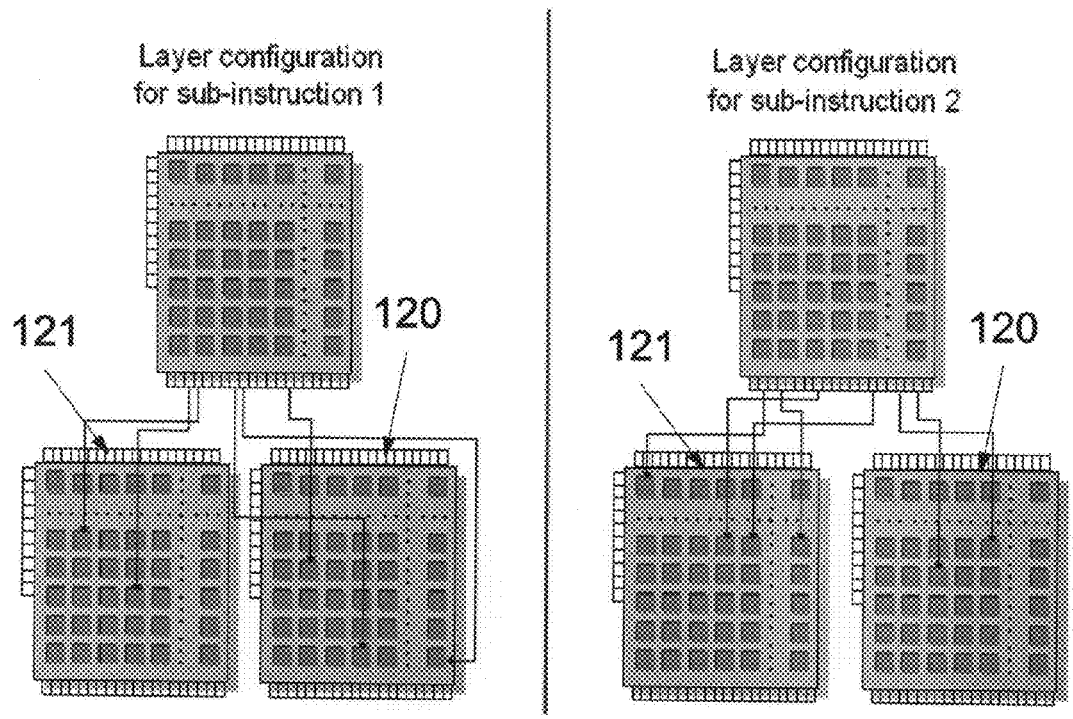

The configuration at the layers' level is depicted in FIG. 17B. The Figure depicts two possible connection schemes 120 and 121 between the computational cores of a first computational layer and two other consecutive computational layers. The configuration of the connections is dynamically arranged by changing the connection between one or more computational layers. As depicted in FIG. 17B, the connections between the external output pins of one computational layer and one or more external input pins of another computational layer are reconfigurable.

Figure 18:
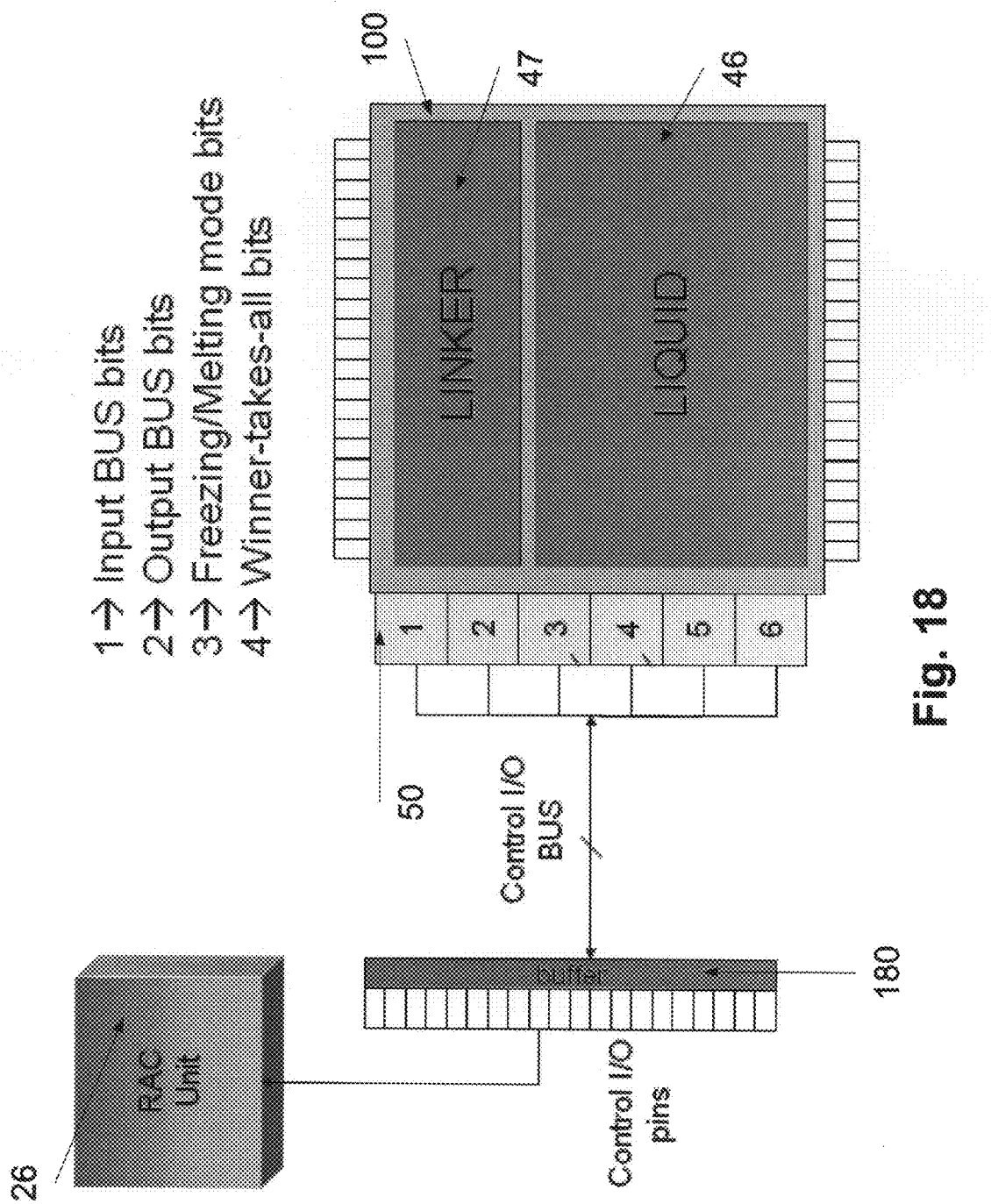
FIG. 18 is a schematic representation of the computational core of FIG. 2 and a connection thereof to a resource allocation control unit, according to a preferred embodiment of the present invention.

Reference is now made, to FIG. 18, which is a schematic representation of the computational core 100 of FIG. 2 and a connection thereof to the RAC unit 26. As depicted in FIG. 18, the exemplary control unit 50 is connected to the RAC unit 26 via an I/O control BUS and I/O control pins 180. As described above, each one of the computational cores 100 is designed to operate in both learning and operational modes.

During the operational mode, as described above, each one of the cores is designed to generate a core output, such as a binary value or a binary vector, if a match has been found between the information, which is stored in one of its registers, and the presented input. In the simpler embodiments the core output is a binary value. Thus, only when a computational core identifies the presented input will it generate an output. As all the computational cores are connected to the RAC unit 26, the RAC unit can identify when one of the computational cores has identified the presented input. This allows the execution of a "winner-takes-all" algorithm. When such a scheme is implemented, if one of the cores recognizes the presented input, it raises a designated flag and thereby signals the RAC unit, that the presented input has been identified.

In a preferred embodiment of the present invention, the computational layer enters the learning mode if none of its computational cores 100 recognizes the presented input. When the presented input is not recognized by any of the computational cores, the entire layer switches to learning mode. As each one of the computational cores 100 is connected to the RAC unit via a separate connection, this allows the RAC unit to recognize when a certain input is not recognized by any of the computational cores 100. Preferably, each computational core 100 signals the RAC unit 26 or a central computing device that it did not recognize the received input by changing or retaining a binary value in control unit 50. The computational layer stays in the learning mode until at least one of the cores recognizes the presented input and signals the RAC unit 26, preferably by raising a flag.

As described above, the proactive computational unit is based on asynchronous and parallel operation of multiple computational cores. Such a proactive computational unit may be used for various signal-processing applications.

Figure 19:
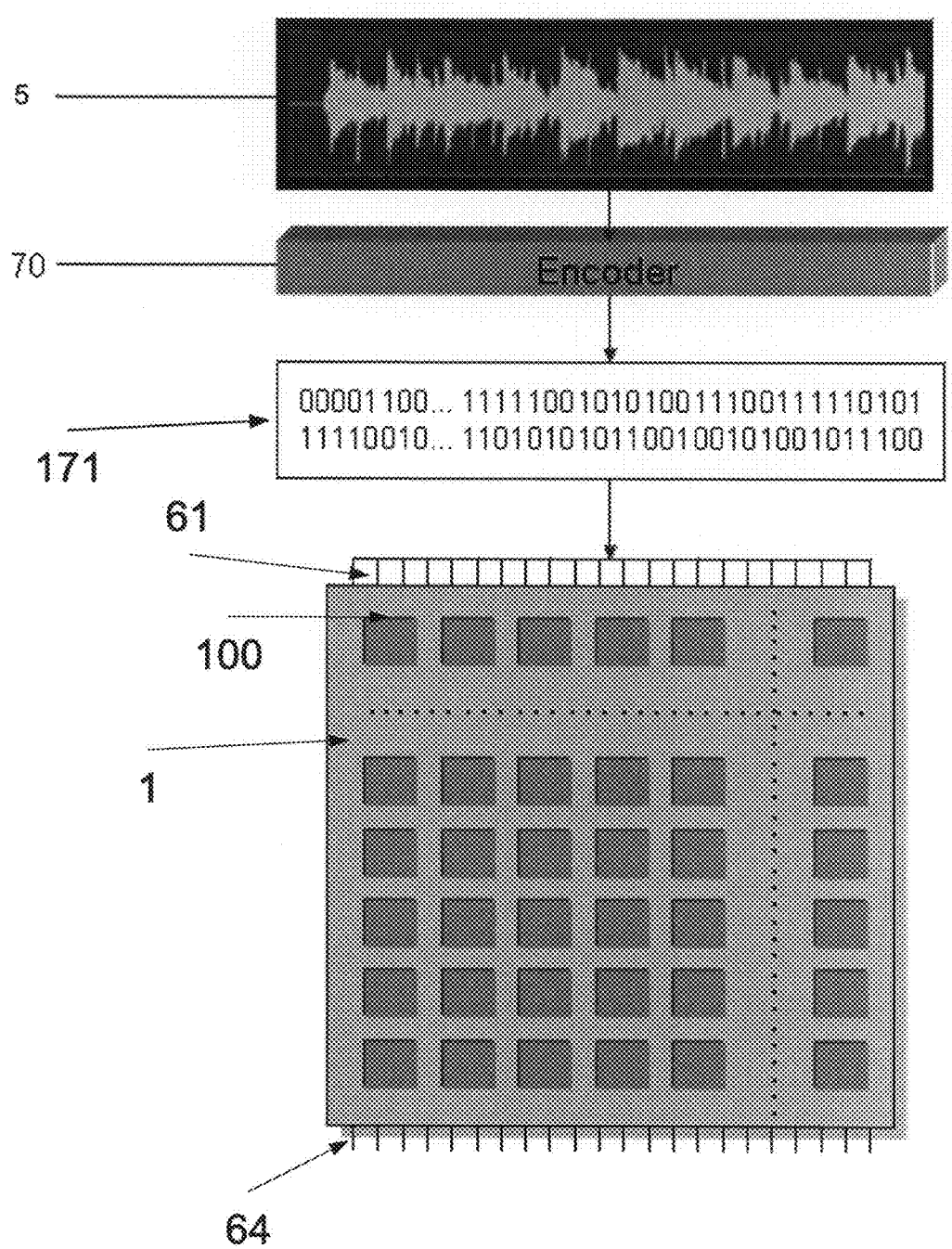
FIG. 19 is a schematic representation of a computational layer that is connected to a single encoder, as shown in FIG. 14B, according to an embodiment of the present invention.

Reference is now made to FIG. 19, which is a schematic representation of a computational layer 1 that is connected to a single encoder 70, similar to that shown in FIG. 14B, according to another embodiment of the present invention. As depicted in FIG. 19, an external data stream 5, such as a voice waveform, an image waveform, or any other real world output, is encoded by the encoder 70. Based thereupon, the encoder generates an encoded signal 171, such as a digital stream or a signal in any other desired format. It should be noted that, as different signal-type-dependent encoders may preprocess different kinds of signals, the encoder 70 which is used is chosen according to the received signals. The encoded signal 171 is transferred, as described above, to the computational layer 1 in a manner such that each computational core 100 receives the entire input. Now, each one of the computational cores processes the received encoded signal 171 and, based thereupon, generates an output, such as a binary value. As the internal architecture of all the computational cores 100 is generated in a random manner, according to different parameters, in order to ensure distribution and heterogeneity among the computational cores, each core maps the given signal into a different location.

Figures 20, 21:
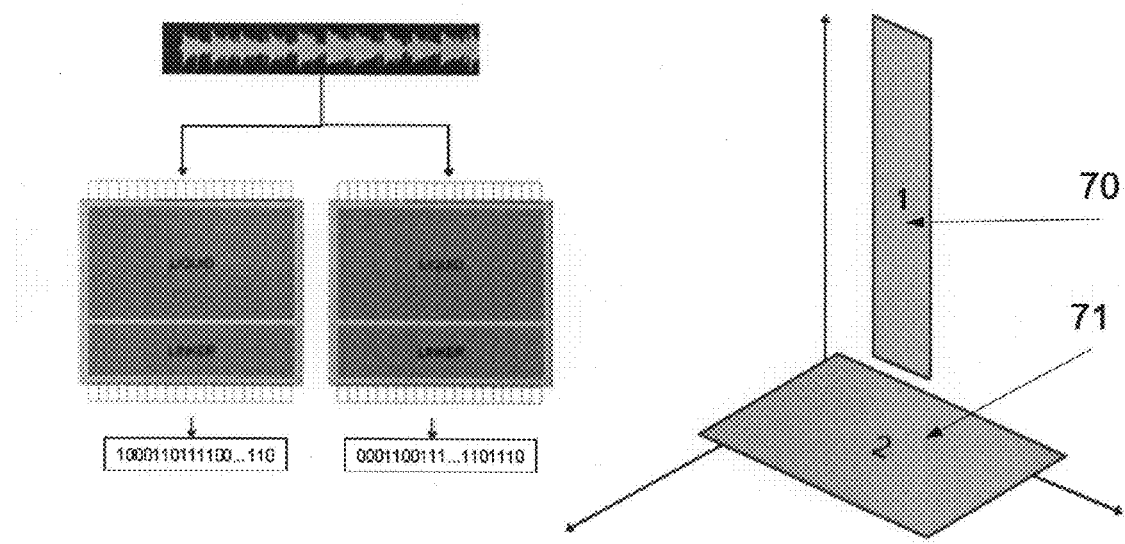
FIG. 20 is a graphical representation of a three dimensional space representing the outputs of a computational core, according to an embodiment of the present invention.
FIG. 21 is a table of reporting units in a computational layer with twelve computational cores, according to an embodiment of the present invention.
Figures 25B, 25C:
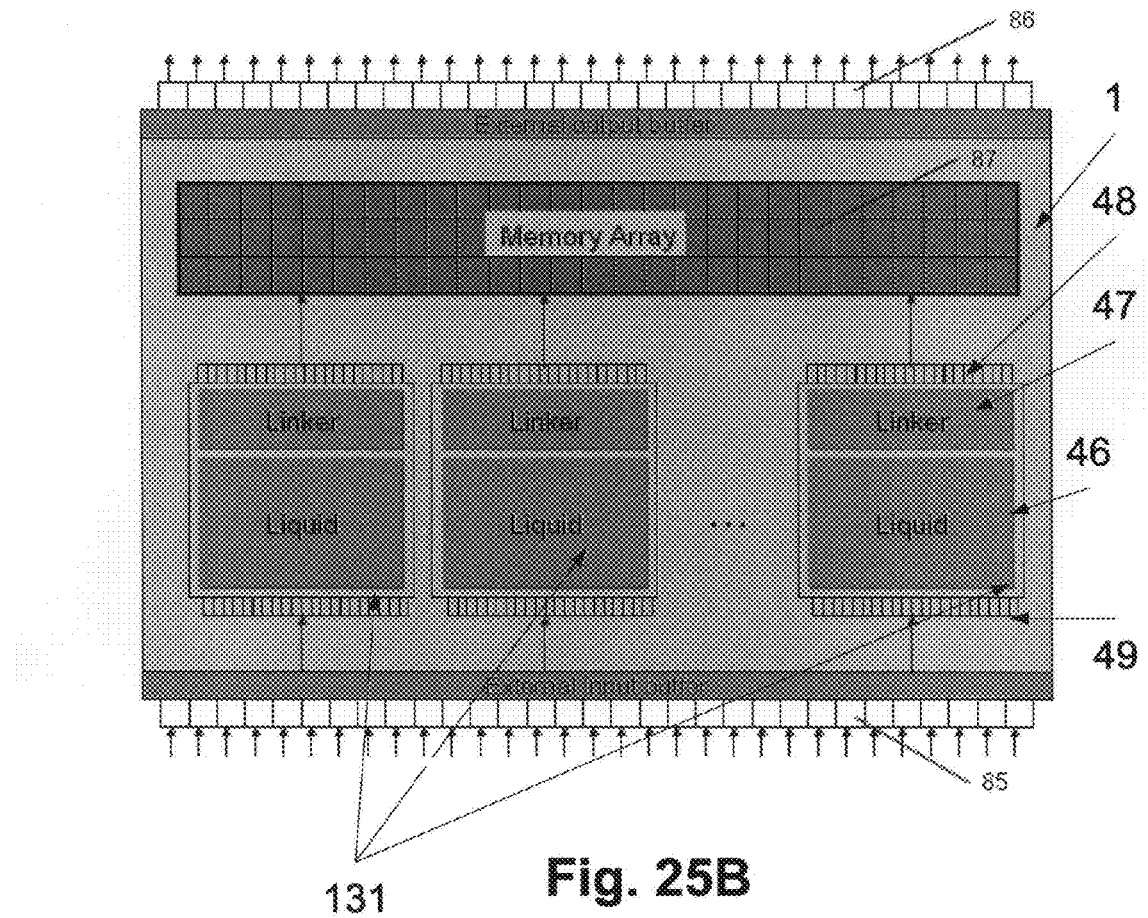
FIG. 25B is a schematic representation a computational layer, according to a preferred embodiment of the present invention.
FIG. 25C is an exemplary memory array, according to a preferred embodiment of the present invention.

Reference is now made to FIG. 25B, which is a schematic representation of a computational layer 1. Each computational core 100 and the external output and input pins 48 and 49 are as depicted in FIG. 12. In FIG. 25B, however, the computational layer 1 further comprises a memory array 87. Each one of the computational cores 100 is preferably connected to a different cell in the memory array. As described above, each one of the computational cores is randomly structured. Therefore, the reaction of different computational cores to a certain signal is not homogenous. As each computational core is randomly structured, the scope of possible outputs of the liquid section 46 of the computational core can be represented in a three dimensional space, as depicted in FIG. 20. The outputs of different computational cores 100 are transmitted to different locations in the space, as shown at 71 and 72 of FIG. 20. The transformation of the outputs of the computational cores 100 into a setting on a spatial-temporal map is a non-linear process that enables the generation of complex spatial maps of different groups of computational cores. In order to adjust a unique spatial map to a particular input signal, one or more reporting LTUs are chosen in each one of the computational cores. The number of reporting LTUs which are defined in a certain computational core for one input signal varies between one LTU and the total number of LTUs of the computational core. That is anything between one and all of the LTUs can report for any given input signal.

Preferably, in order to increase the scope for identified signals, the reporting LTUs may be defined using a time function. For example, as shown in FIG. 21, a certain computational layer comprises twelve computational cores with different LTUs as reporting LTUs in different time quanta 73, 74, and 75. For example, in the first time quantum 73, only one reporting LTU, which is marked as LT66, is chosen as a reporting LTU. Two reporting LTUs, which are marked as LT66 and LT89, are chosen in the second time quantum 74. In the third time quantum 75 two different time reporting LTUs, which are marked as LT66 and L7A4, are chosen.

Figure 22:
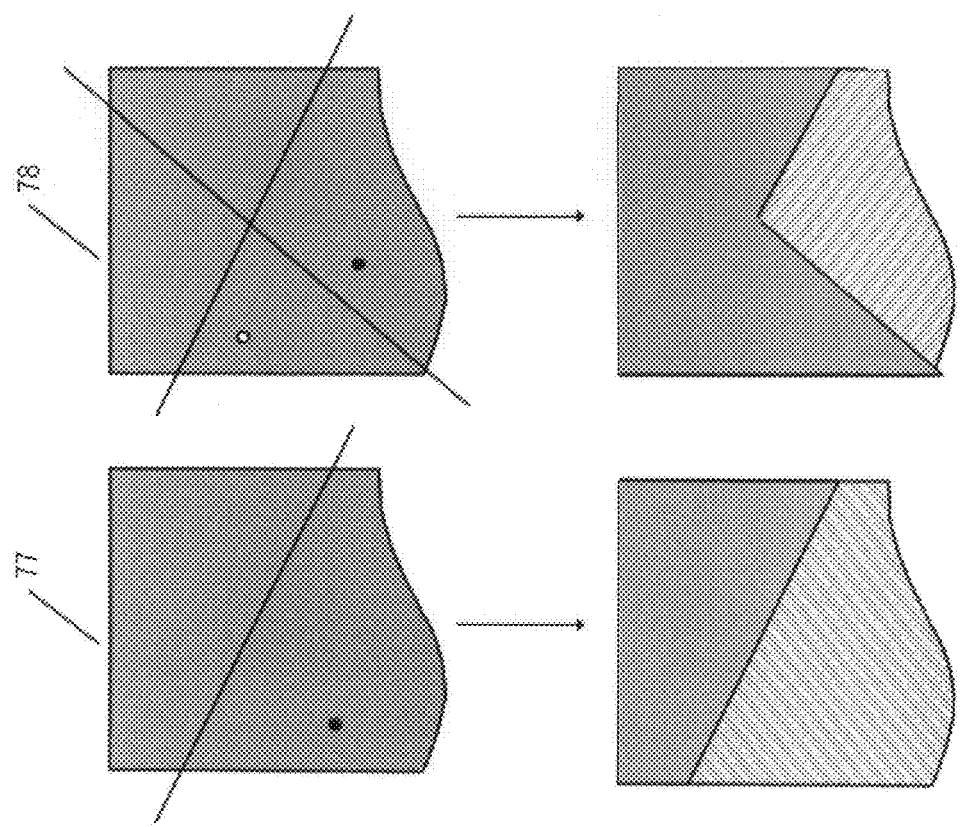
FIG. 22 is a graphical representation of a two dimensional space representing the outputs of a computational core, according to an embodiment of the present invention.

As described above, each one of the LTUs outputs a binary value, thus by choosing one reporting LT, the space represented by each core is divided into two sub-spaces/planes, and a given signal is ascribed to only one sub-space. Respectively, by choosing two reporting LTUs, a two bit response is possible and the space is divided into four sub-spaces. Thus a given signal is ascribed to one sub-space of four. As different subspaces are associated with different signals, each core may be used to identify a number of different signals. FIG. 22 is a graphical representation of the division of a certain space into two subspaces by using one reporting value, as shown at 77. By choosing two reporting LTUs, the space may be divided into four subspaces, as shown at 78. By adding additional reporting LTUs, one can divide the space of a certain computational core as much as necessary.

During the learning process, the system preferably receives a number of samples of a given signal, and these are sent to the various cores to learn the signal. The variations of the signal are typically the signal with added noise, the same word spoken by people with different accents etc. In order to ensure the identification of variations of the given signal during the operational mode, the computational core has to locate all the variations of the same signal in the same sub-space. Since the sub-spaces, generated by dividing the total-space with several reporting LTUs, are quite large, the task of clustering the signal into one sub-space is feasible.

As described above, since all the cores in the system are heterogeneous, each core represents the given signal differently within its own space, thus generating n different signal spaces where n denotes the number of cores in the computational layer. Thus, each input signal is located by n computational cores in n different signal spaces.

Figure 23:
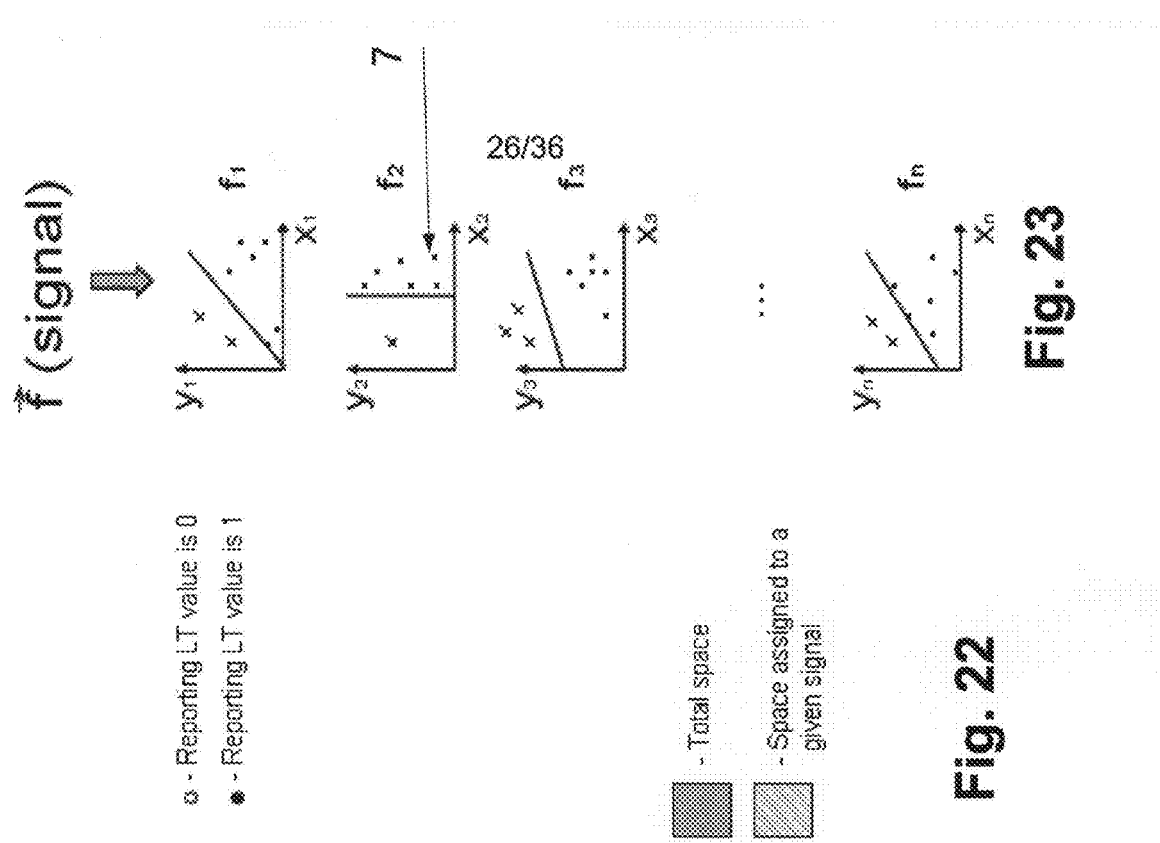
FIG. 23 is a set of graphs at an example which depict the outputs of different computational cores in a two dimensional space, according to an embodiment of the present invention.

Reference in now made to FIG. 23, which is a set of graphs representing the transformation of a signal into n different spaces, each corresponding to one of the computational cores. This set depicts a projection of signals by each of the computational cores into two-dimensional spaces, representing the state indicated in this example by the LTUs. Each dot 79 in the n graphs represents a core state of one of the n computational cores to 1 sample of a given class. Functions f1, . . . , fn divide the core spaces such that more than 50 percent of the signals all core outputs of a certain signal are mapped into the same subspace or plane. Preferably, for each given signal received by the computational layer during the learning mode, a unifying three-dimensional subspace is generated by conjugating all the subspaces that were generated by different computational cores during the learning process. An example of such a conjugation process is exemplified by FIG. 24, wherein there are depicted two different subspaces 191 and 192, which have been generated by different computational cores during the learning process in response to a certain signal. The two different subspaces 191 and 192 are designed to exploit the combined decision making capabilities of the two cores as depicted in the example of FIG. 23, and to identify a certain signal during the operational mode.

In such an embodiment, the learning process may be divided into several steps:
1) Indexing LTU—associating one or more reporting LTUs with a novel signal.
2) Mapping—allowing all the computational cores of the computational layer to receive the novel signal several times.
3) Defining—storing a set of computational cores as reporting cores. The set may comprises some or all of the cores. The chosen reporting cores are preferably computational cores that consequently identify the novel signal or a set of signals belonging to the same class. Each reception of the novel signal or a signal belonging to a set of signals of the same class reduces the number of reporting cores, as fewer computational cores consequently identify the novel signal as the number of reception iterations increases. Preferably, the reception iterations last until a stable signal, representing a conjugated subspace, remains.

Figures 24, 25A:
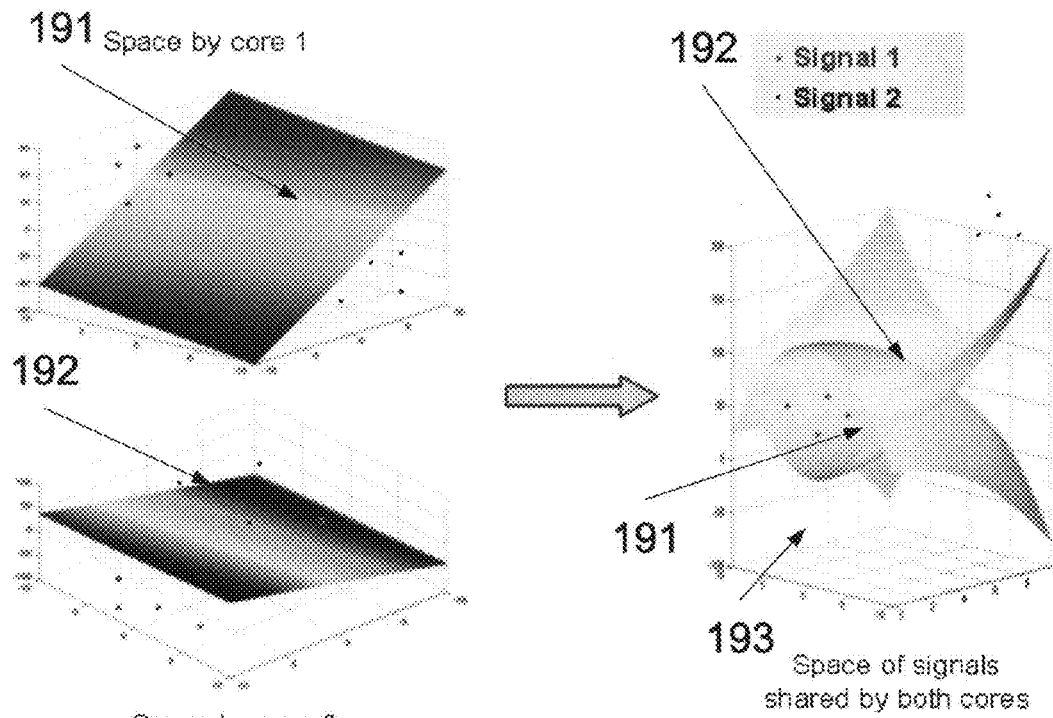
FIG. 24 is a graphical representation of two different subspaces and a conjugated subspace used to identify a certain signal during the operational mode, according to an embodiment of the present invention.
FIG. 25A is a table representing the outputs of a computational layer with twelve cores for different patterns form the same class, according to an embodiment of the present invention.

The table, which is depicted in FIG. 25A, depicts the outputs of predefined reporting LTs of a computational layer with twelve cores. Each computational core has a common reporting LTU, which is designed for seven reception iterations for each novel signal. A table cell, which is colored gray, indicates that the related computational core reacts to the reception of the novel signal during the related reception iteration. A table cell colored white indicates that the related computational core did not react to the novel signal in the related reception iteration. In the exemplary table, all the computational cores output a response in the first reception iteration. At this stage, all the cores may be considered as reporting cores. In response to the second reception iteration, computational core 8 is assumed to be unstable and is excluded from the group of reporting cores. In the third reception iteration, computational cores 1 and 11 are also removed from the group of reporting cores. After the seven reception iterations, only the most stable cores 2, 7, and 12 are left in the group. Preferably, a minimum number of computational cores are defined, in order to avoid emptying or over-diminishing the group of reporting cores during the reaction iterations.

Preferably, for each novel signal, reporting cores are chosen according to statistical analysis. In such an embodiment, a reporting core is chosen according to a certain threshold, such as the percentage of positive responses to the novel signal within a given set of reception iterations. For example, if the threshold is set to 100% only computational cores 2, 7 and 12 are considered as reporting cores. If the threshold is set to 80%, cores 3 and 6 are also considered as reporting cores.

Preferably, at the end of the learning process, after reporting cores are defined, the reporting cores and the index of the corresponding signal are stored in a memory array 87, as shown in FIGS. 25B and 25C. During the operational mode, the memory array is matched with the outputs of the computational cores, and if there is a match between the response of the computational cores and a particular memory column, a relevant signal index is extracted and transmitted via the external pins of the computational layer.

Reference is now made to FIG. 26, which is a schematic illustration of a computational core 131 for processing one or more data streams, in accordance with one embodiment of the invention. The liquid section 46 and the linker section 47 are as depicted in FIG. 2. In FIG. 26, however, the computational core 131 further comprises an encoding unit 132, say for uses such as identifying viruses in incoming data. The computational core 131 is a hybrid analog-digital circuit which maps temporal segments of binary streaming data $$\overset{\perp}{S}(|t < t_s|)$$

into cliques or signatures. As described above, binary values are represented by two constant voltage levels $V_{high}$ and $V_{low}$. The liquid section 46 is defined for passing, blocking, or classifying received inputs. The unique signature of the received input, the clique, is represented in the linker section 47 of the computational core as an LTU clique. An LTU clique is a vector with a finite length, having several discrete values. The values of the LTU clique vector encode the LTUs that were found to be responsive to certain input. Such an embodiment allows the association of unique strings, regular expressions, video streams, images, waveforms, etc., with a certain clique in a manner that enables their identification, as described below.

Each input to be recognized defines a unique clique in each one of the computational cores, which is configured during the programming stage. As a result, the number of LT cliques is determined according to the number of external data streams, which have been identified as possible inputs, for example, a set of strings or regular expressions. As described above, such an embodiment allows parallel processing of the data by multiple computational cores.

Preferably, one or more of the LT cliques encode several identified external data streams. For example, several strings and regular expressions may be associated with the same LT clique. The linker section 47 is designed to identify the cliques during the learning process. During the operational mode, the linker section 47 has to output a relevant LT clique whenever a specific external data stream is identified by the liquid section 46, so that identified features of the data stream are represented by the clique. Thus the linker serves to map a clique onto an Output as per the function:

$$Output=linker (clique).$$

The linker section 47 may be implemented as a pool of simple LTUs, connected to the liquid section by CNUs. Preferably, during the learning process, the weights of the CNUs are defined according to the response probability for identifying an external data stream, which is obtained from each LTU. The linker section may also have other implementations, depending on the definition of the linker section. The CNUs in the liquid section 46 are as described above in relation to FIG. 5.

Figure 27:
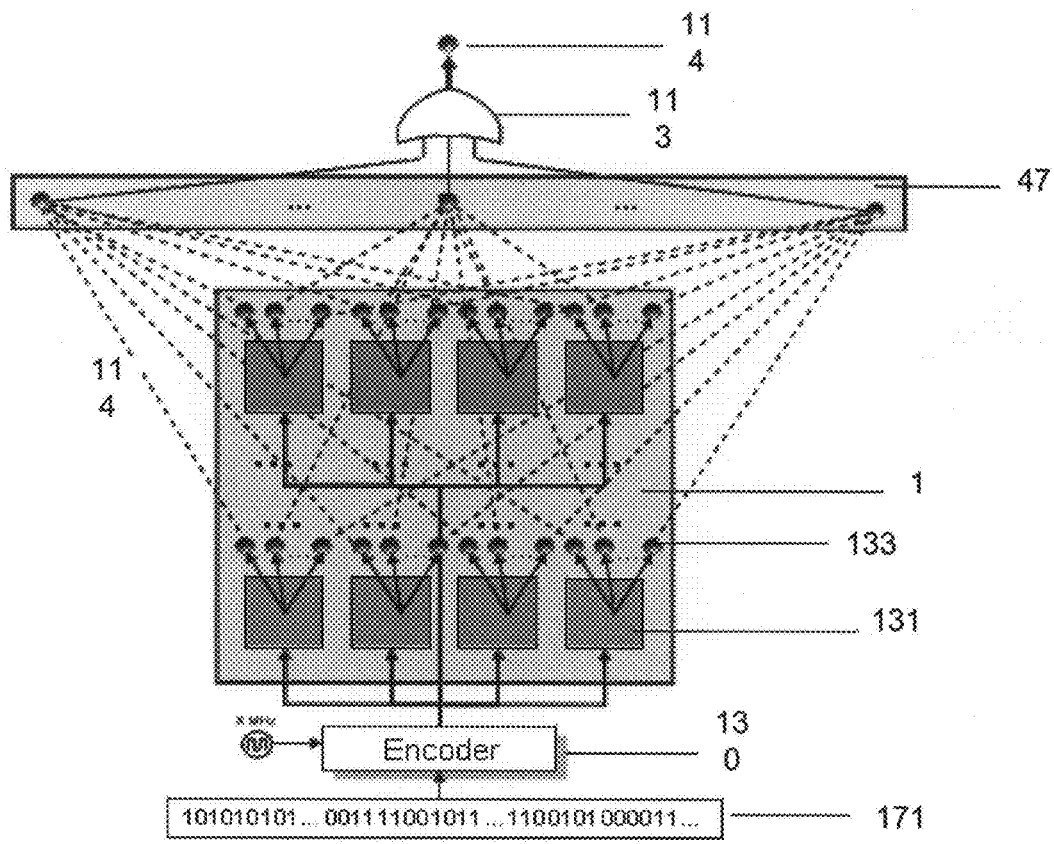
FIG. 27 is a schematic representation of a computational layer, according to another embodiment of the present invention.

Reference is now made to FIG. 27, which is a schematic representation of a computational layer 1, according to another embodiment of the present invention. While the computational layer 1 is similar to that of FIG. 19 and the computational cores 131 are as depicted in FIG. 26, a number of new components are added in FIG. 27.

As described above, the computational layer 1 is designed to allow parallel processing of an external data stream by a large number of computational cores. The external data stream is input to each one of the computational cores in parallel. The input is preferably continuous in time.

As described above, each computational core 131 comprises an encoding unit 132. The encoding unit is configured to continuously encode received input data and to forward it to the liquid section $v(\cdot)$.

Figure 28:
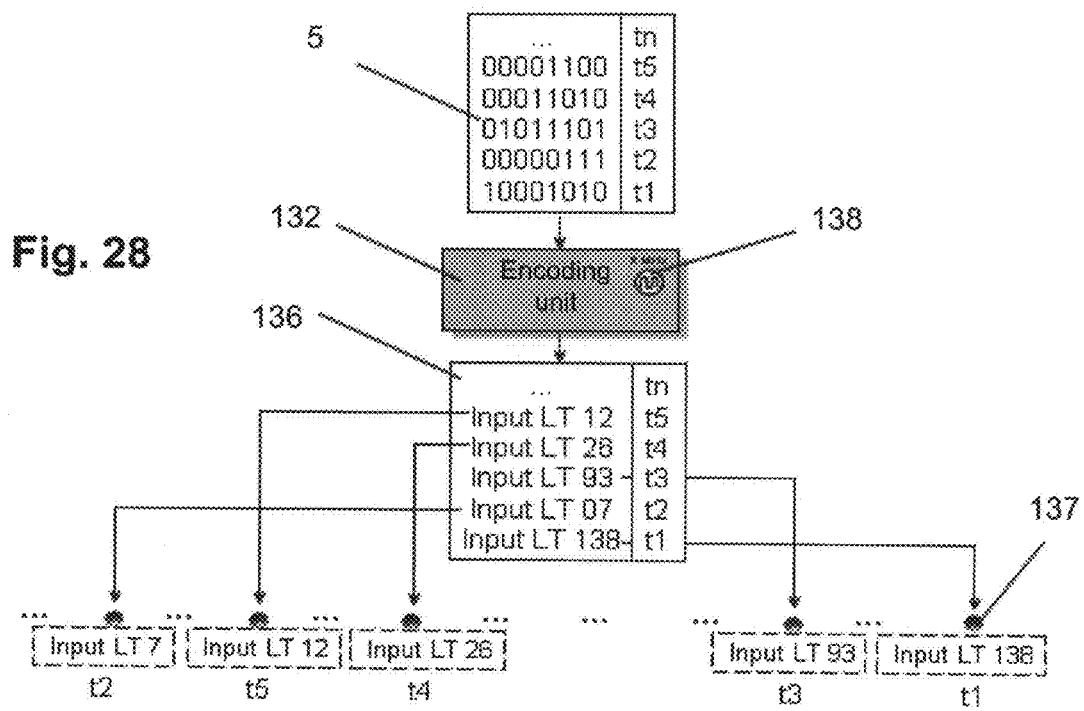
FIG. 28 is a schematic representation of the separation of the received data stream into parts based on a predefined table, according to a preferred embodiment of the present invention.

Reference is now made to FIG. 28, which is a schematic illustration of the encoding unit 132 and the external data stream, according to a preferred embodiment of the present invention. As depicted, the encoding unit 132 transforms the external data stream 5 into decimal indices 136. The decimal indices 136 determine which input LTUs receive a certain portion of the external data stream 5. For example, if the decimal indices 136 designate the line 7A to a certain input LTU 137, line 7A will be transmitted directly via LTU 137. The encoding unit 132 preferably comprises a clock 138 which is used during the encoding process. Preferably, the encoding unit 132 is designed to encode a predefined number of n bits each clock-step.

The number of bits per clock step is encoded into one of the decimal indexes, and defines the size of the liquid section, which is needed to process the encoded input. The size N of the liquid section size is a function of n, and may be described by:

$$N \geq 2^n \quad (5)$$

The implementation of the encoder may vary for different values of n.

Reference is now made, once again, to FIG. 27. Each one of the computational cores 131 is designed to produce D different kinds of core outputs at any given time for a given computational task, such as matching a string or regular expression identification. The core outputs may be a binary value $D=\{_0^1\}$, or a discrete value $D=\{_0^n\}$. Preferably, the core outputs are the discrete values, which are represented by n cliques of LTUs 133. Such an embodiment allows each computational core to identify n different signals 171, such as strings or regular expressions, following encoding by the encoder 130 in the received external data stream.

In such an embodiment, the computational core forms a filter, which ignores unknown external data streams and categorizes only those external data streams which were recognized. As depicted in FIG. 27, the LTUs of a certain clique are connected to a cell in an array 112 that represents the cliques.

In one embodiment of the present invention, the computational core 100 is designed to indicate whether or not a certain data stream has been identified. In such an embodiment, all the cells in the array 112 are connected to an electronic circuit 113, such as an OR logic gate, which is designed to output a Boolean value based upon all the values in the cells. In such an embodiment, the output 114 may be a Boolean value that indicates to a central computing unit that the computational core has identified a certain data stream.

In another embodiment, the computational core is designed not merely to indicate that identification has been made but to indicate which data stream has been identified. In such an embodiment, the electronic circuit 113 allows the transferring of a Boolean vector. In such an embodiment, the clique itself and/or the value represented by the clique can be transferred to a central computing unit.

As described above, the computational core can operate in learning and operational modes, melting and freezing. During the learning mode, new inputs are transferred in parallel to all the computational cores.

Figure 29A:
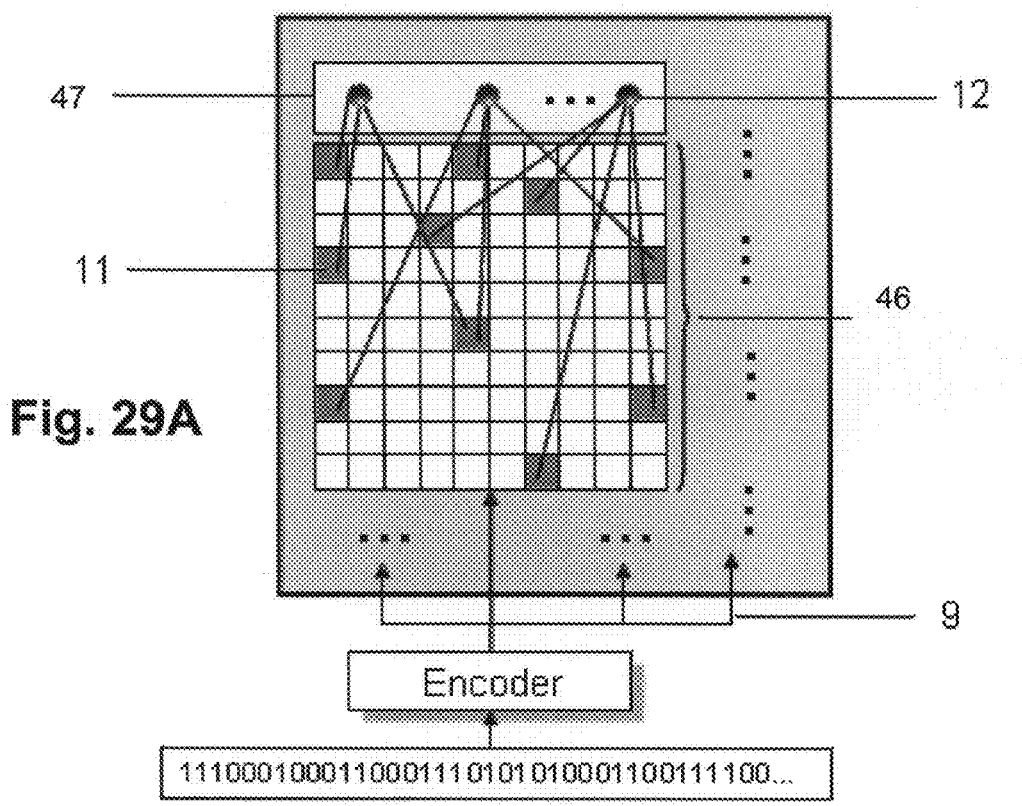
FIG. 29A is a schematic representation of a computational core having a direct connection between computational processors of the liquid section and memory components of the linker section, according to a preferred embodiment of the present invention.

Reference in now made to FIG. 29A, which is a schematic representation of a computational core according to the present invention. The linker section 47 and the liquid section 46 are as depicted in FIG. 2. In FIG. 29A, however, there are further depicted the associations between members of an array of LT cliques 12 and different LTUs in the liquid section 46.

The linker section 47 comprises an array of LT cliques 12. Each member of the array of LT cliques 12 is configured to be matched with a certain clique signature within the response of the liquid section 46. For example, in FIG. 29A the members of a certain clique signature in the array of LT cliques 12 are colored gray and are connected to the representation of the clique 12 within the linker section 47 with a dark line.

During the learning process, every identified signal or a class of identified signals is associated with a different member of the array of LT cliques 12. The associated member is used to store a set of values representing the LTUs of the related LT clique, wherein each one of the LTUs in the set is defined according to the following equations:

$$LT_i \in \text{Clique}(S_j) \text{ if } Q_i = P(LT_i = 1 | S_j) >> P(LT_i = 1)$$

where for each $LT_i$ of the core, a probability of response given a desired string, as denoted by $S_j$. The probability is calculated and compared with the probability of response, given any other input. This is calculated by presenting a large number of random inputs. The Clique is composed of those $LT_i$ for which the probability of response given a desired string/regular-expression is much higher than the probability to respond to any other input.

The $Q_i$ is calculated for each $LT_i$ of the core and compared against a certain threshold $Q_{th}$. Thus, a reduced, selected population of LTs is defined as clique by:

$$\text{Clique} = \{LT_i | Q_i > Q_{th}\}.$$

Figure 29B:
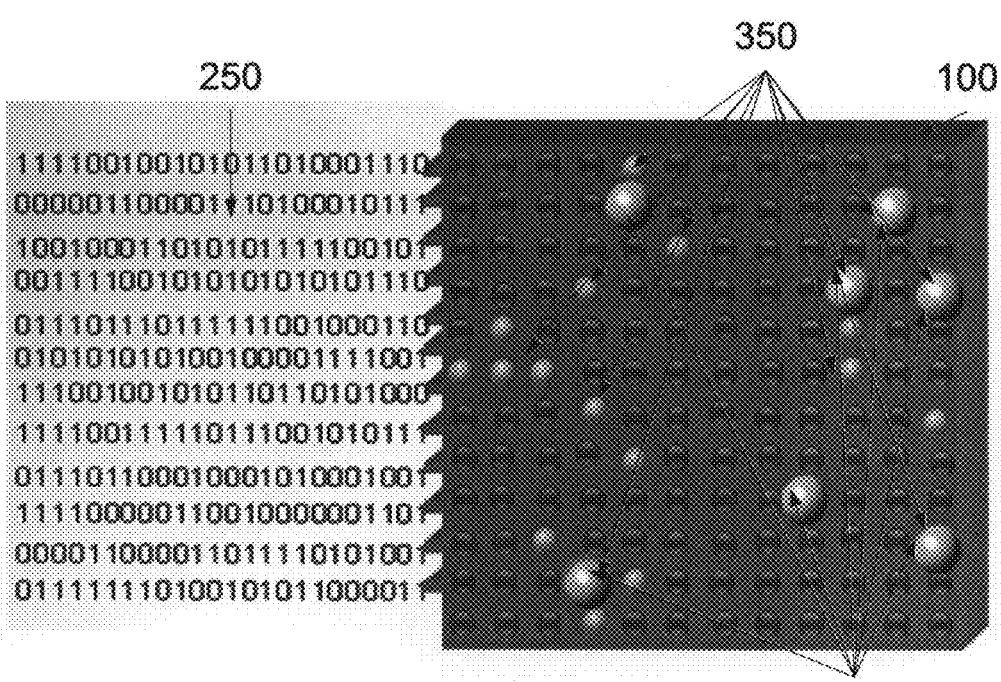
FIG. 29B, which is a computational core, as depicted in FIG. 9B, in a learning mode, according to a preferred embodiment of the present invention.
Figure 29C:
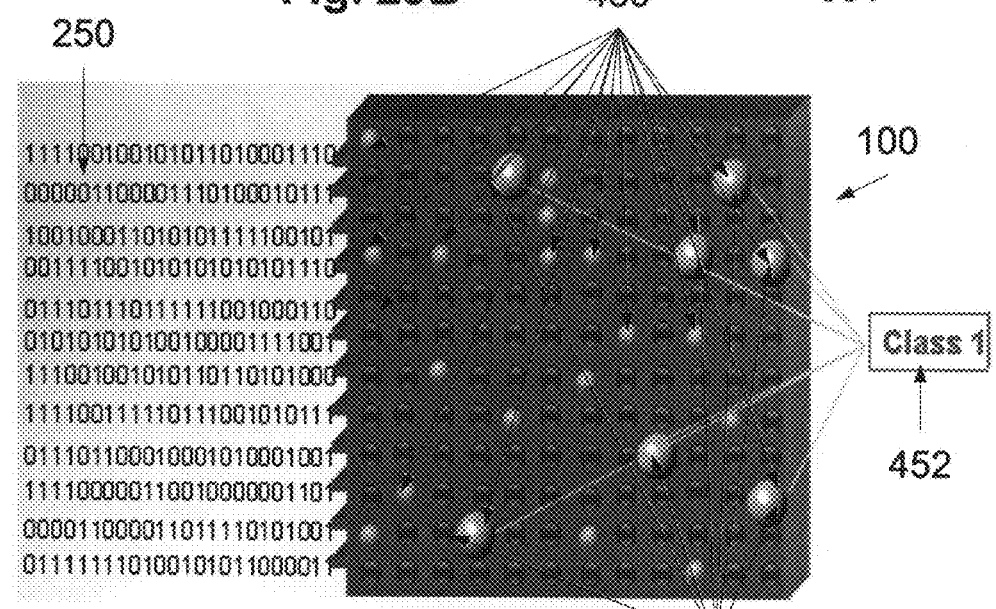
FIG. 29C, which is a computational core, as depicted in FIG. 9B, in an operational mode, according to a preferred embodiment of the present invention.

FIG. 29A, is a computational core 100, as depicted in FIG. 9A, and is shown during the learning process. As depicted in FIG. 29B a number of LTUs 350 identify the received external data stream 250, however, only some of them 351 have a higher probability of response to the receive external data stream or to the derivative thereof as to the probability of response to any other identified input. The LTUs with the higher probability are stored as unique pattern or signature for "class 1" representing the received external data stream 250, for example as "class 1".

During the operational mode, the LT clique 351 is used to classify the received external data stream 250. FIG. 29B shows a computational core 100, of the kind depicted in FIG. 9B. In FIG. 29B an external data stream 250 is received and analyzed by the computational core 100, during operational mode. As depicted, the received external data stream 250 is identified by a group of LTUs 450 that comprises the previously identified LT clique 351 that have a higher probability of response to the receive external data stream or to the derivative thereof than to the probability of response to any other identified input. As the group of LTUs 450 that identify the received external data stream 250 comprises the members of the LT clique 351, the computational core can classify the received external data stream 250 according to the class which has been assigned to it during the learning process 452.

The $Q_i$ is calculated for each LT of the core and is compared against a certain threshold $Q_{th}$. Thus, we define a reduced, selected population of LTs, as a clique by:

$$\text{Clique} = \{LT_i | Q_i > Q_{th}\}.$$

In another embodiment the learning may be implemented in the following way:
1) Defining all the LTUs as reporting LTs.
2) Injecting a novel signal or signals from a certain class of signals into each computational core.
3) Checking the stability of the responses of each reporting LT to the injection.
4) Extracting the reporting LTs which have a stability below a predefined threshold from the group of the reporting LTs.

5) In such a manner different reporting LTs are chosen for each one of the computational cores.

Figure 30:
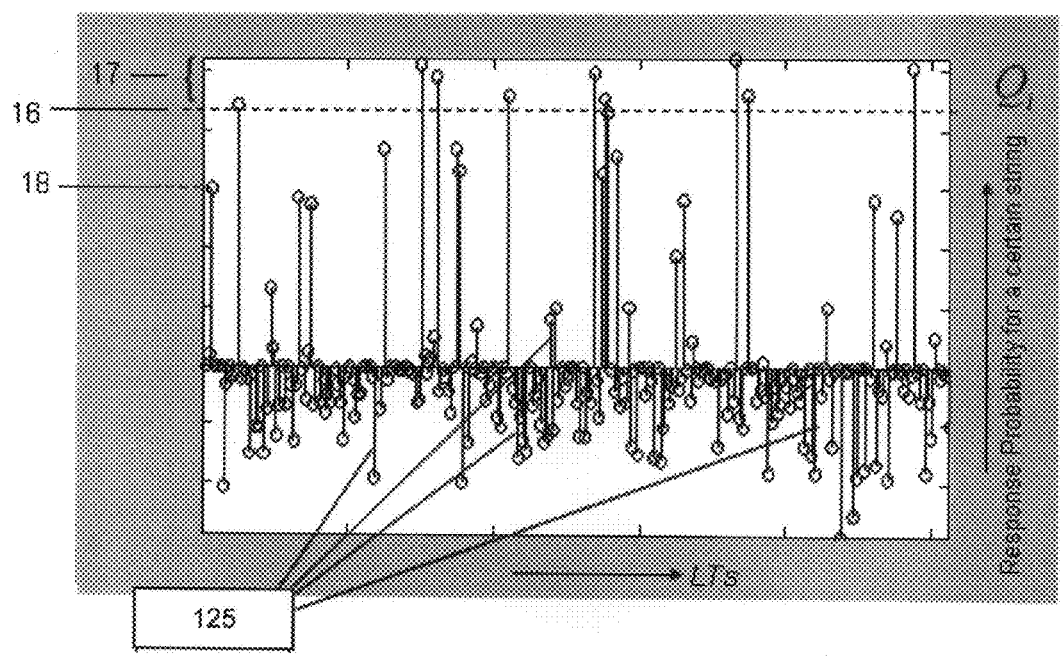
FIG. 30 is a graph for describing the response probability of different LTUs to a certain string, according to a preferred embodiment of the present invention.

An example of such a clique selection for one computational core is shown in the graph which is depicted in FIG. 30, in which the y-axis is the probability $Q_i$ for a certain identified input, such as a string, to be identified by a certain $LT_i$ and the x-axis is the index of the $LT_i$. Dot 18 exemplifies the $Q_i$ for a particular $LT_i$. Preferably, all values of $LT_i$ where $Q_i$ is higher than the predefined $Q_{th}$, as shown at 16, are included in the LT clique, as shown at 17. It should be noted any other manner that allows the identification of LTUs that are suitable to the introduced input might also be implemented. During the operational mode, it is assumed that the array of LT cliques 12 is defined.

Figure 31:
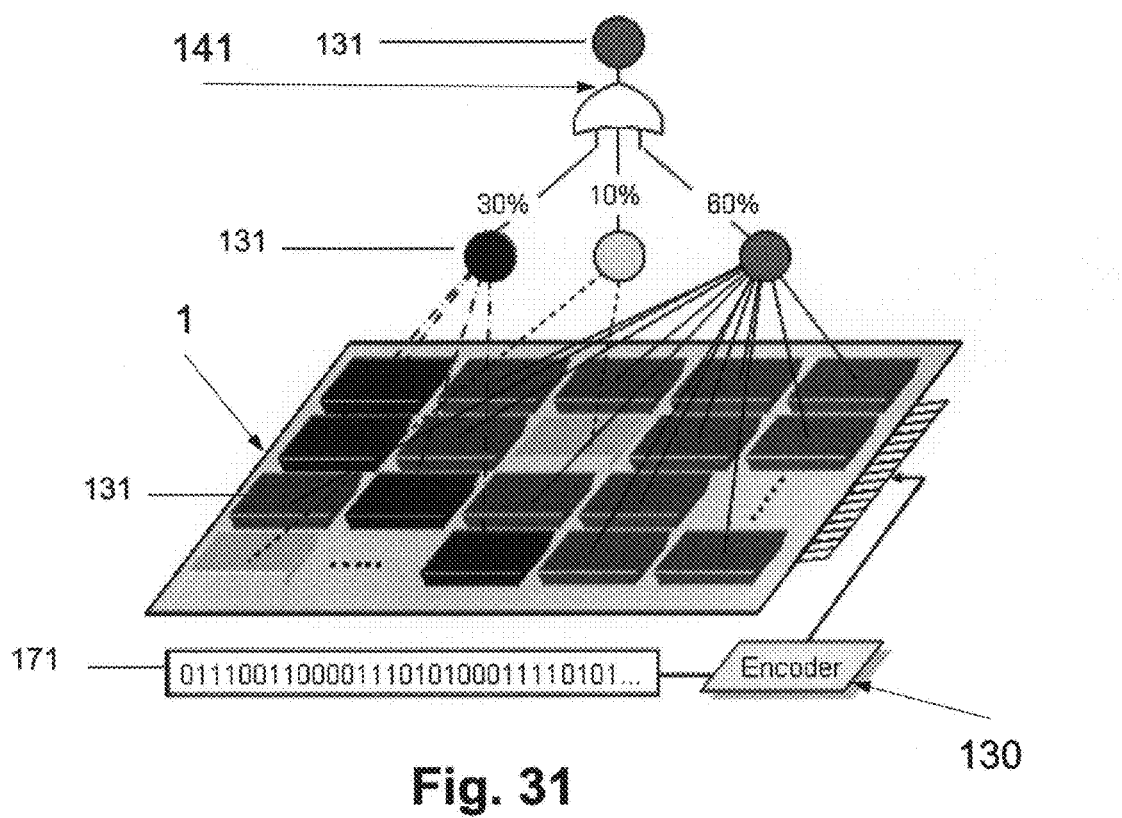
FIG. 31 is a graphical representation of a computational layer, according to another embodiment of the present invention.

Reference is now made to FIG. 31, which is a graphical representation of the computational layer 1, according to a preferred embodiment of the present invention. As described above, each one of the computational cores 131 is configured to identify a number of signals or a class of signals. Each signal is reflected by the output of the LTUs of the liquid section that belong to the clique associated with a certain class of signals, as described above. While the computational layer 1 is as depicted in FIG. 27, in FIG. 31, however, there is further depicted an electronic circuit 141 for implementing a majority voting algorithm. As described above, each one of the computational cores 131 is designed to generate a core output, which reflects which signal has been identified in the introduced external data stream. It should be noted that as a majority voting algorithm is used the process is relatively fault tolerant. If one of the computational cores which have been configured to identify the signal failed to do so, the identification will still be carried out correctly as the majority of the computational core will identify the signal. Clearly, as the process is relatively fault tolerant, individual cores do not have to be perfect and the production yield is radically improved since imperfect chips can still be used. Thus the production cost for the VLSI chip decreases.

Moreover, such an embodiment allows the processing of ambiguous and noisy data as the majority voting identification process improves radically the performance.

FIG. 31 depicts an integrated circuit 141 which is connected to receive all the core outputs of all the computational cores 131. The integrated circuit 141 is designed to receive all the core outputs which are received in response to the reception of a certain external data stream, for example, string $S_j$ (see below). The integrated circuit 141 is designed to implement a "majority voting" algorithm that is preferably defined according to the following functions:

$$D_{NLA,S_j} = D_{i,S_j} \mid f_i = \max\{f_k\}$$
$$f_k = \sum_k \sum_l w_k \delta(D_{k,S_j}, D_{l,S_j})$$

wherein $\delta$ denotes a discrete metric function;

k and j denote indices of the grid of computational cores;

$w_k$ is the weight of each core in the voting process, which is preferably assumed to be equal to 1 in simple realizations; and $f_k$ denotes the weighted "voting rate" of a subgroup of the LT clique which is associated with certain output, $D_{k,S_j}$, to input $S_j$.

Thus the final output of computational layer 1, in response to a certain external data stream which has been identified as $S_j$, is the output that is defined by the maximal voting rate $f_i$ within the array of LT cliques.

The programming and adjusting process, including, for example, characterization of arrays of LT cliques, setting the parameters of a certain LT clique, and programming of any other realization of a linker can be performed during the various phases. Such programming can be done by software simulation prior to the manufacturing process. In such a manner, the computational layer can be fully or partially hard-coded with programmed tasks, such as matching certain classes of strings or identifying certain subsets of regular expressions or any other classification task. Preferably, dynamic programming of the linker may be achieved by adjusting the linker of the computational layer in a reconfigurable manner. For example, in the described embodiment, an array of LT cliques can be defined as a reserve and the parameters can be determined by fuses or can be determined dynamically by any other conventional VLSI technique. Preferably, the same LT cliques can be reprogrammed to allow identification of different subsets of strings and regular expressions.

The output of the computational layer may vary according to the application that utilizes the computational layer. For content inspection say to detect viruses, for example, the output of the computational layer is binary: 0 for ignoring the injected input (letting it pass) and 1 for blocking the injected input if a match was identified (meaning a suspicious string has been identified), or vice versa.

Preferably, if the used application is related to information retrieval or data processing, an index of the identified string or regular expression is produced in addition to the detection result.

Figure 33:
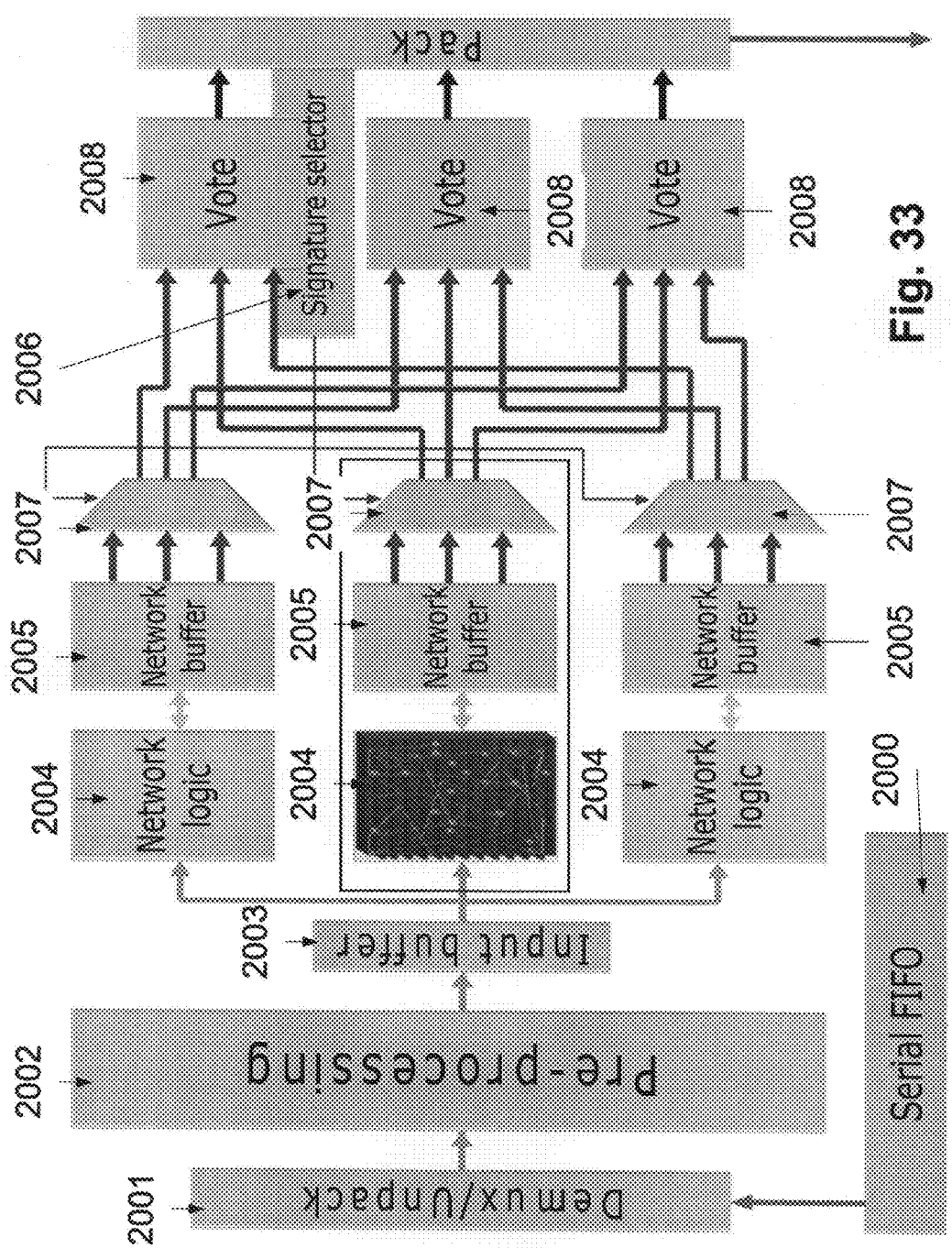
FIG. 33 is a graphical representation of a diagram of a computational layer, as depicted in FIG. 11A, which further comprises a number of voting components, input preprocessing components, and a signature selector, according to one embodiment of the present invention.

Reference is now made to FIG. 33, which is a graphical representation of a diagram of a computational layer 1, as depicted in FIG. 11A, which further comprises a number of voting components 2008, input preprocessing components, and a signature selector 2006, according to one embodiment of the present invention. FIG. 33 depicts a de-multiplexer (demux) 2001 that encodes the information which is received from a serial FIFO component 2000 and forwards it to a preprocessing unit 2002 that preprocess the received information and generates an output based thereupon. The preprocessed outputs are forwarded to an input buffer 2003, which is designed to allow the injecting of the preprocessed outputs to a number of network logic components 2004. Each network logic component 2004 is defined as the aforementioned liquid sections. The network logic components 2004, as the liquid sections above, are designed to output a unique signature that represents a pattern that has been identified in the received information. Each one of the network logic components 2004 is separately connected, via a network buffer 2005, to a linking component 2007. Each linking component 2007 is defined, as the aforementioned linker section, to receive the outputs of a related network logic component 2004 and to output a discrete value based thereupon. The linking component 2007 comprises a number of records. Each record is defined, during the learning mode, to be matched with a unique output of the network logic components 2004. Each one of the linking components 2007 receives the unique output from a related network logic component 2004 and matches it with one of his records.

Preferably, a number of different discrete values are stored in each one of the records. Each one of the different discrete values constitutes a different signature which is associated which the unique output of the linking components 2007. In the depicted embodiment, the linking component 2007 forwards each one of the different discrete values, which constitutes a different signature, to one of a number of different designated voting components 2007. Each voting component 2007 is designed to apply a voting algorithm, as described above, on the received discrete values. Such an embodiment can be extremely beneficial for processing signals that documents the voices of more than one speaker. Each one of the voting components 2007 may be designed to receive signatures which are assigned to indicate that a pattern, associated with one of the speakers, has been identified by one or more of the network logic components 2004. In another embodiment, such an embodiment can be used to perform several tasks in parallel on the same data stream. For example the same voicd signal may be processed simultaneously to identify the speaker, the language, and several keywords.

Figure 32:
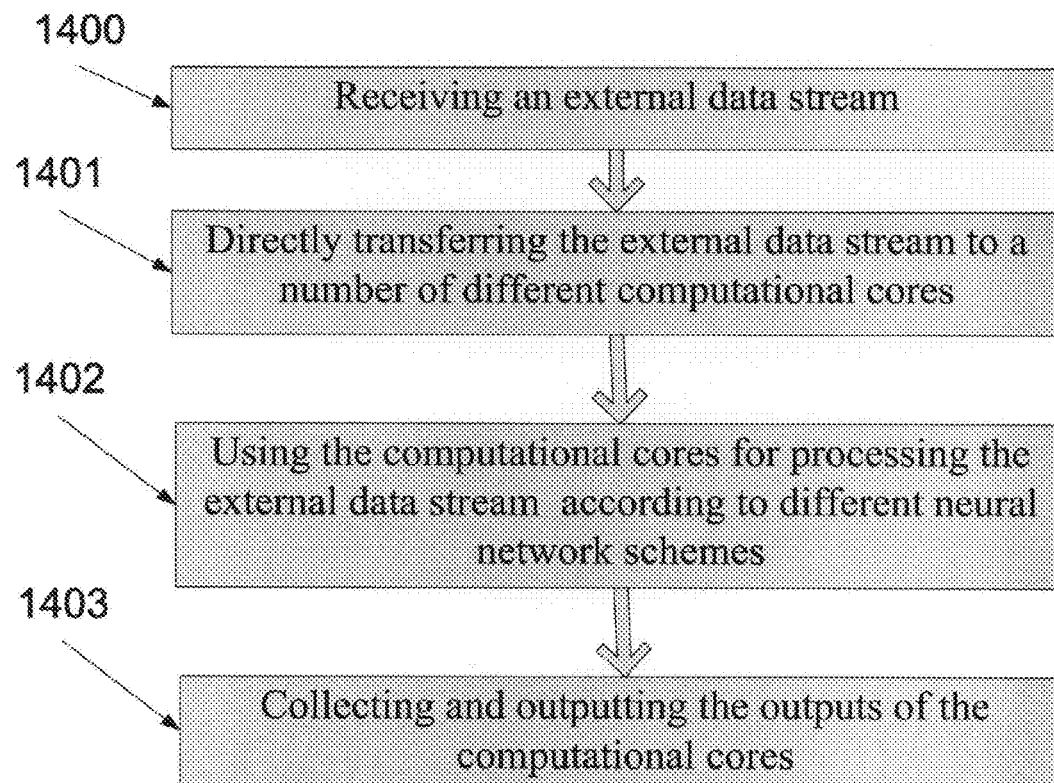
FIG. 32 is a simplified flowchart diagram of a method for processing a data stream using a number of computational cores, according to a preferred embodiment of the present invention.

Reference is now made to FIG. 32, which is a flowchart of an exemplary method for processing an external data stream using a number of computational cores, such as the aforementioned computational cores, according to a preferred embodiment of the present invention. During the first step, as shown at 1400, an external data stream is received. As described above, the external data stream may originate from a sensor that captures signals from the real world. The received external data stream may be encoded by a designated computing device before it is processed. As described above, in order to process the external data stream, a number of computational cores are used in parallel. Therefore, during the following step, as shown at 1401, the external data stream is directly transferred to a number of different computational cores. As described above in relation to the liquid section, each one of the computational cores is associated with an assembly that has been structured according to a unique pattern of processors. During the following step, as shown at 1402, each one of the computational cores uses the associated unique pattern of processors for processing the external data stream. Then, as shown at 1403, the outputs of all the processing devices are collected. Such a collected output can be used for signal analysis, identification and classification, as further described and explained above. Preferably, two additional steps are added to the depicted process. After the core outputs are collected, a voting algorithm, such as the majority voting algorithm is used, to choose one of the core outputs. In the final step, the chosen core output is then forwarded to a certain application that utilizes the information or present it to a user.

It is expected that during the life of this patent many relevant devices and systems will be developed and the scope of the terms herein, particularly of the terms computational cores, computation, computing, data stream, sensor, signal, and computational core are intended to include all such new technologies a priori.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. An apparatus for asynchronous adaptive, and parallel processing of at least one input data stream, comprising:
   a plurality of computational cores,
   a first input interface, operatively connected to each of said plurality of computational cores, configured for allowing said plurality of computational cores for simultaneously receiving said at least one input data stream; and
   each of said plurality of computational cores comprising properties having at least some statistical independency from other of said computational cores, said properties being set independently of each other of said computational cores, each core being able to independently produce an output indicating recognition of at least one previously learned signal responsive of at least one input data stream to said plurality of computational cores,
   wherein the plurality of computational cores are randomly pre-programmed over a statistical distribution a-priori to receiving said at least one input data stream to perform a unique and unchanged statistical function on said at least one input data stream to produce a corresponding plurality of unique outputs for said at least one input data stream, thereby ensuring that the at least one input data stream is simultaneously processed by the plurality of computational cores according to a large number of diverse patterns, and
   at least one decision unit for receiving said output from each of said computational cores and making an identification of said at least one input data stream based on each of said independently produced computational core outputs.

2. The apparatus of claim 1, wherein the apparatus is used for a task which is a member of the group consisting of:
   filtering said at least one input,
   image recognition,
   speech recognition,
   clustering,
   indexing,
   routing,
   video signals analysis,
   video indexing,
   categorization,
   string matching,
   recognition tasks,
   verification tasks,
   tagging, and
   outlier detection.

3. The apparatus of claim 1, wherein each said computational cores comprises a linking module configured for producing a signal indicating a unique state of respective computational cores.

4. The apparatus of claim 3, wherein said unique state represents a responsiveness of respective said properties to said at least one input.

5. The apparatus of claim 3, wherein each said computational core is configured to operate in a learning mode, receiving a plurality of input signals of a training pattern to be associated with said unique state during said learning mode.

6. The apparatus of claim 3, wherein said linking module is configured for probing a plurality of variants of a given signal, thereby identifying a stable variant as a unique state.

7. The apparatus of claim 1, wherein said properties of each core of said plurality of computational cores are implemented using:
at least one networked processor; and
a plurality of weighted connections, each of said weighted connections configured to operatively connect two of said networked processors.

8. The apparatus of claim 7, wherein a distribution of said plurality of weighted connections is unique for said each core.

9. The apparatus of claim 7, wherein a distribution of said one or more networked processors is unique for said each core.

10. The apparatus of claim 7, wherein at least one of said networked processors is an integrate-to-threshold unit.

11. The apparatus of claim 10, wherein said at least one said integrate-to-threshold unit is configured as a leaky integrate-to-threshold unit.

12. The apparatus of claim 7, wherein each said weighted connection is a coupling node configured for storing information of previous data streams, thereby adapting its conductivity.

13. The apparatus of claim 1, wherein said computational cores are at least one of: liquid state machines, echo state machines.

14. The apparatus of claim 1, wherein the apparatus is at least partially implemented of one or more integrated circuits.

15. The apparatus of claim 1, wherein said input comprises a member of the group consisting of:
a stream of digital signals,
a stream of video signals,
a stream of analog signals,
a medical signal,
a physiological signal,
a stream of data for classification,
a stream of text signals for recognition,
a stream of voice signals, and
a stream of image signals.

16. The apparatus of claim 1, wherein said identification is done using a strategy that is a member of the group consisting of:
a winner-takes-all algorithm,
a voting algorithm,
a statistical analysis of said first outputs, and
a majority voting algorithm.

17. The apparatus of claim 1, wherein said plurality of computational cores is divided to a plurality of subgroups of computational cores, wherein each of said subgroups is configured for mapping variants of said input.

18. The apparatus of claim 17, wherein outputs of each said subgroups are forwarded to a different decision unit.

19. A method for processing a current temporal input against at least one previously learned signal, comprising:
a) receiving an input data stream;
b) transferring the input to a plurality of computational cores, each of said computational cores comprising independently set properties, each of said properties having statistical independency from other said computational cores, each of said plurality of computational cores being randomly pre-programmed over a statistical distribution a-priori to receiving said input data stream to perform a unique and unchanged statistical function to produce a corresponding plurality of unique outputs for said at least one input data stream, thereby ensuring that the at least one input data stream is processed according to a large number of diverse patterns;
c) using said plurality of computational cores for independently producing an output indicating recognition of the at least one previously learned signal; and
d) making an identification of the input based on a majority of said produced outputs; and
e) outputting said identification.

20. The method of claim 19, wherein said making comprises:
matching said produced outputs of each of said computational cores with a plurality of previously learned outputs;
wherein said identification of (d) is indicative of said matching.

21. The method of claim 19, wherein said properties are determined according to:
one or more networked processors; and
a plurality of weighted connections, each of said weighted connection configured to operatively connect two of said one or more networked processors.

22. The method of claim 21, wherein for each said computational core, a distribution of said plurality of weighted connections is unique for each of said computational core.

23. The method of claim 21, wherein for each said computational core, a distribution of said one or more networked processors is unique for each said computational core.

24. The method of claim 21, further comprising:
storing information about said input in each of said weighted connection, thereby adapting its conductivity.

25. The method of claim 19, wherein said output of step (c) is generated according a unique state of said statistically different properties.

26. The method of claim 19, wherein said input is forwarded simultaneously to a plurality of said plurality of computational cores.

27. The method of claim 19, further comprising
encoding said input between (a) and (b).

28. The method of claim 19, wherein different encoding is performed for different subgroups of said plurality of computational cores.

29. The method of claim 19, further comprising a step of collecting said outputs from each said computational cores prior to making said identification.

30. The method of claim 19, further comprising:
transmitting said identification to a central computing unit.

31. A computational core comprising:
a network section comprising one or more networked processors having properties of a random distribution by being randomly pre-programmed over a statistical distribution a-priori to receiving said at least one input data stream to perform a unique and unchanged statistical function to produce a corresponding plurality of unique outputs for said at least one input data stream, thereby ensuring that the at least one input data stream is processed according to a large number of diverse patterns, configured for receiving an input, and for producing a unique output based upon said properties and responsive of said input;
a linking section, operatively connected to said network section, configured for identifying at least one previously learned signal according to a unique output responsive of an input, and generating a unique signature based thereon.

* * * * *